(12) United States Patent
Rodriguez

(10) Patent No.: US 10,875,102 B2
(45) Date of Patent: Dec. 29, 2020

(54) HYBRID HOLDING DEVICE

(71) Applicant: Eduardo Rodriguez, Chatsworth, CA (US)

(72) Inventor: Eduardo Rodriguez, Chatsworth, CA (US)

( * ) Notice: Subject to any disclaimer, the term of this patent is extended or adjusted under 35 U.S.C. 154(b) by 0 days.

(21) Appl. No.: 16/122,759

(22) Filed: Sep. 5, 2018

(65) Prior Publication Data
US 2019/0076935 A1    Mar. 14, 2019

Related U.S. Application Data

(60) Provisional application No. 62/557,031, filed on Sep. 11, 2017.

(51) Int. Cl.
*B23B 31/163* (2006.01)
*B25B 1/08* (2006.01)

(52) U.S. Cl.
CPC .. *B23B 31/16012* (2013.01); *B23B 31/16004* (2013.01); *B23B 31/16016* (2013.01); *B25B 1/08* (2013.01); *Y10T 279/1941* (2015.01)

(58) Field of Classification Search
CPC ..... B23B 31/001; B23B 31/102; B23B 31/16; B23B 31/16004; B23B 31/16008; B23B 31/16012; B23B 31/16016; B23B 31/16275; B23B 2260/104; B23B 31/16504; B25B 1/08; B23Q 3/02; B23Q 3/06; Y10T 279/1926; Y10T 279/1941; B25J 15/10
See application file for complete search history.

(56) References Cited

U.S. PATENT DOCUMENTS

| | | | | |
|---|---|---|---|---|
| 159,989 A | * | 2/1875 | Westcott | ........... B23B 31/16004 |
| | | | | 279/114 |
| 258,783 A | * | 5/1882 | Maduell | ............ B23B 31/16275 |
| | | | | 279/123 |
| 472,674 A | | 4/1892 | Lewis | |
| 597,558 A | * | 1/1898 | Howarth | ........... B23B 31/16004 |
| | | | | 279/116 |
| 981,724 A | | 1/1911 | Vold | |

(Continued)

FOREIGN PATENT DOCUMENTS

| | | | | |
|---|---|---|---|---|
| DE | 3838347 A1 | * | 5/1990 | ....... B23B 31/16008 |
| DE | 102010022577 A1 | | 12/2011 | |

(Continued)

OTHER PUBLICATIONS

Machine Translation, DE3838347A1, Surov,L. et al., May 17, 1990. (Year: 1990).*

(Continued)

*Primary Examiner* — Eric A. Gates
*Assistant Examiner* — Chwen-Wei Su
(74) *Attorney, Agent, or Firm* — Patent Law Agency, LLC; Peter Ganjian

(57) ABSTRACT

A hybrid holding device used in a milling machine, comprising a base with mounting structures for detachably fastening the hybrid holding device securely onto a workbench of the milling machine in a fixed stationary position. The hybrid holding device further includes moveable multi-jaw assembly that includes at least three jaws that directly receive and securely hold a workpiece without an adapter.

27 Claims, 79 Drawing Sheets

(56) References Cited

U.S. PATENT DOCUMENTS

| | | | | |
|---|---|---|---|---|
| 990,172 | A | * | 4/1911 | Taylor ................ B23B 31/1238 |
| | | | | 279/62 |
| 1,263,894 | A | * | 4/1918 | Hottinger .......... B23B 31/16004 |
| | | | | 279/114 |
| 1,350,746 | A | | 8/1920 | Spillmann |
| 1,399,786 | A | | 12/1921 | Messenger |
| 1,488,221 | A | * | 3/1924 | Swissgabel ....... B23B 31/16004 |
| | | | | 269/104 |
| 1,831,225 | A | | 11/1931 | Bogart |
| 2,579,796 | A | | 12/1951 | Church |
| 2,767,993 | A | * | 10/1956 | Galler ............... B23B 31/16004 |
| | | | | 279/116 |
| 3,747,945 | A | | 7/1973 | Bailiff |
| 3,814,450 | A | * | 6/1974 | Bertorello ......... B23B 31/16004 |
| | | | | 279/4.12 |
| 4,222,577 | A | | 9/1980 | Giffin |
| 4,640,518 | A | * | 2/1987 | Ferraro ............. B23B 31/16008 |
| | | | | 279/110 |
| 6,478,311 | B1 | * | 11/2002 | Hinson ............. B23B 31/16275 |
| | | | | 279/123 |
| 6,547,259 | B2 | | 4/2003 | Fitzpatrick |
| 9,302,328 | B2 | * | 4/2016 | Huang .............. B23B 31/16083 |
| 10,016,816 | B2 | | 7/2018 | Kim et al. |
| 2012/0032383 | A1 | | 2/2012 | Li et al. |
| 2014/0097581 | A1 | | 4/2014 | Jackson |
| 2015/0352641 | A1 | | 12/2015 | Mies |
| 2015/0352642 | A1 | | 12/2015 | Meyer |
| 2016/0278872 | A1 | | 9/2016 | Gombert et al. |

FOREIGN PATENT DOCUMENTS

| | | | | |
|---|---|---|---|---|
| DE | 102013201231 | B3 | | 2/2014 |
| EP | 2759361 | A2 | | 7/2014 |
| EP | 2883638 | A2 | | 6/2015 |
| FR | 2956333 | | | 9/2011 |
| GB | 563917 | A | * | 9/1944 ............. B23Q 16/04 |
| GB | 679110 | A | | 9/1952 |

OTHER PUBLICATIONS

EPO Communications—The Extended European Search Report; dated Feb. 28, 2019.

EPO Office Action; App No. 18193885.3.1019 ; dated Oct. 23, 2019.

* cited by examiner

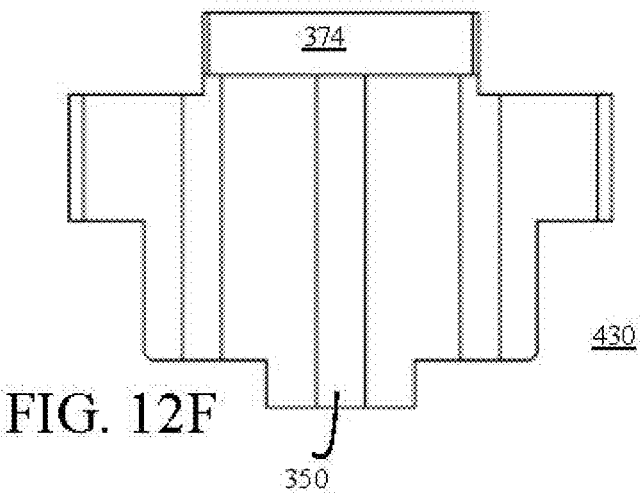
FIG. 12F
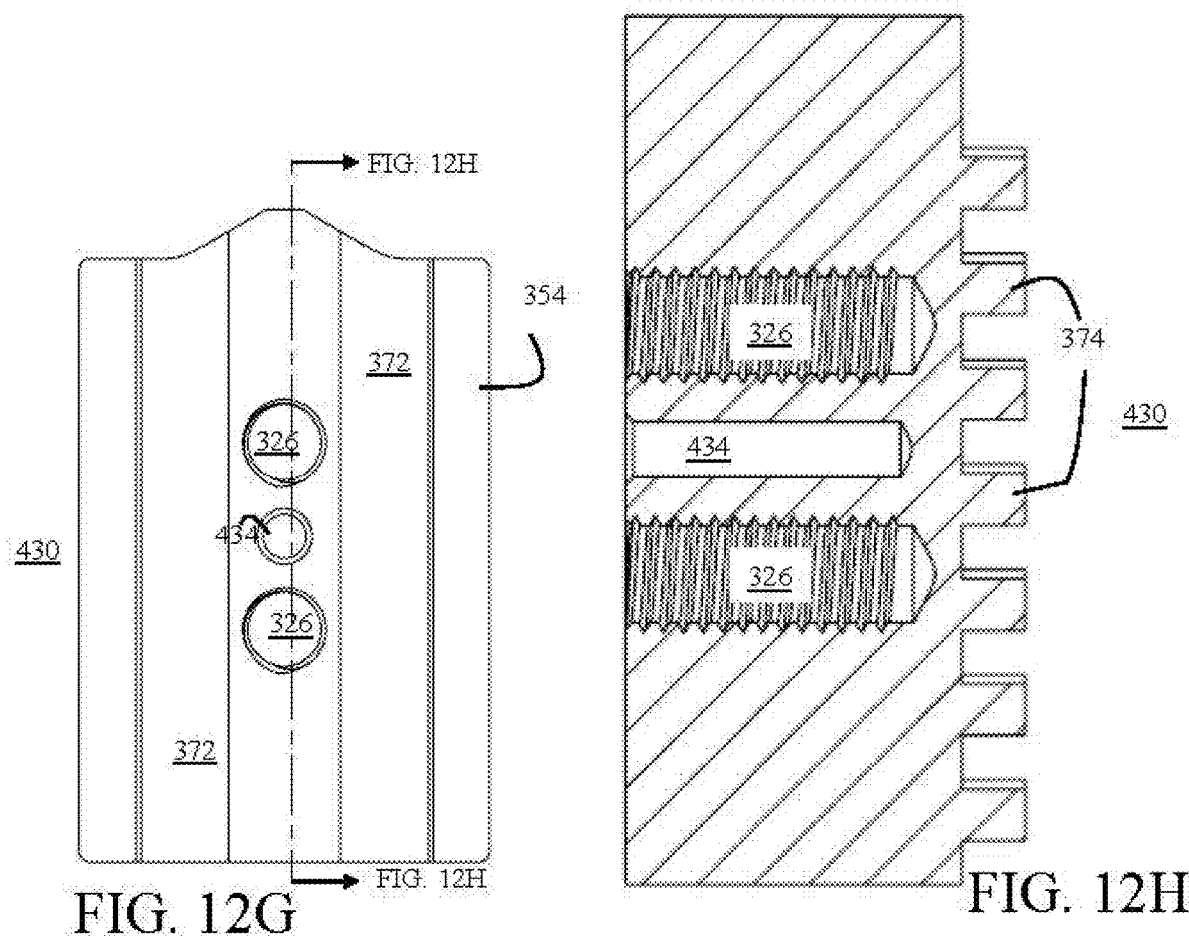
FIG. 12G
FIG. 12H

HYBRID HOLDING DEVICE

CROSS-REFERENCE TO RELATED APPLICATIONS

This Application claims the benefit of priority of U.S. Utility Provisional Patent Application 62/557,031, filed 11 Sep. 2017, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention are related to a hybrid holding device in a form of a multi-jaw vise that may be used in milling machines for securely holding a polygonal, rounded, or other odd-shaped workpiece.

Description of Related Art

Most conventional vises used today are comprised of only two jaws used to securely hold a polygonal object (an object or a workpiece with straight sides) firmly while work is done on the workpiece.

FIG. 1A is non-limiting, exemplary illustration of a conventional vise 100 with two jaws 102 that are holding an adapter 104 (detailed below) manufactured to hold an odd-shaped workpiece 106, with a workpiece 106 illustrated as leaning against adapter 104. FIG. 1B illustrates the same, but with workpiece 106 secured to adapter 104, ready for milling by milling machine 110.

In general, vise 100 may be detachably fixed onto a workbench 108 of a milling machine 110 and remains stationary while a workpiece or an adapter held by vise 100 is milled. Unfortunately, vise 100 cannot be used to hold rounded objects such as the illustrated workpiece 106 (e.g., non-polygonal shape such as oval or circular, or other odd-shapes, etc.). Obviously, the flat surfaces of jaws 102 of vise 100 coming into contact to grip the rounded object (e.g., workpiece 106) would bend the rounded workpiece.

If a rounded or odd-shaped workpiece is to be milled, an adapter (or a workpiece holding fixture) such as adapter 104 must first be manufactured that can securely hold the rounded workpiece, with the adapter itself held firmly by a vise. In the exemplary instance illustrated in FIGS. 1A and 1B, adapter 104 was manufactured first specifically for and in view of workpiece 106 to securely hold workpiece 106.

Workpiece 106 has an odd-shape that is similar to a frustum of hollow circular cone, with radial curved surfaces. As illustrated, adapter 104 may be engineered to have a topographical surface best suited for griping or holding surfaces of workpiece 106. Nonetheless, as illustrated, adapter 104 is firmly held by vise 100, with workpiece 106 mounted securely on adapter 104 to enable a milling machine to work on workpiece 106.

In general, the adapter (any adapter) manufactured must be specifically designed for a particular workpiece (in terms of shape, size, engineering tolerances, etc. of the workpiece) and as importantly, for a particular milling work to be done on that workpiece by the milling machine. For example, even if a new workpiece has the exact shape as that of workpiece 106, but larger in size, obviously a new adapter must be designed to hold the larger sized new workpiece.

If a different workpiece is to be worked on or a different milling work is to be performed (even on the same workpiece), in most cases a new adapter must be specifically designed and manufactured for that new workpiece and or for the new milling work for an existing workpiece. As another example, if milling is required on the back side of existing workpiece 106, then again, a new adapter must be designed to hold the same workpiece 106 in reverse (e.g., back side up) to mill the back side of workpiece 106.

Of course, as detailed below, manufacturing an adapter to hold a specific rounded or peculiar-shaped workpiece and or for a specific milling work is extremely time consuming, labor intensive, and costly. In fact, in some cases, it may take a longer time to engineer and manufacture a new adapter than the time it takes for the actual milling work to be performed on the workpiece to develop an end product.

The adapter developed must be configured to be securely held by the vise and further, itself securely hold the workpiece. Additionally, the adapter must be precisely engineered with tight tolerances to allow for manufacturing tolerances of the workpiece (end product). In other words, the adapter should be designed with such precision that would enable the workpiece to be milled within acceptable tolerances allowed by the parameters of the end product. Simply stated, the adapter must accommodate (and even match) the tight engineering tolerances of the workpiece itself.

Additionally, the adapter must be comprised of a type of material (e.g., soft material, hard material, etc.) that is generally commensurate in properties with that of the workpiece. In general, it is best practice if the adapter is comprised of the same material (is as strong and rigid) as the workpiece.

Accordingly, in light of the current state of the art and the drawbacks to current vise units used in milling machines that require a separate adapter for securing a non-polygonal (e.g., rounded or other odd-shaped) objects, a need exists for a hybrid holding device in a form of a multi-jaw vise that would securely hold different shaped objects (including polygonal types) to thereby eliminate the need for an adapter in most cases. Additionally, a need exists for a hybrid holding device in a form of a multi-jaw vise that would be used for different milling work to be performed on the same or different objects without much modifications (if any) to also thereby eliminate the need for additional adapters.

BRIEF SUMMARY OF THE INVENTION

A non-limiting, exemplary aspect of an embodiment of the present invention provides a hybrid holding device used in a milling machine, comprising:

a base with mounting structures for detachably fastening the hybrid holding device securely onto a workbench of the milling machine in a fixed stationary position;

a moveable multi-jaw assembly that includes at least three jaws that directly receives and securely holds a workpiece without an adapter;

a handle associated with the multi-jaw assembly for tightening the holding grip against the workpiece.

Another non-limiting, exemplary aspect of an embodiment of the present invention provides a hybrid holding device used in a milling machine, comprising:

a base with a mounting structure for detachably securing the hybrid holding device in a fixed stationary position directly onto a workbench of the milling machine;

a drive mechanism; and a moveable multi-jaw assembly that includes at least three jaws that adjustably move in unison to one of a tightening or a releasing positions by the drive mechanism.

Still a further non-limiting, exemplary aspect of an embodiment of the present invention provides a hybrid holding device used in a milling machine, comprising:

a movable multi-jaw assembly that includes at least three jaws that move in unison to one of a tightening or a releasing position;

a drive mechanism that actuates the multi-jaw assembly; and a body having a base with a mounting structure for detachably securing the hybrid holding device in a fixed stationary position directly onto a workbench of the milling machine.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 8A to 8E-2 are non-limiting, exemplary illustrations of a jaw of a multi-jaw assembly of hybrid holding device shown in FIGS. 2A to 7D in accordance with one or more embodiments of the present invention;

FIGS. 12A to 12M are non-limiting, exemplary illustrations of an actuator member and jaw in accordance with another embodiment of the present invention.

DETAILED DESCRIPTION OF THE INVENTION

Figure 1A:
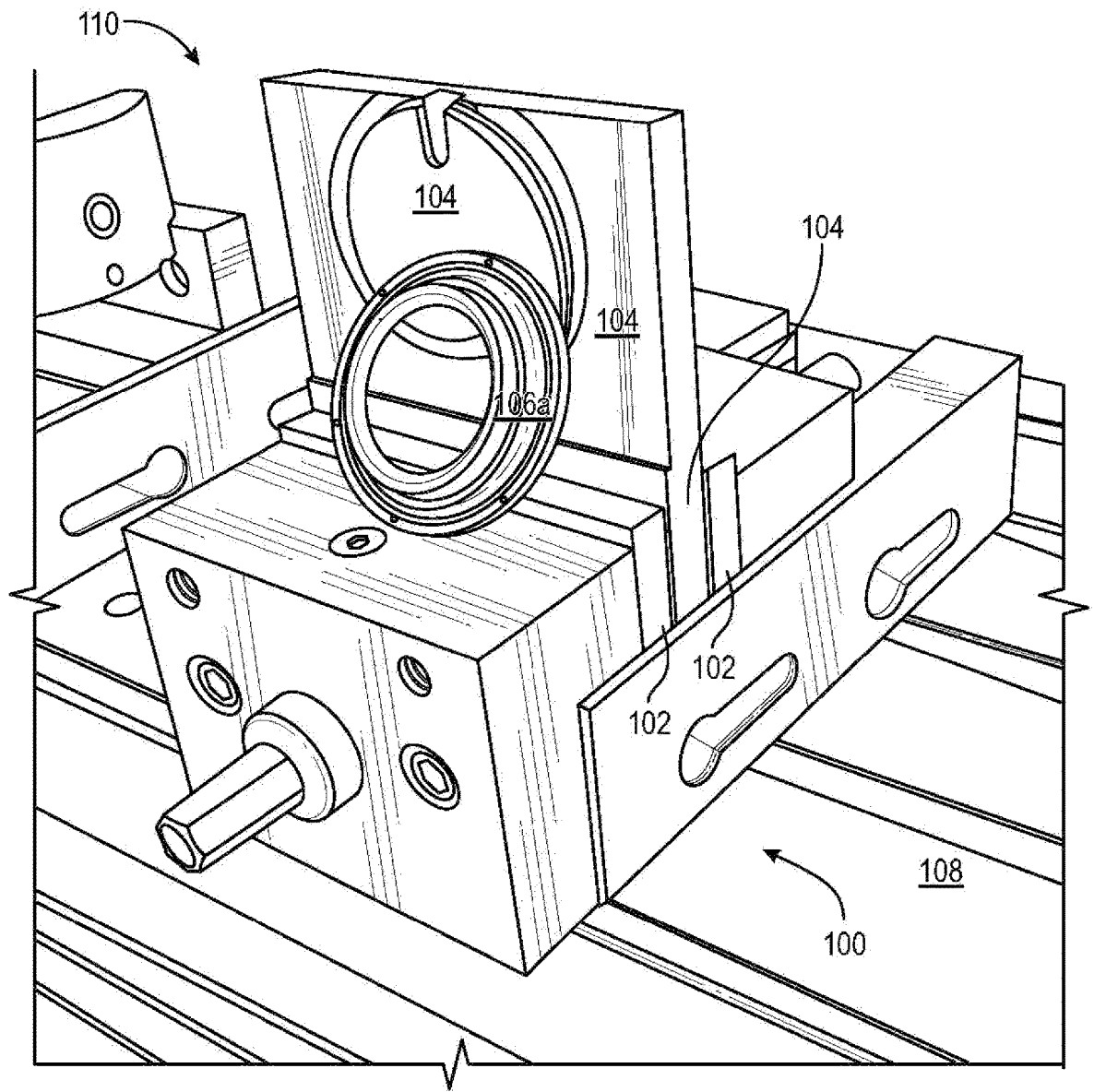
FIGS. 1A and 1B are non-limiting, exemplary illustrations of a conventional vise using an adapter to hold a workpiece using in a milling machine.
Figure 1B:
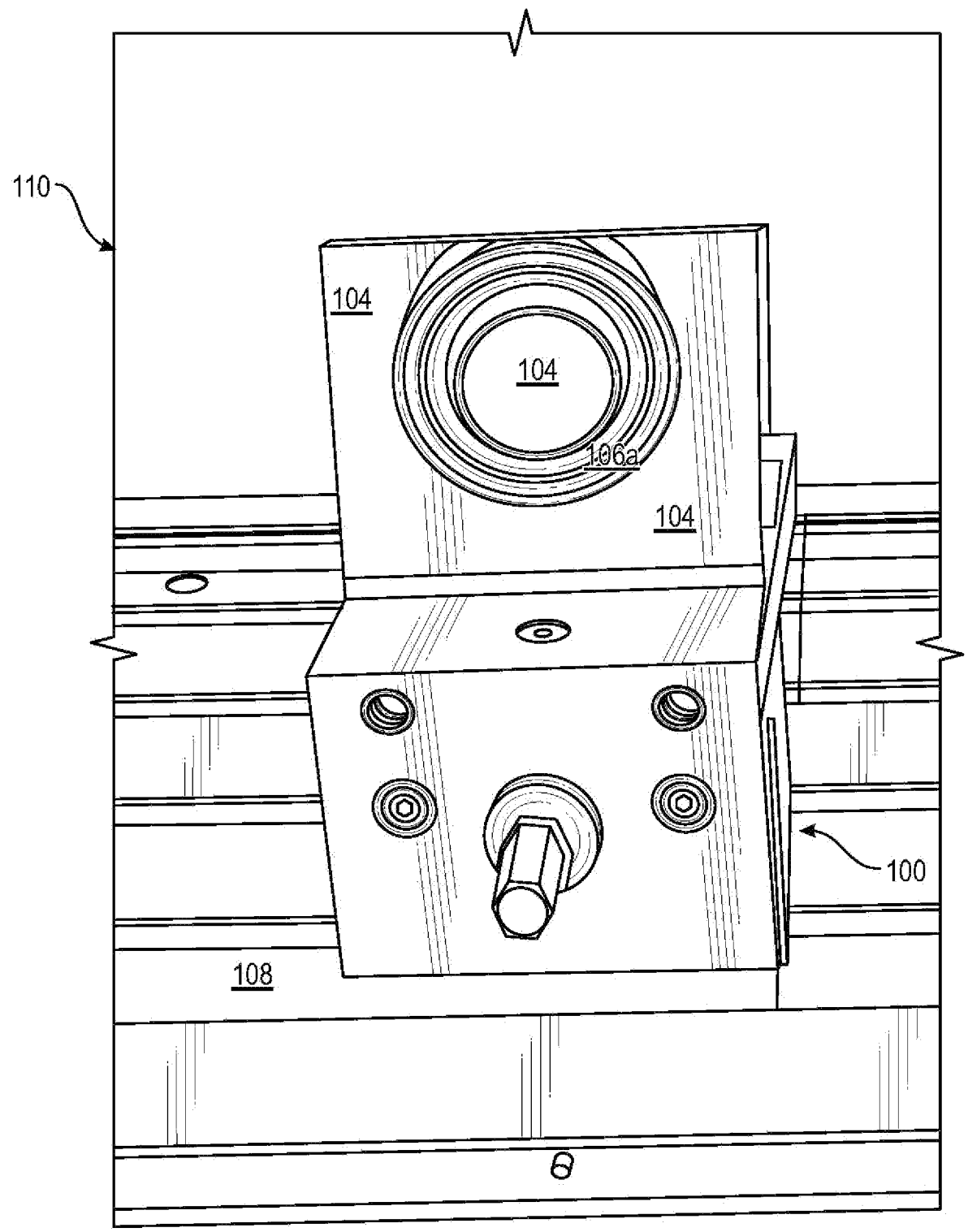
Figure 2A:
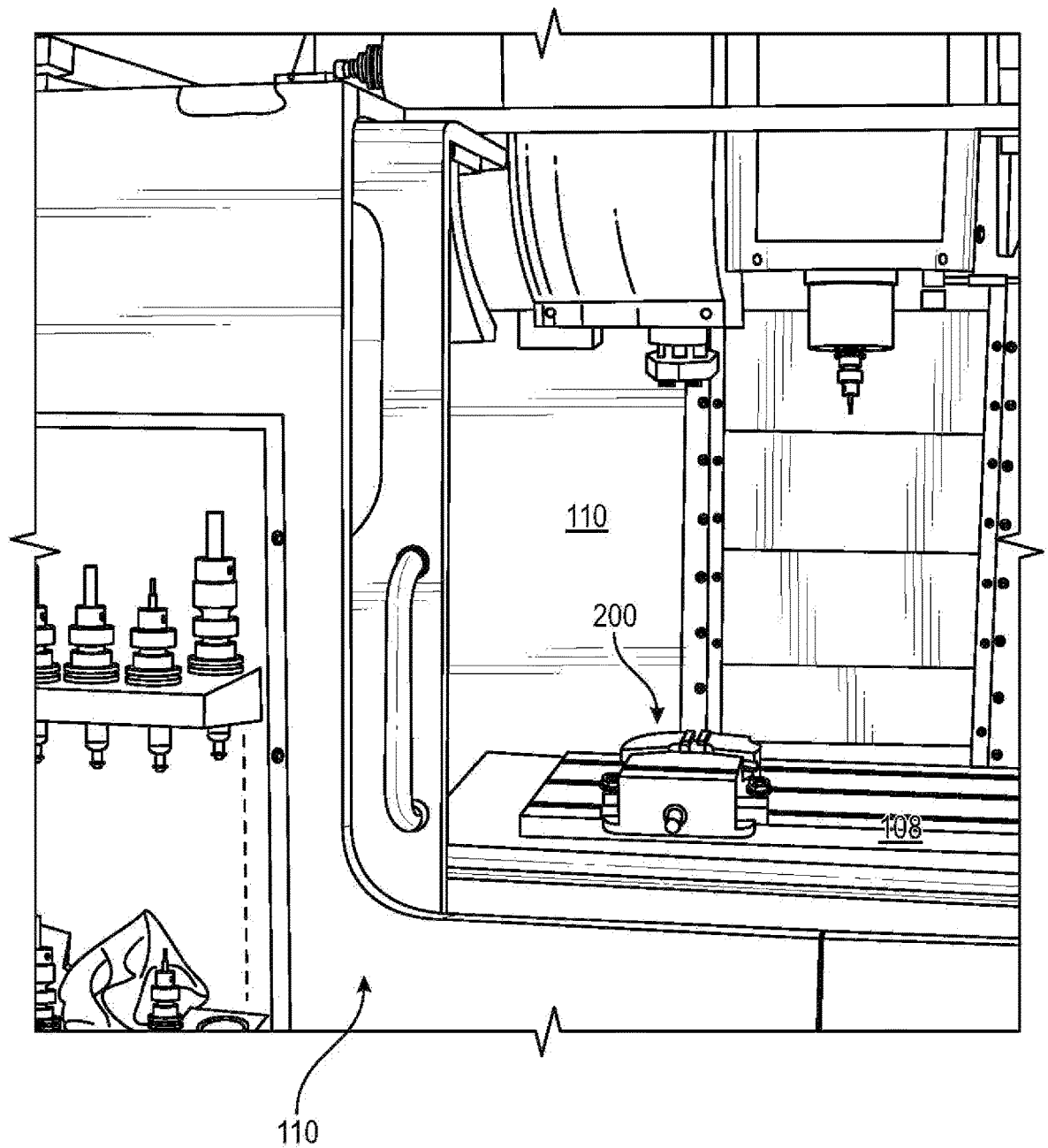
FIGS. 2A to 2H are non-limiting, exemplary illustrations of a hybrid holding device in accordance with one or more embodiments of the present invention.
Figure 2B:
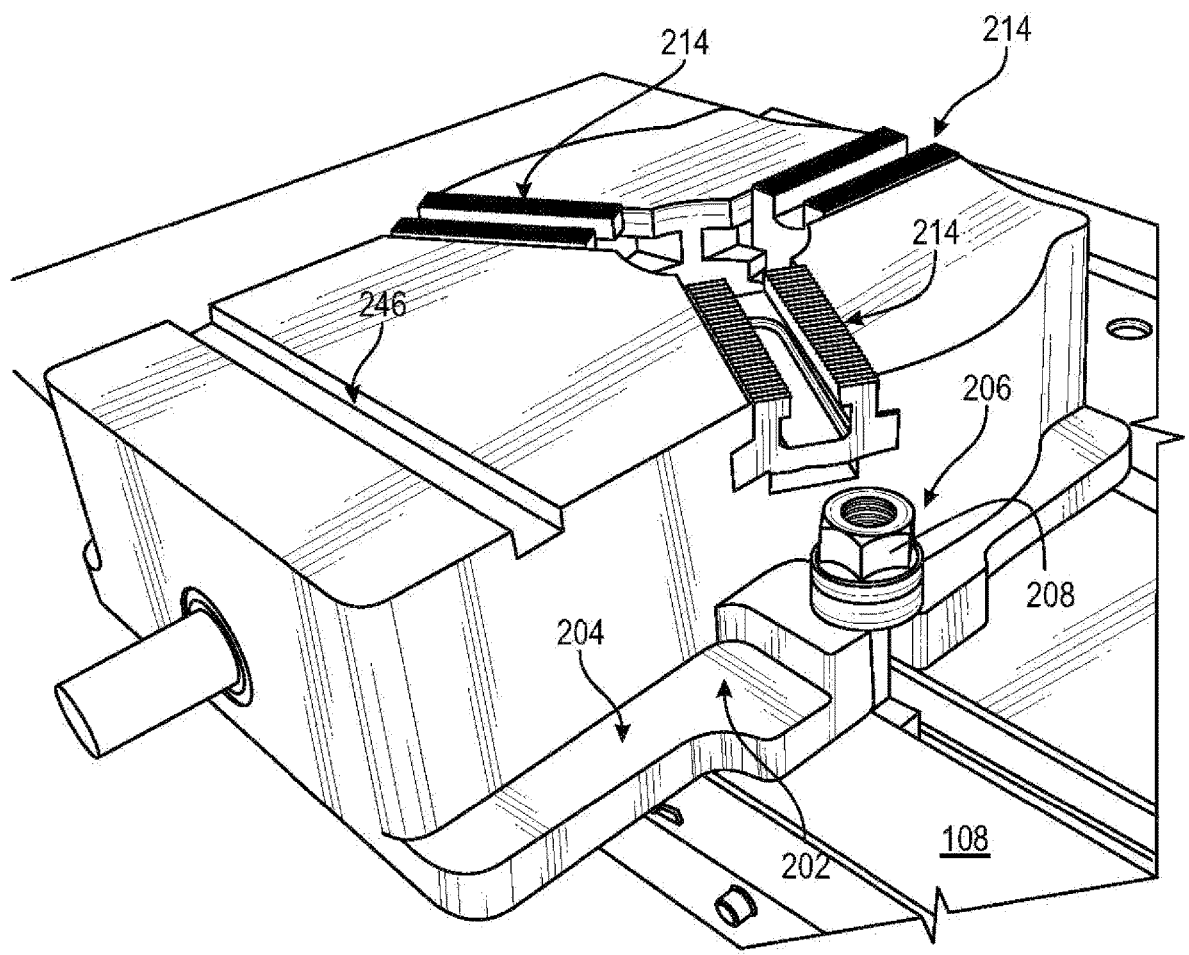
Figure 2C:
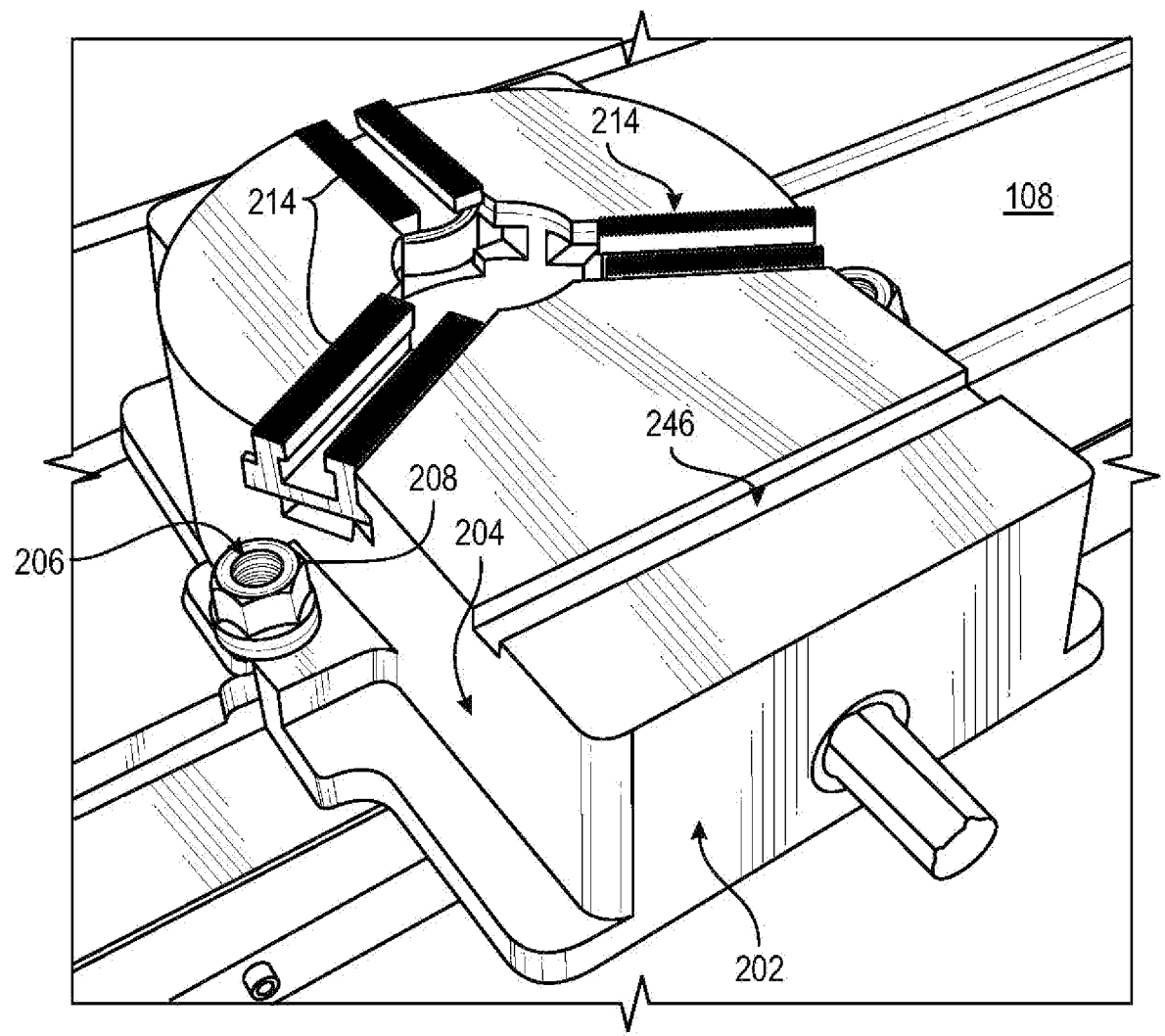
Figure 2D:
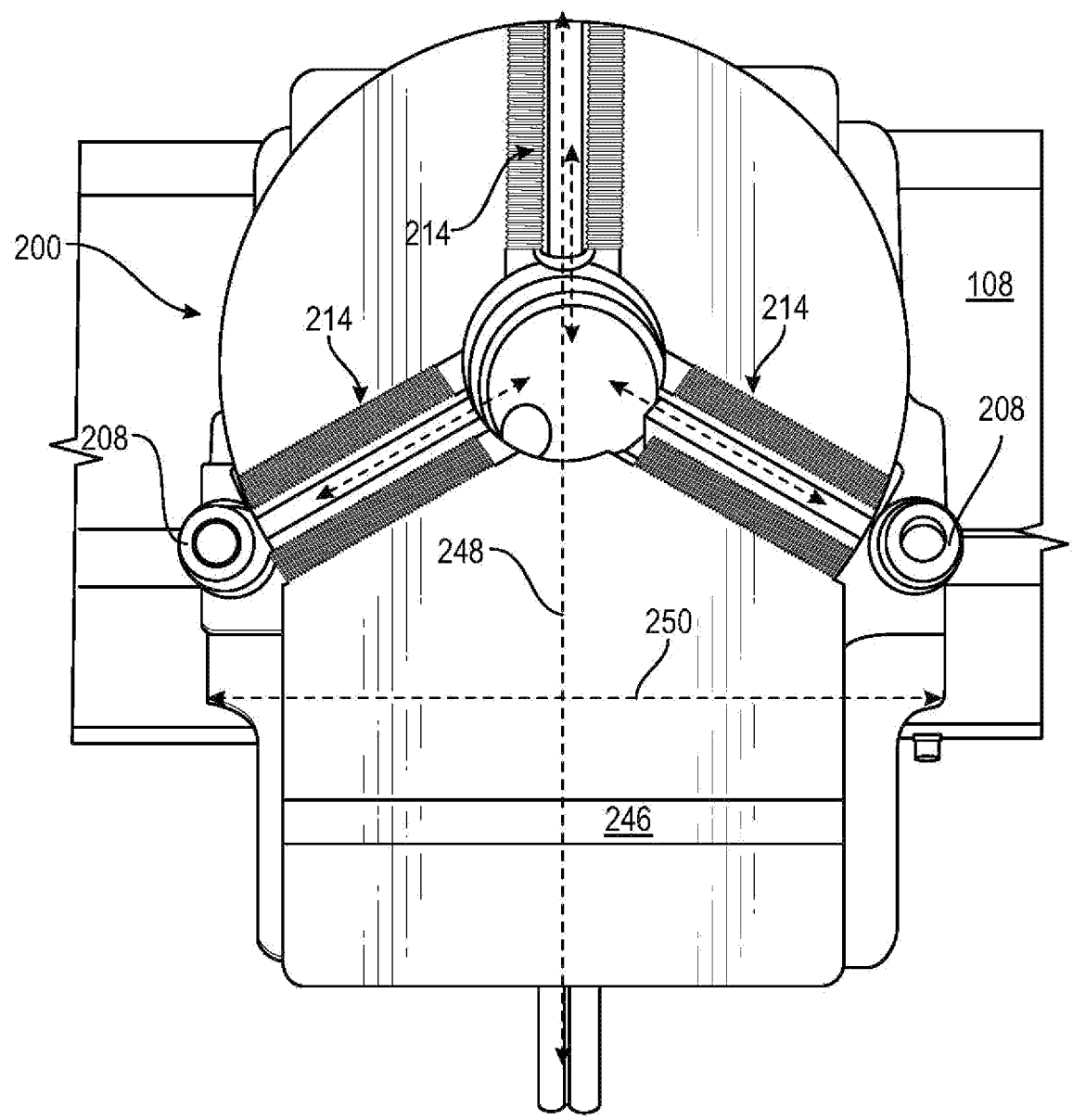
Figure 2E:
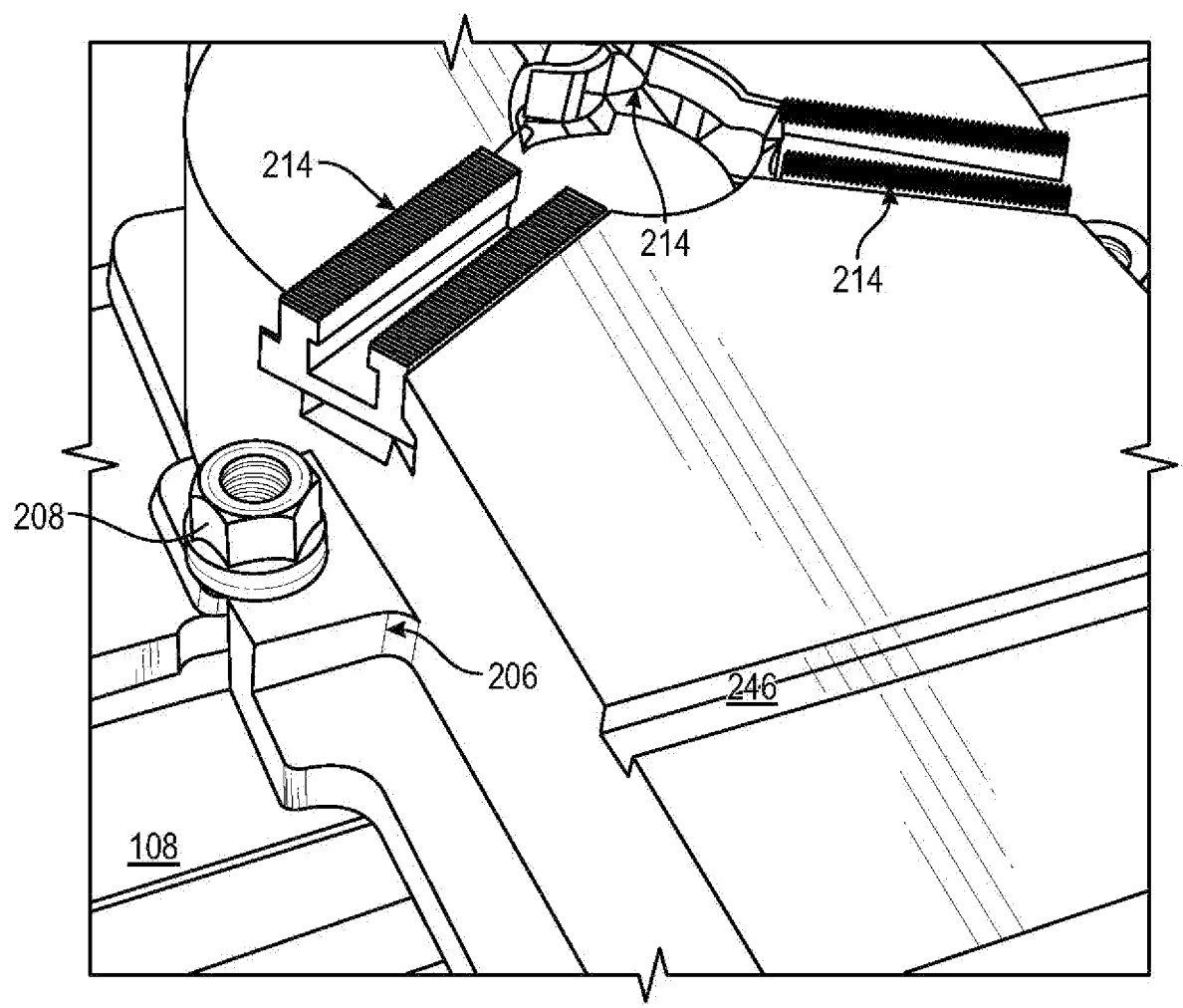
Figure 2F:
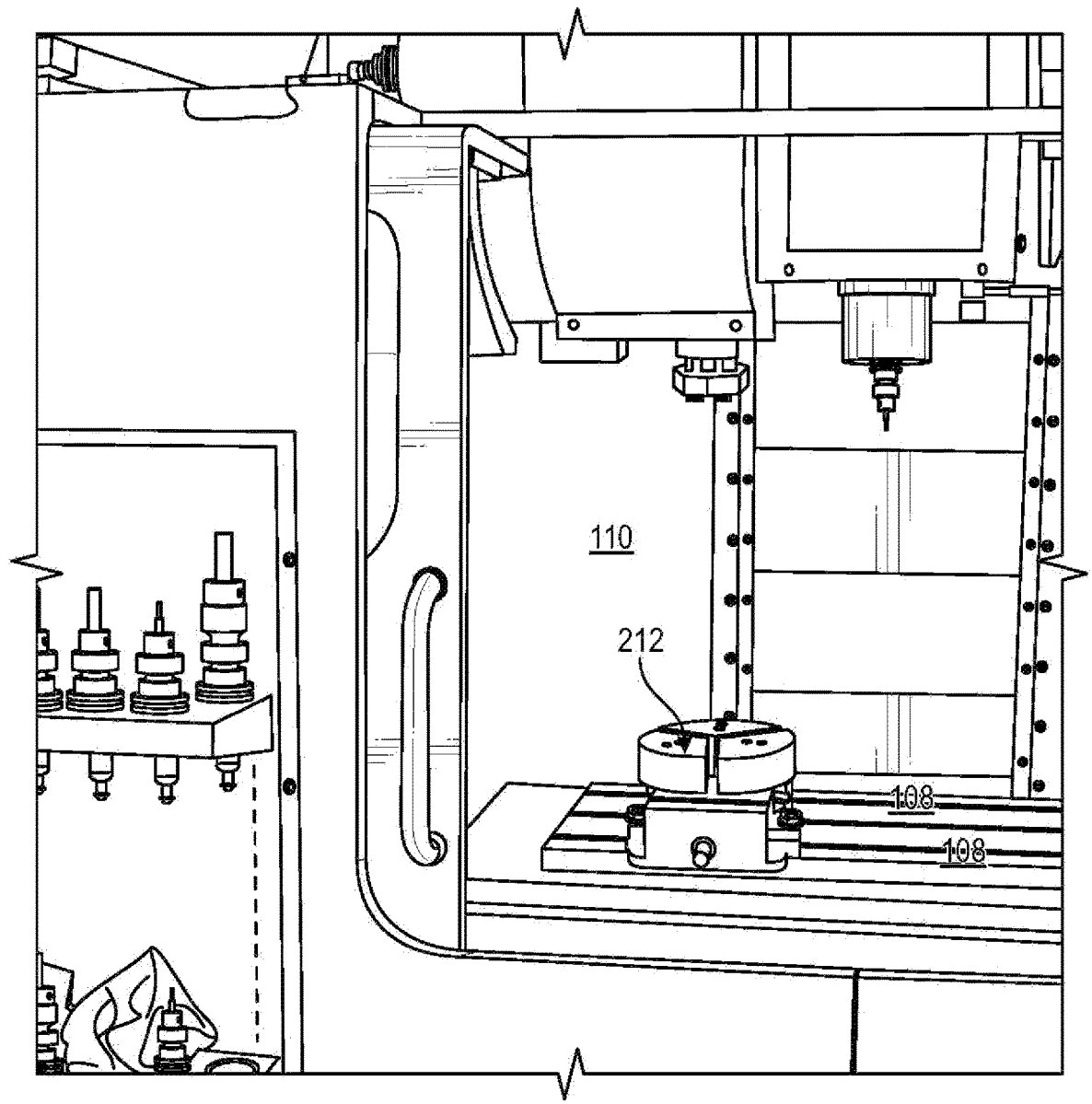
Figure 2G:
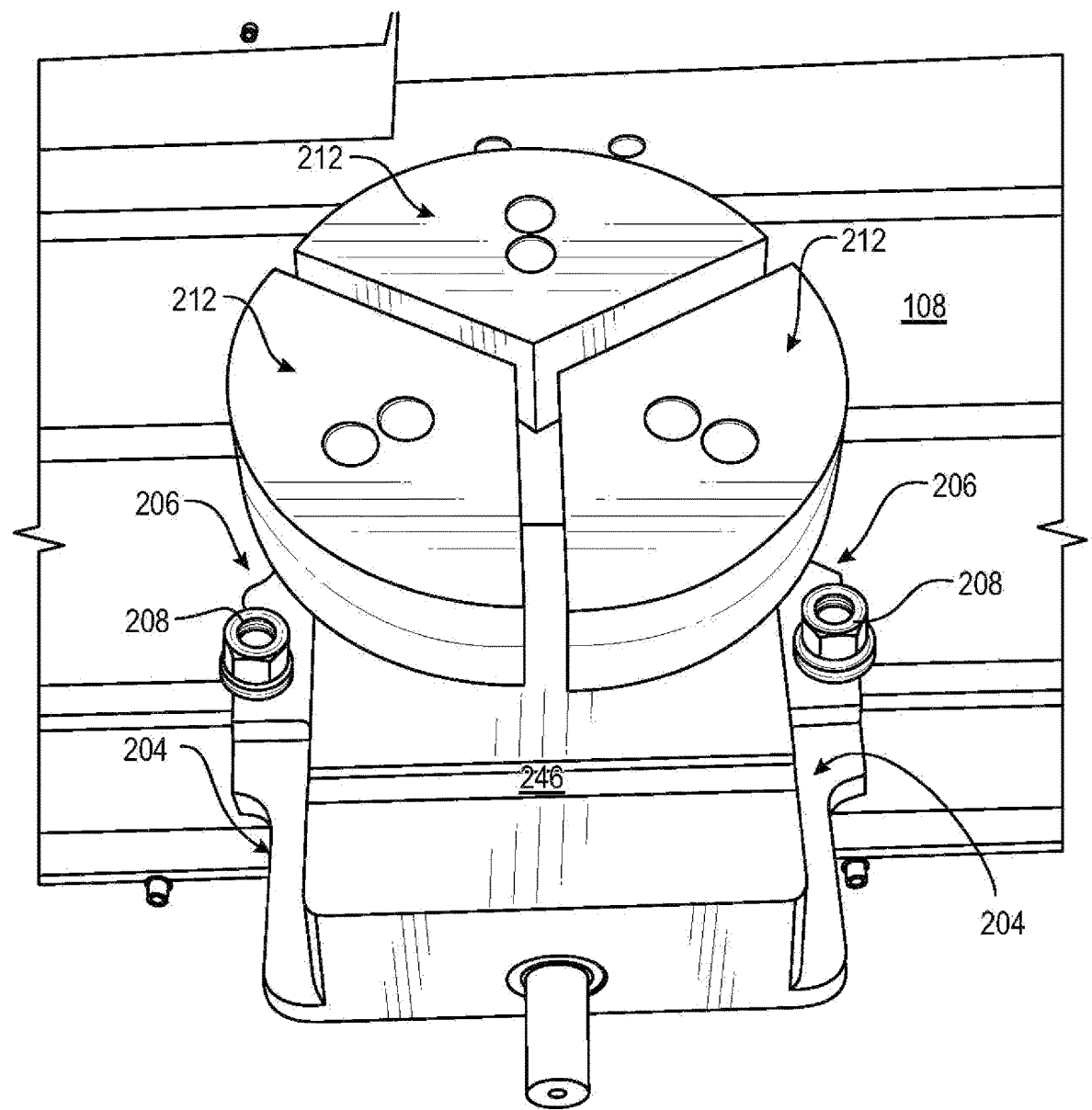
Figure 2H:
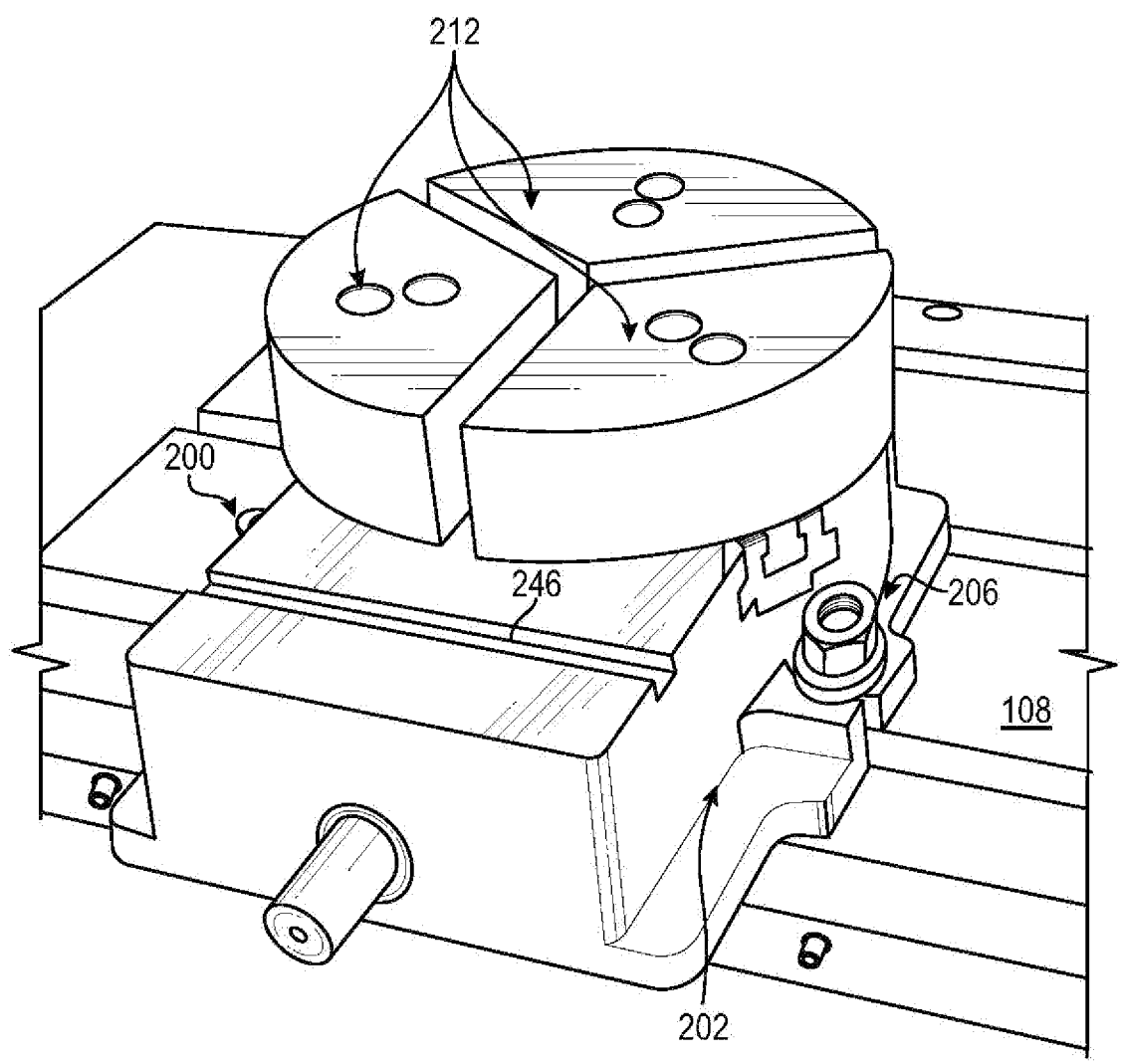

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

In the description given below and or the corresponding set of drawing figures, when it is necessary to distinguish the various members, elements, sections/portions, components, parts, or any other aspects (functional or otherwise) or features or concepts or operations of a device(s) or method(s) from each other, the description and or the corresponding drawing figures may follow reference numbers with a small alphabet character such as (for example) "working-jaws 210a, 210b, and etc." If the description is common to all of the various members, elements, sections/portions, components, parts, or any other aspects (functional or otherwise) or features or concepts or operations of a device(s) or method(s) such as (for example) to all working-jaws 210a, 210b, etc., then they may simply be referred to with reference number only and with no alphabet character such as (for example) "working-jaw 210."

The present invention defines the term workpiece as an object being worked on with a tool or machine. Accordingly, throughout the disclosure the terms workpiece and object may sometimes be used interchangeably.

The present invention defines the term polygonal object as a workpiece with straight sides.

The present invention defines a vise as a stationary metal tool with two movable flat jaws that are used to hold a polygonal workpiece firmly in place while work is done on the workpiece, with the vise detachably attached to a workbench.

The present invention defines a chuck as a rotating or non-stationary device for holding a rounded workpiece in a lathe or a tool in a drill, typically having three or four jaws that move radially in and out.

The present invention defines a jaw as the gripping part, member, or unit of a tool or machine.

One or more embodiments of the present invention provide a hybrid holding device that in most cases eliminates the need for an adapter for holding polygonal and or non-polygonal (e.g., rounded or odd shaped) workpieces.

The hybrid holding device in accordance with one or more embodiments securely holds different rounded or odd-shaped objects (including polygonal, if need be) and further, may be used for different milling work to be performed on the workpieces (polygonal and non-polygonal) without much modifications (if any) to thereby eliminate the need for an adapter in most cases.

One or more embodiments of the present invention provide hybrid holding device in a form of a multi-jaw vise (three or more jaws) that securely holds different shaped objects (including polygonal types) to thereby eliminate the need for an adapter in most cases.

Additionally, one or more embodiments of the present invention provide a hybrid holding device in a form of a multi-jaw vise (three or more jaws) used for different milling work to be performed on the same or different objects without much modifications (if any) to also thereby eliminate the need for additional adapters.

FIGS. 2A to 2H are non-limiting, exemplary illustrations of a hybrid holding device in accordance with one or more embodiments of the present invention. As illustrated in FIGS. 2A to 2H, in order to operate hybrid holding device 200, it must first be secured onto a workbench 108 of a milling machine 110 (detailed below).

As illustrated, hybrid holding device 200 has a body 202 that has a base 204 with a mounting structure 206 (detailed below) for detachably securing hybrid holding device 200 in a fixed stationary position directly onto workbench 108 of milling machine 110 using well-known securing components 208.

The method of mounting and the tools to mount and secure hybrid holding device 200 is in the same manner as conventional vises used in milling machine 110. Accordingly, no new skills are required to mount and secure hybrid holding device 200 by a user.

Next, a set blank-jaws 212 (shown in FIGS. 2F to 2H and further detailed below) is securely mounted on hybrid holding device 200. That is, next step is to secure a corresponding set of blank-jaws 212 onto a corresponding set of actuator members 214 (detailed below) of hybrid holding device 200. Mounting details of blank-jaws 212 are detailed below. A blank-jaw 212 is a jaw with a plain surface or a surface unrelieved by features in terms of grip surfaces as shown.

Of course, in order to securely grip workpieces 106 for milling, blank-jaws 212 must first be milled to provide corresponding engagement (or grip) surfaces in view of workpieces 106 to be milled.

Modifying (i.e., milling) the set of blank-jaws 212 in view of holding surfaces of different shaped/size one or more workpiece 106 (for example), results in a set of working-jaws 210, non-limiting, exemplary instances of which are shown in FIGS. 3A to 4G-2.

FIGS. 3A to 3G are a non-limiting, exemplary illustration of hybrid holding device 200 with a first set of working-jaws 210a in accordance with one or more embodiments of the present invention. As further detailed below, FIGS. 4A to 4G-2 are a non-limiting, exemplary illustration of hybrid holding device 200 with a second set of working-jaws 210b in accordance with one or more embodiments of the present invention.

Figure 3A:
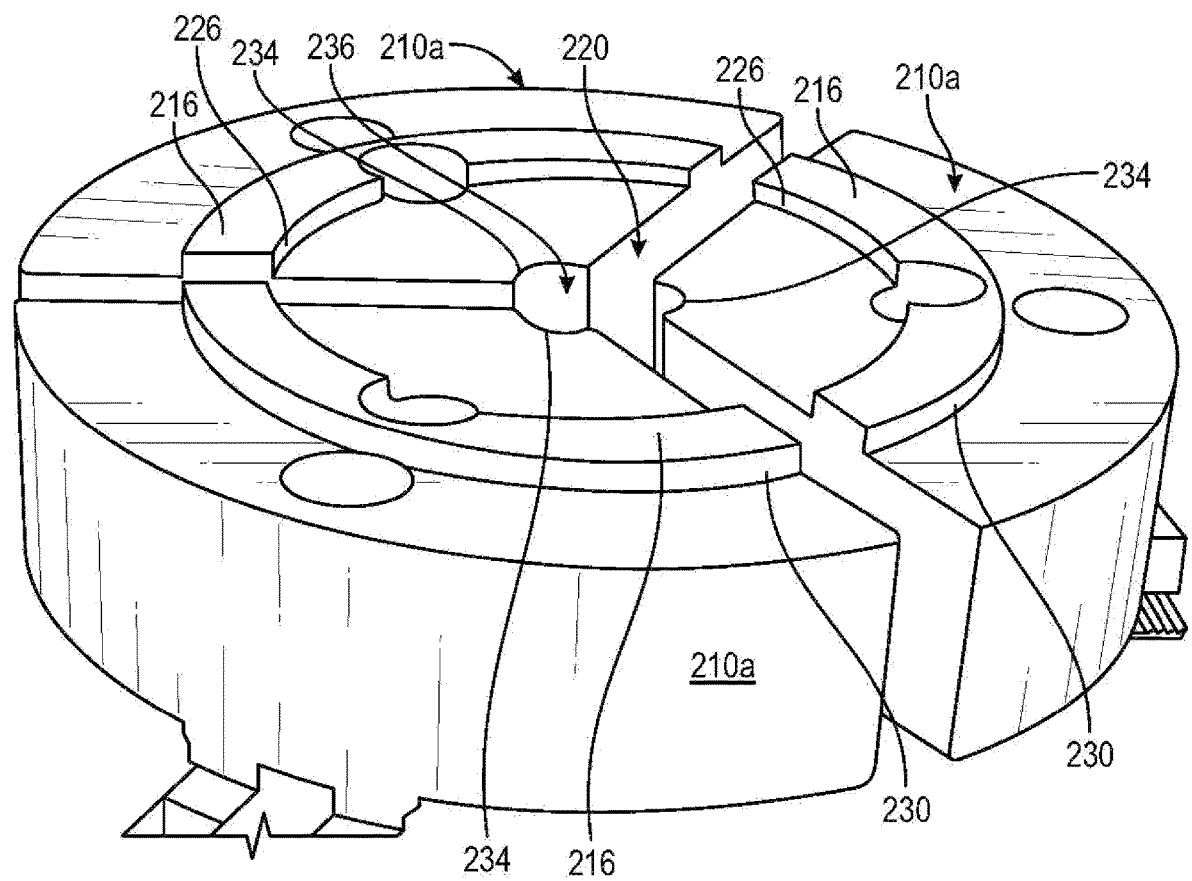
FIGS. 3A to 3G are a non-limiting, exemplary illustration of hybrid holding device shown in FIGS. 2A to 2H with a first set of working-jaws in accordance with one or more embodiments of the present invention.
Figure 3B:
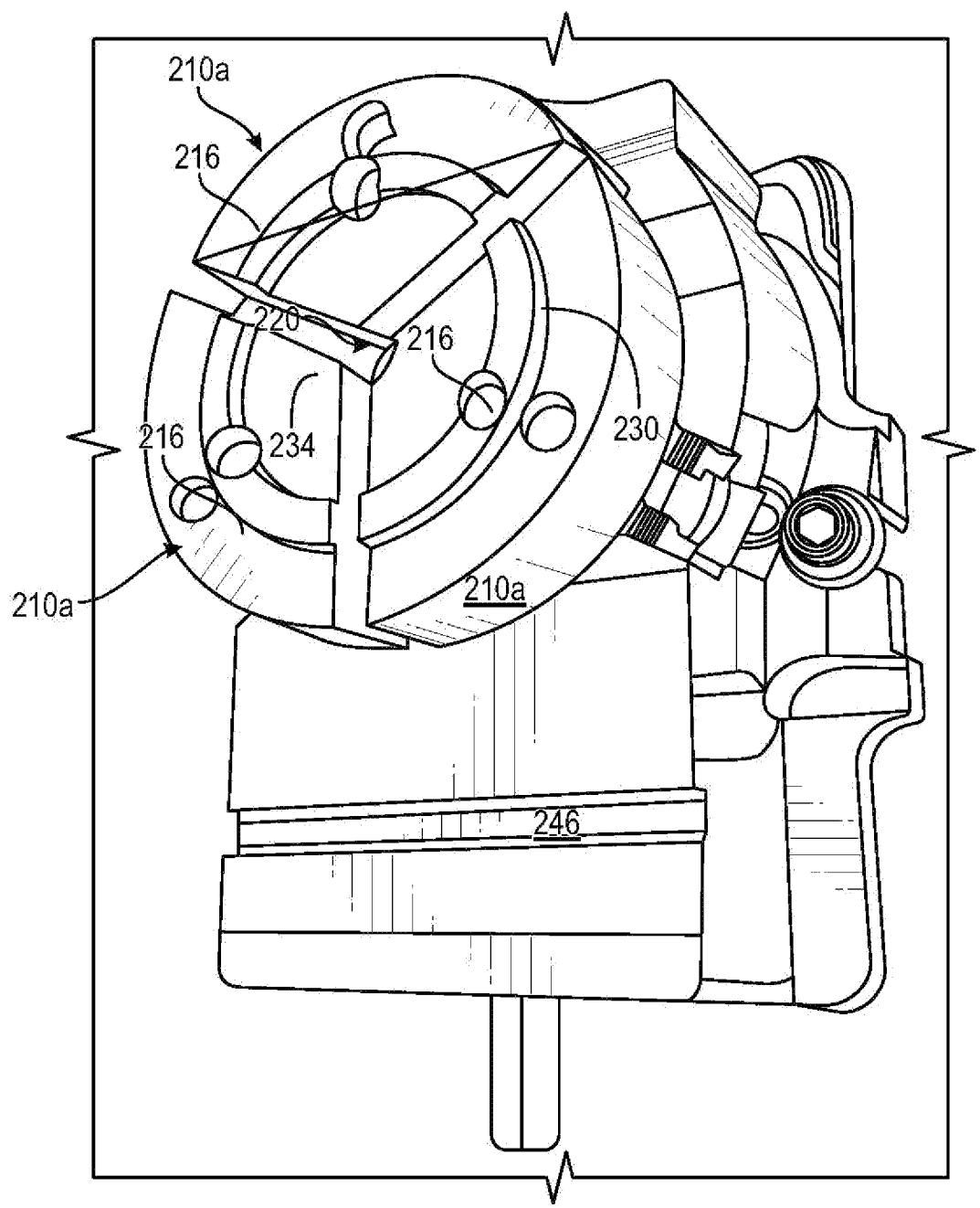
Figure 3C:
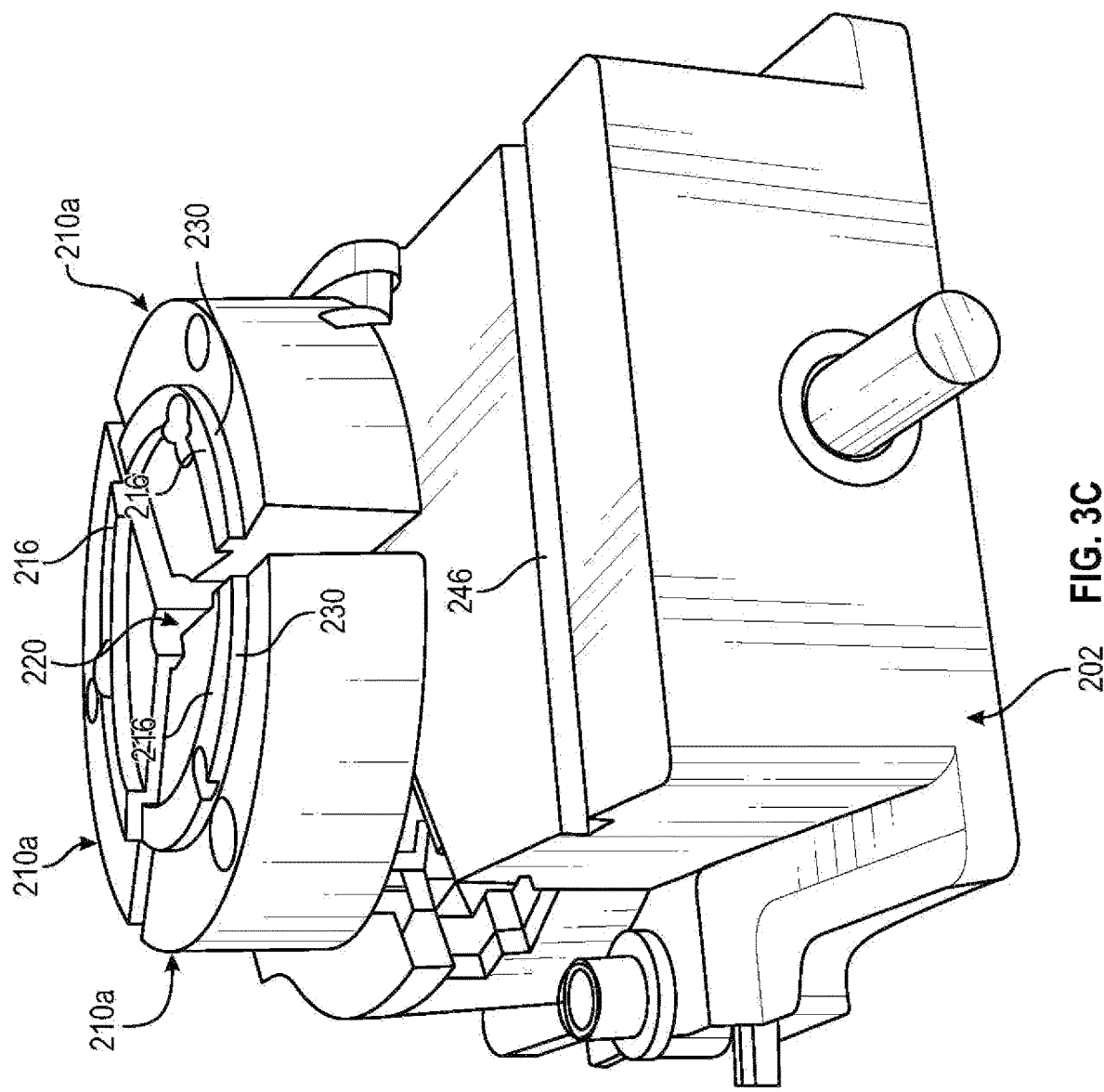

FIG. 3A is a non-limiting, exemplary illustration of the first set of working-jaws 210a for the first set of workpieces 106a, 106b, 106c, 160d (FIGS. 3D-1 to 3G) milled from the first set of blank-jaws 212. FIGS. 3A to 3C illustrate hybrid holding device 200 with the first set of working-jaws 210a, but with no workpiece 106.

With the present invention, a single set of blank jaws 200 may be modified in view of several different shape/size workpieces 106 (as detailed below). For example, blank-jaws 212 may be milled to form working-jaws 210a (FIGS. 3A to 3G), which may hold workpiece 106a (FIGS. 3D-1 to 3D-3), workpiece 106b (FIGS. 3E-1 and 3E-2), workpiece 106c (FIGS. 3F-1 to 3F-3), and workpiece 106d (FIG. 3G).

As further detailed below, since working-jaws 210 are moveable, different size workpieces 106 may also be used with the same working-jaws 210 without having to generate a new set of working-jaws 210 from a new set of blank-jaws 212.

Figures 1, 3D:
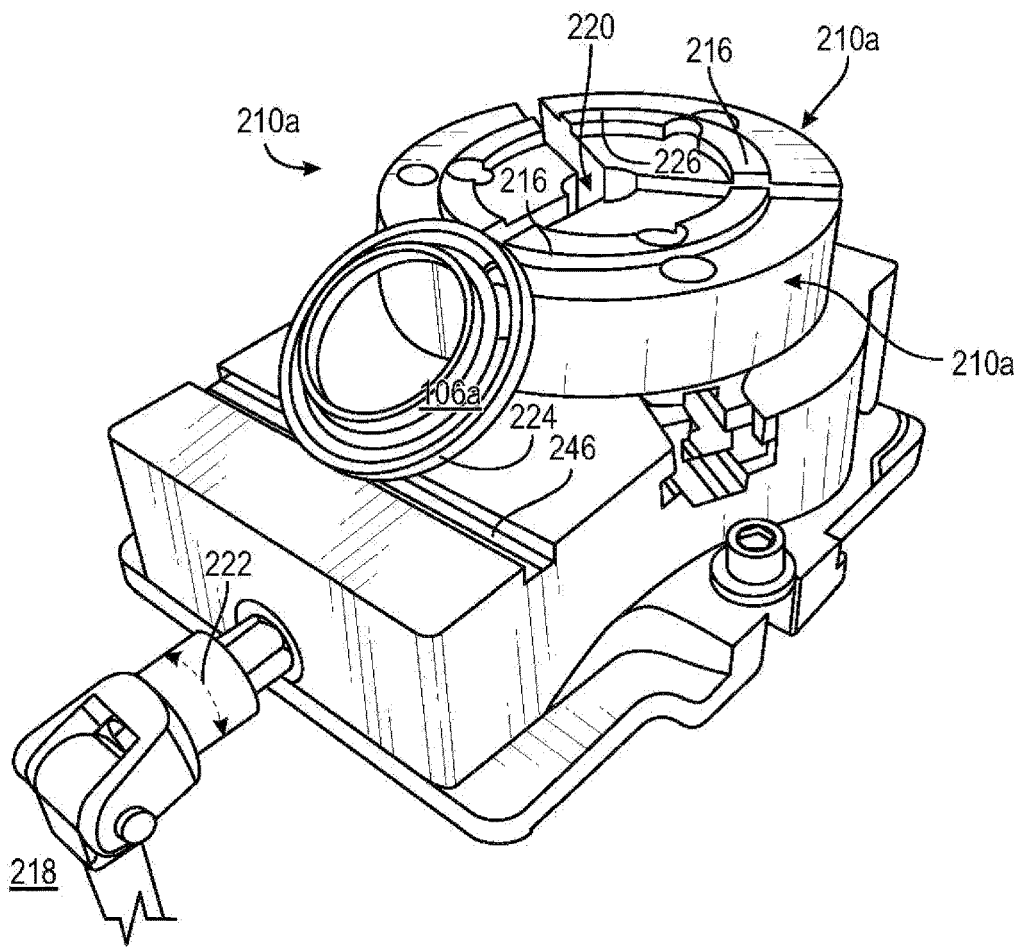
Figures 2, 3D:
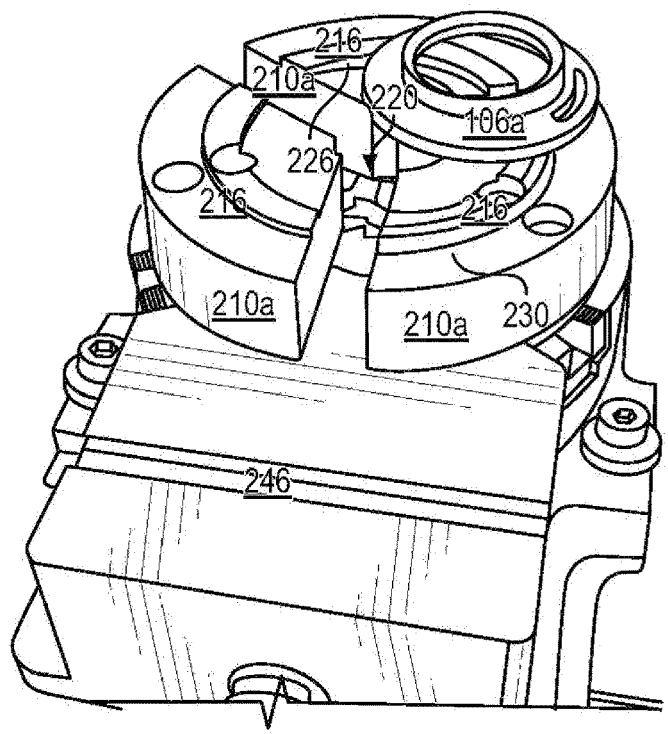
FIGS. 4A to 4G-2 are a non-limiting, exemplary illustration of hybrid holding device shown in FIGS. 2A to 3G with a second set of working-jaws in accordance with one or more embodiments of the present invention.
Figures 3, 3D:
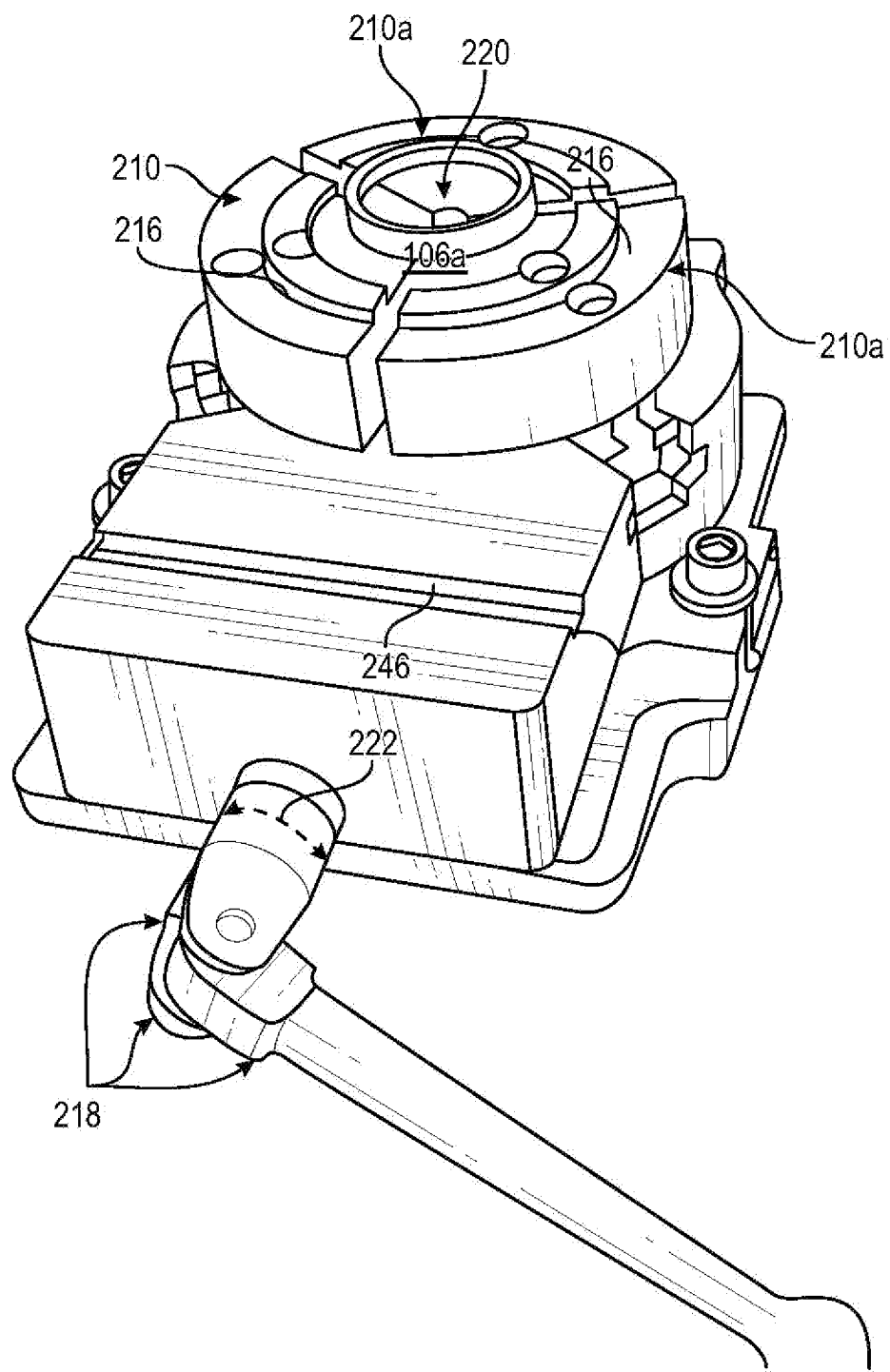
Figures 1, 3E:
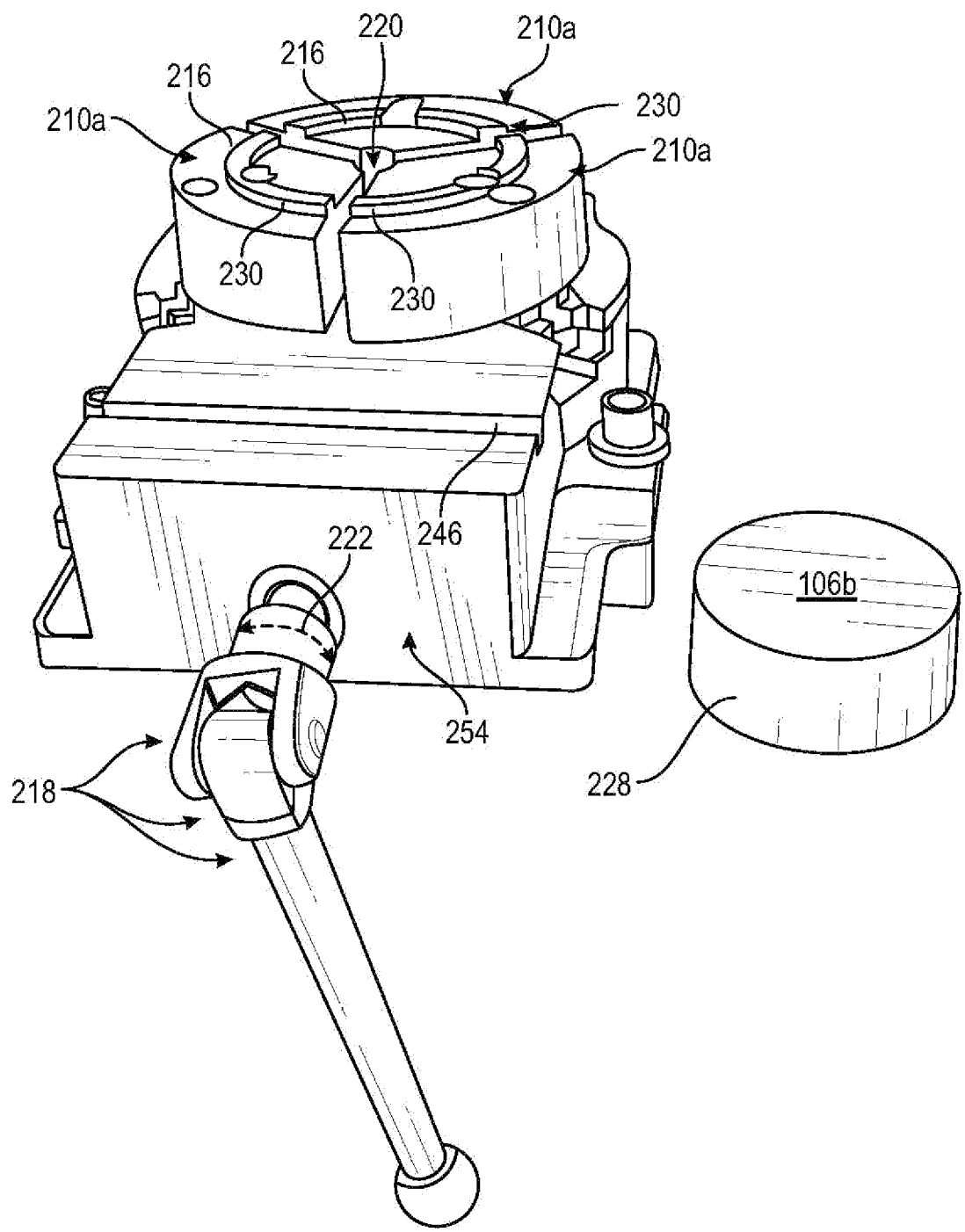
Figures 2, 3E:
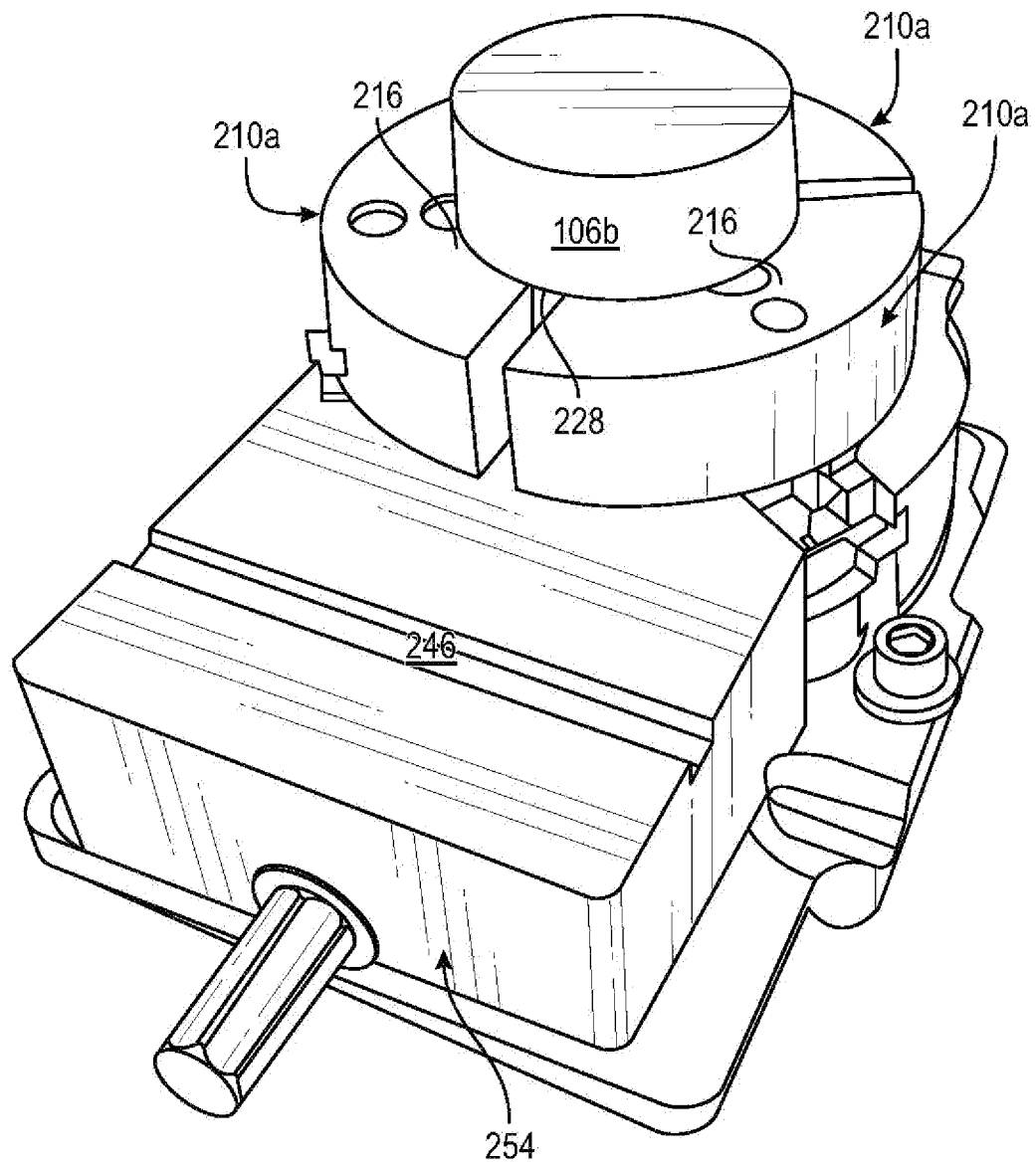
Figures 1, 3F:
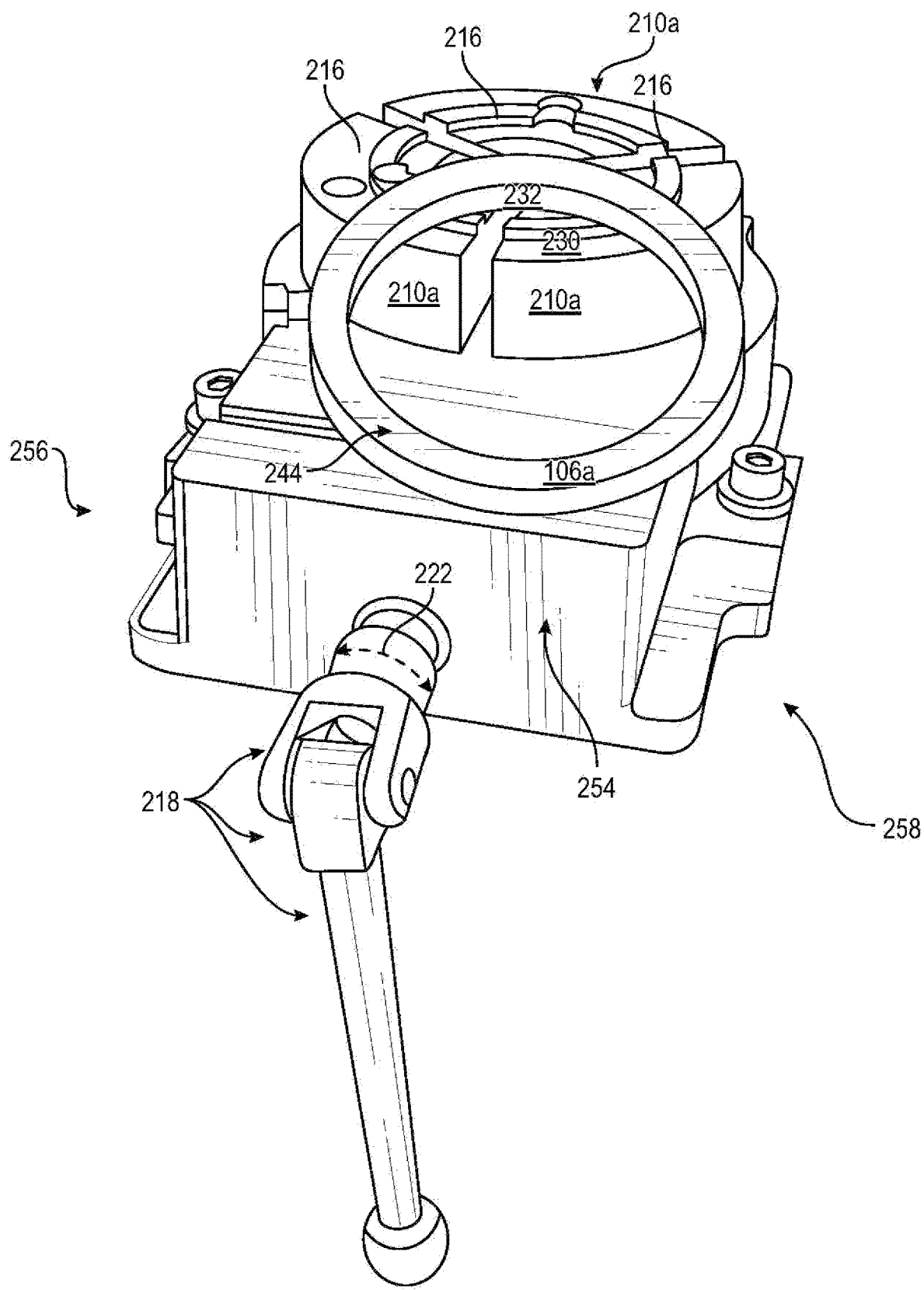
Figures 2, 3F:
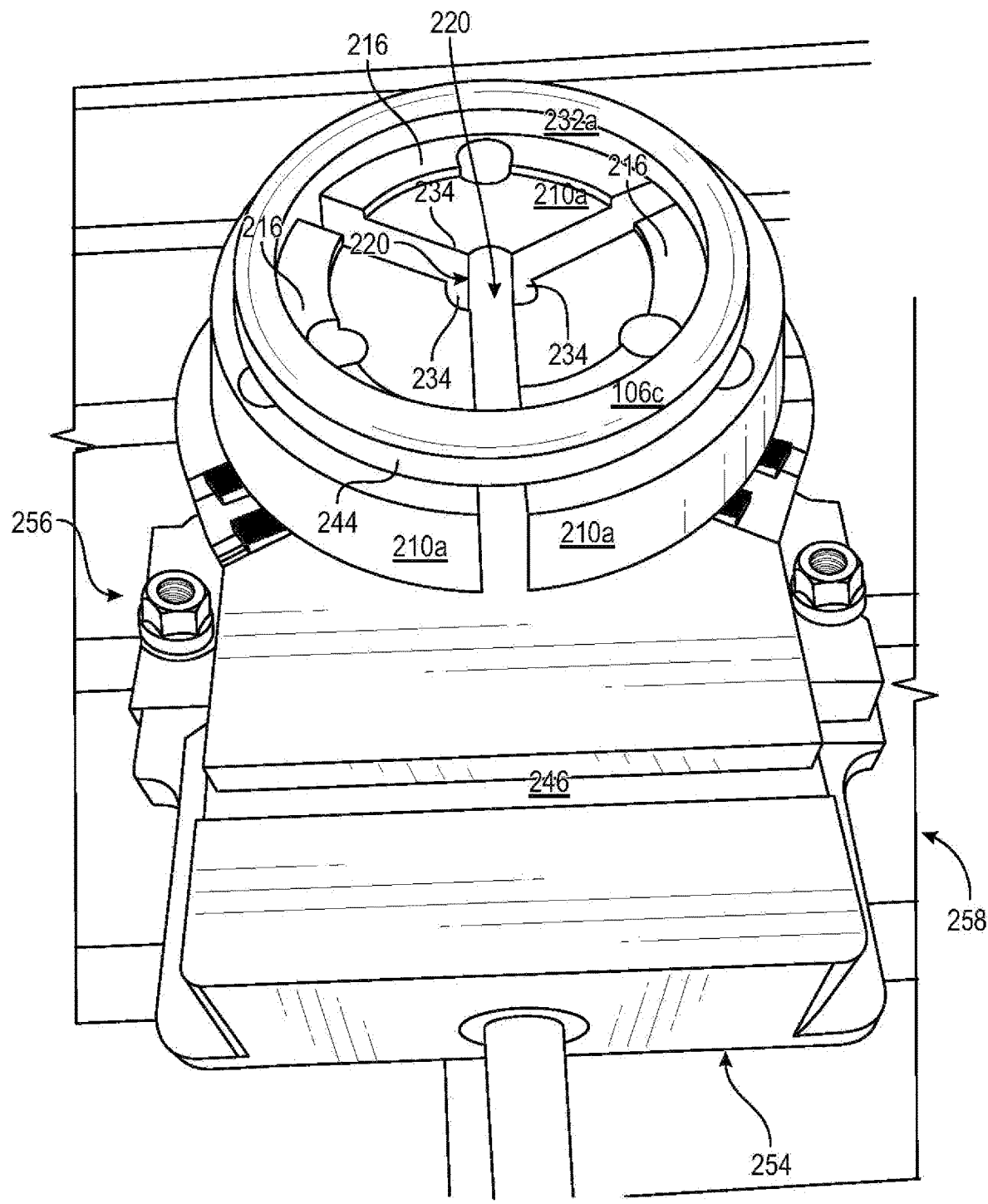
Figures 3, 3F:
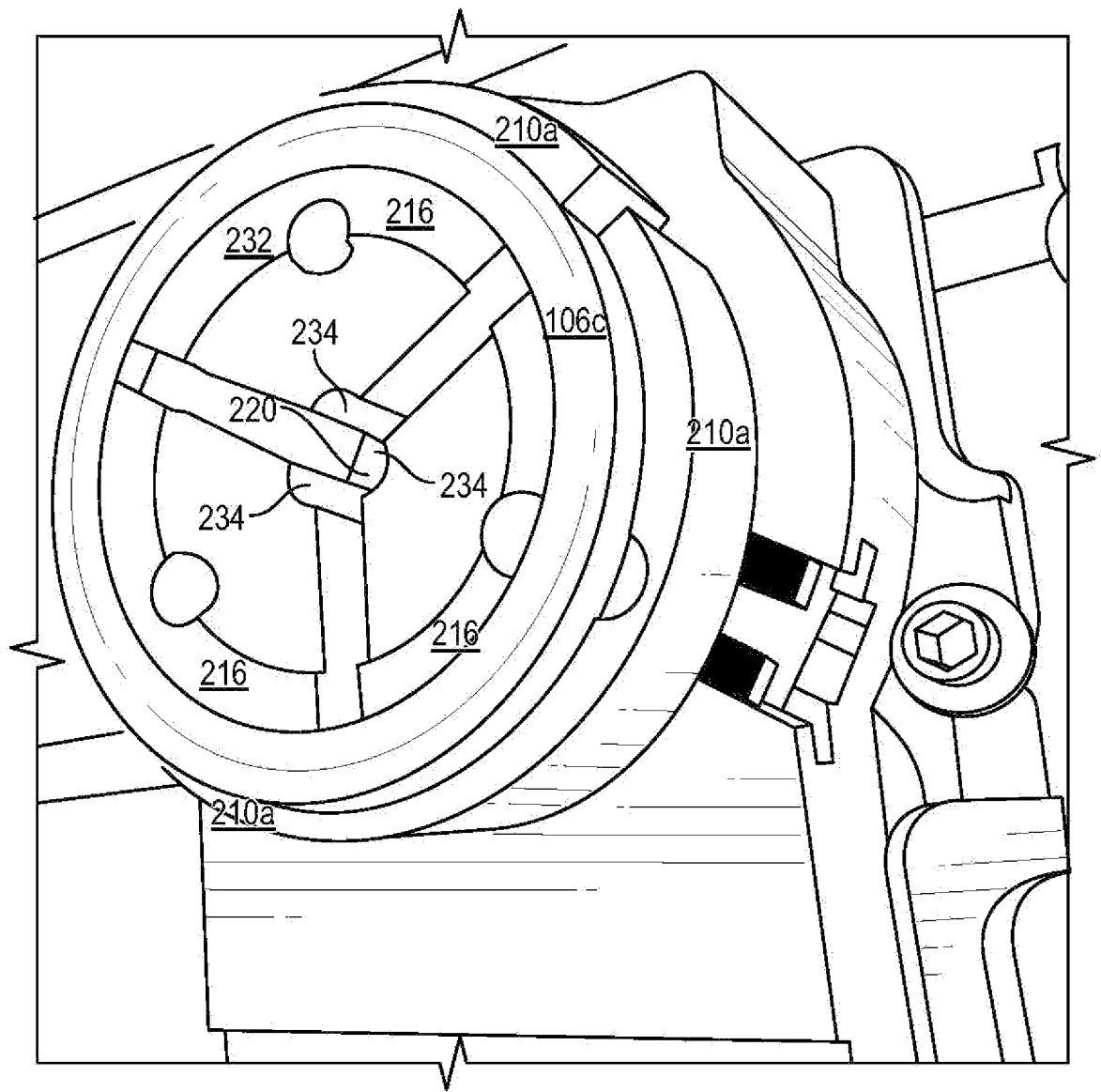
Figure 3G:
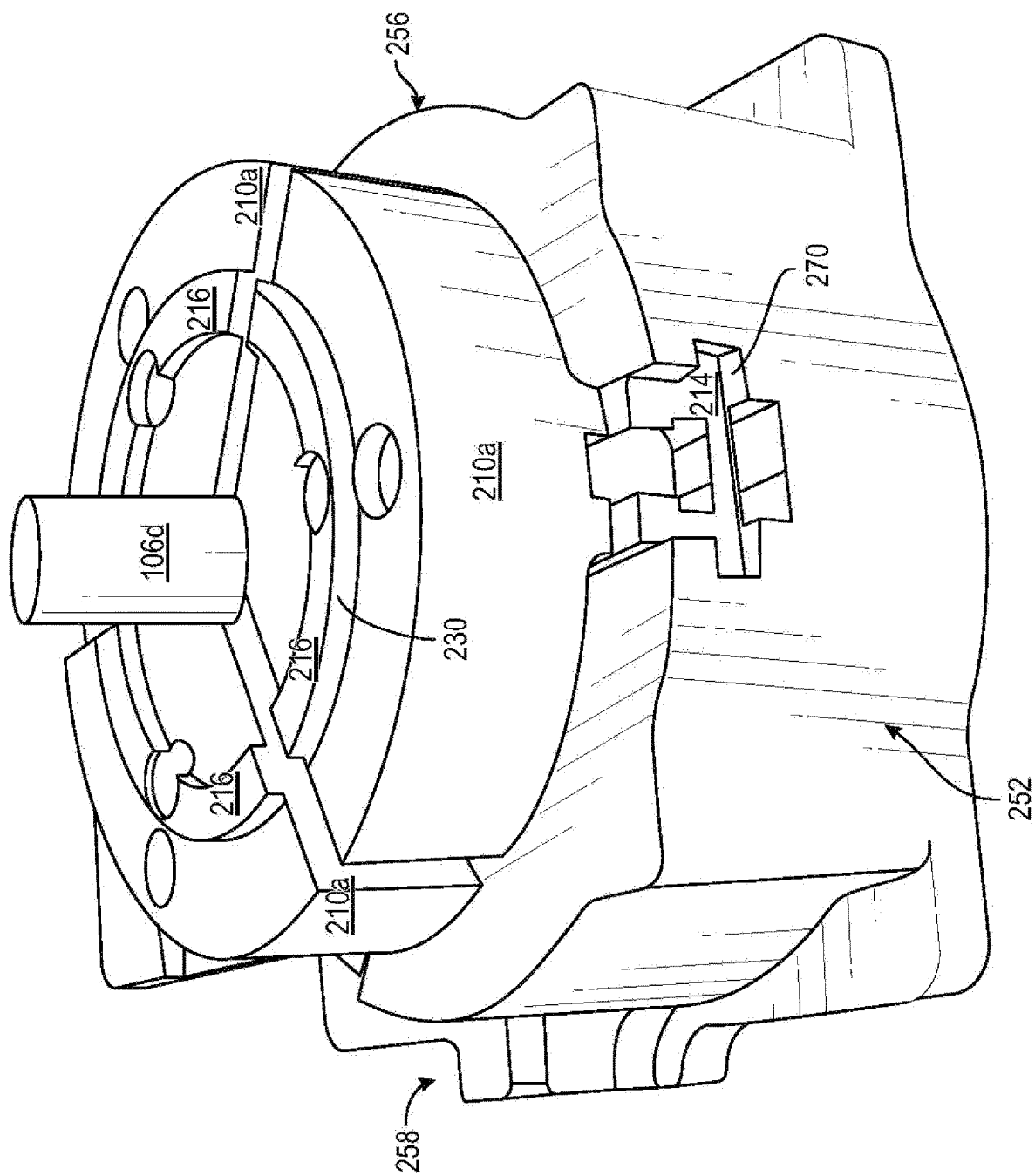

In the non-limiting, exemplary instance shown in FIG. 3A, combined working-jaws 210a form an annular protrusion 216 that may be used to grip workpiece 106a, 106b, and 106c as shown in FIGS. 3D-1 to 3G. As illustrated, annular protrusion 216 is comprised of three individual arc projection (approximately 120° degrees) formed on each separate jaw 210a that together, form an annular protrusion 216.

FIGS. 3D-1 to 3D-3 are non-limiting, exemplary illustration of hybrid holding device 200 illustrated in FIGS. 2A to 3C, progressively illustrating a non-limiting, exemplary method of mounting and securing a non-limiting, exemplary workpiece 106a. As illustrated, in this non-limiting, exemplary instance, working-jaws 210a are first radially moved away from center 220 by rotation 222 of conventional detachable handle 218 to provide sufficient space to position workpiece 106a within annular protrusion 216. Thereafter, handle 218 is rotated in the opposite direction (e.g., clockwise) 222 to radially move working jaws 210a toward center 222 to tighten grip on surface 224 of workpiece 106a. In this case, inner surfaces 226 of annular protrusion 216 grip surface 224 of workpiece 106a.

FIGS. 3E-1 and 3E-2 progressively illustrate a non-limiting, exemplary method of mounting and securing a non-limiting, exemplary workpiece 106b. In this case, inner surfaces 226 of annular protrusion 216 grip surface 228 of workpiece 106b.

FIGS. 3F-1 and 3F-2 progressively illustrate a non-limiting, exemplary method of mounting and securing a non-limiting, exemplary workpiece 106c. In this case, outer surfaces 230 of annular protrusion 216 grip inner surface 232 of annular workpiece 106c. Accordingly, working-jaws 210a are first radially moved inward towards center 220 by rotation 222 of conventional detachable handle 218 to provide sufficient space to position workpiece 106c outside annular protrusion 216. Thereafter, handle 218 is rotated in the opposite direction (e.g., counterclockwise) 222 to radially move working jaws 210a away from center 222 to tighten grip on surface 232 of workpiece 106c. In this case, outer surfaces 230 of annular protrusion 216 grip inner surface 232 of workpiece 106c.

As further illustrated, working-jaws 210a shown in FIGS. 3A to 3G are also milled to include concaved surfaces 234 that when in closing position (as illustrated in FIGS. 3A and 3G), form a cylindrical opening 236 that may be used to secure an elongated cylindrical object (FIG. 3G) such as a cylindrical rod as a workpiece 106d.

FIGS. 4A to 4G-2 are a non-limiting, exemplary illustration of hybrid holding device 200 with a second set of working-jaws 210b in accordance with one or more embodiments of the present invention.

Figure 4A:
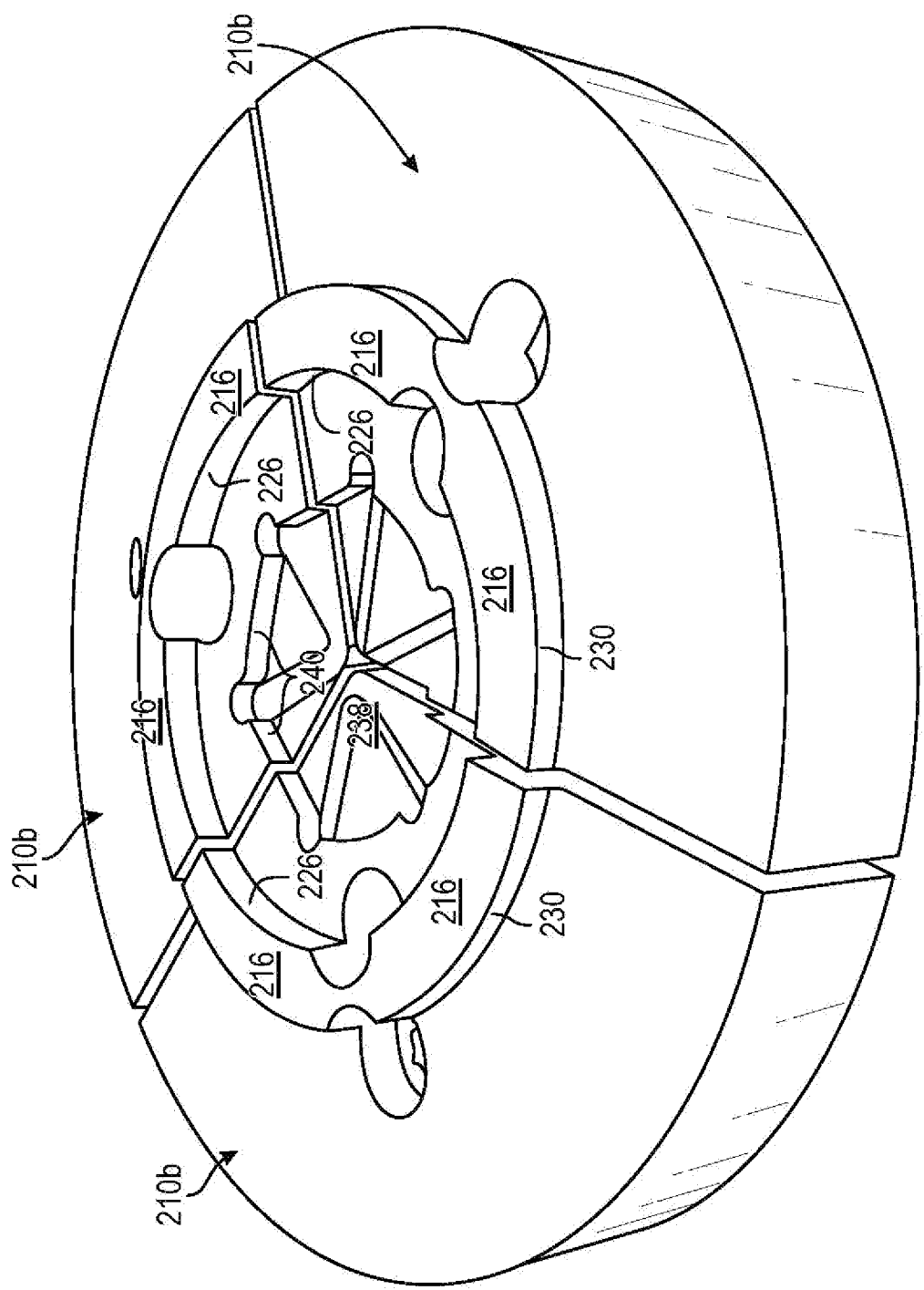
Figure 4B:
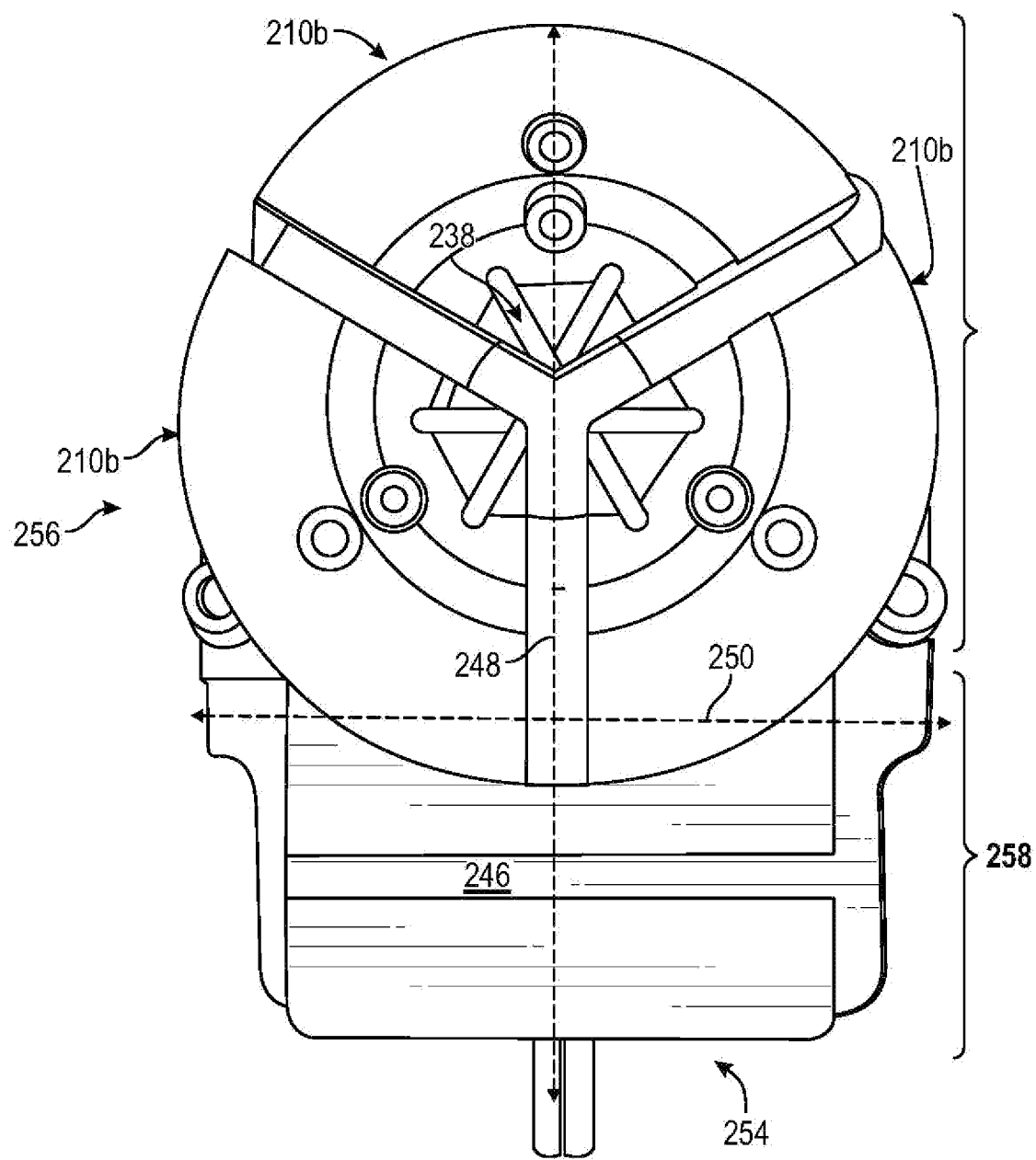
Figure 4C:
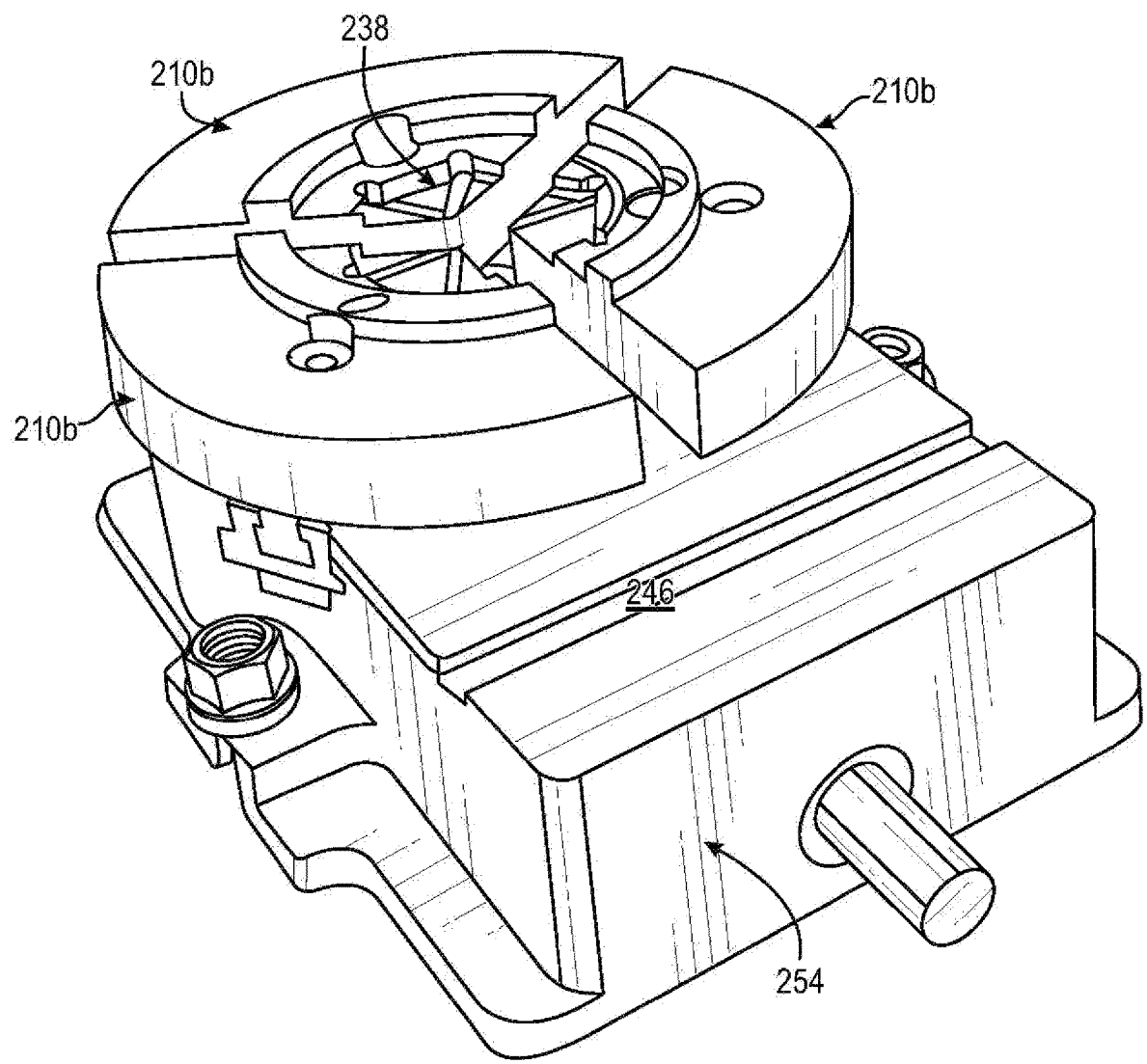
Figures 1, 4D:
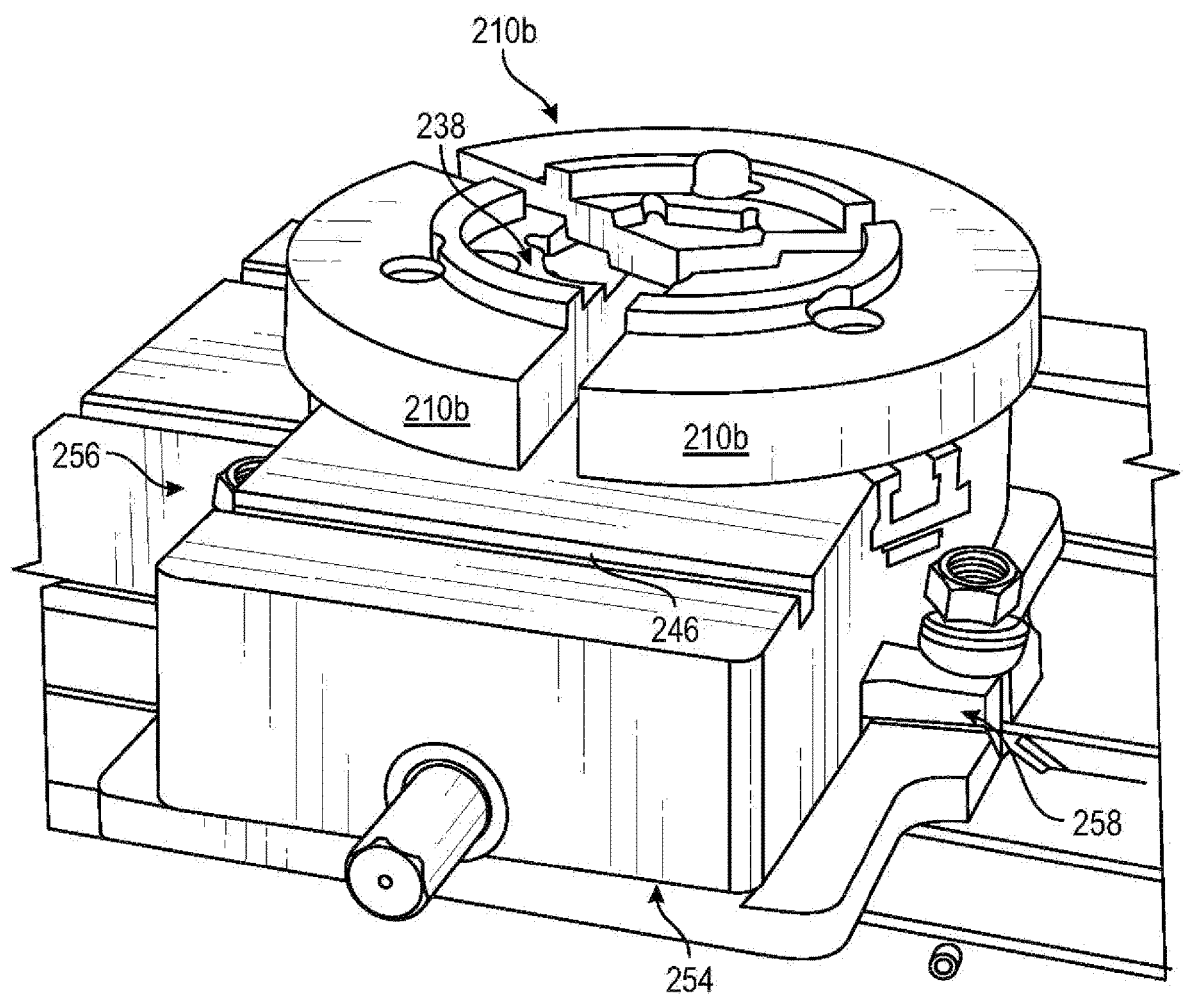
Figures 2, 4D:
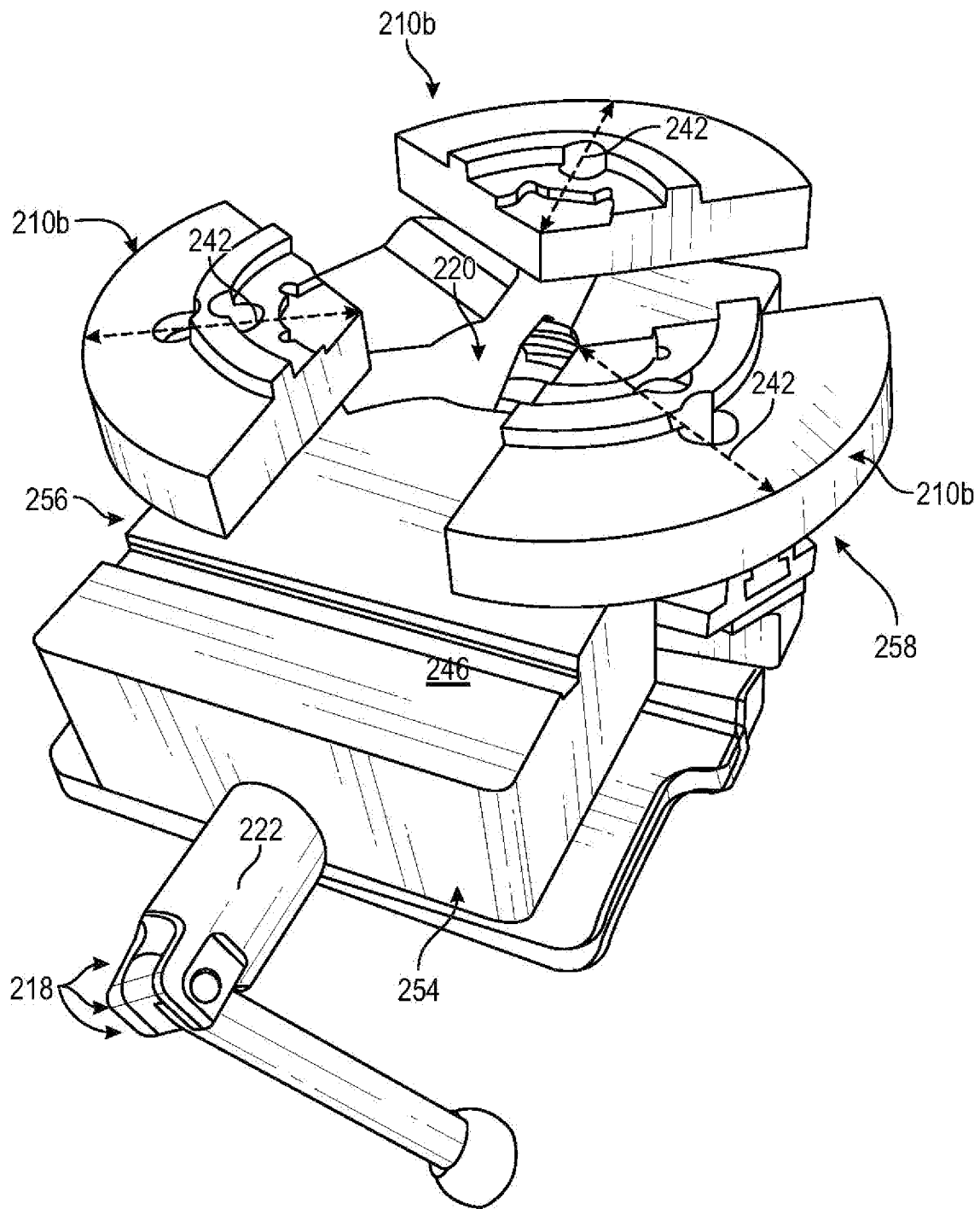

FIG. 4A is a non-limiting, exemplary illustration of the second set of working-jaws 210b for the second set of workpieces 106e, 106f, and 106g (FIGS. 4E-1 to 4G-2) milled from a second set of blank-jaws 212. FIGS. 4A to 4D illustrate hybrid holding device 200 with the second set of working-jaws 210b, but with no workpiece 106.

In the non-limiting, exemplary instance shown in FIGS. 4A to 4G-2, a single set of blank jaws 212 were modified in view of several different shape/size workpieces 106 (as detailed below). For example, blank-jaws 212 were milled to form working-jaws 210b (FIGS. 4A to 4G-2), which may hold workpiece 106e (FIGS. 4E-1 to 4E-2), workpiece 106f (FIGS. 4F-1 and 4F-2), and workpiece 106g (FIGS. 4G-1 and 4G-2).

As further detailed below, since working-jaws 210b are moveable, different size workpieces 106 may also be used with the same working-jaws 210v without having to generate a new set of working-jaws 210b from a new set of blank-jaws 212.

Figures 1, 4E:
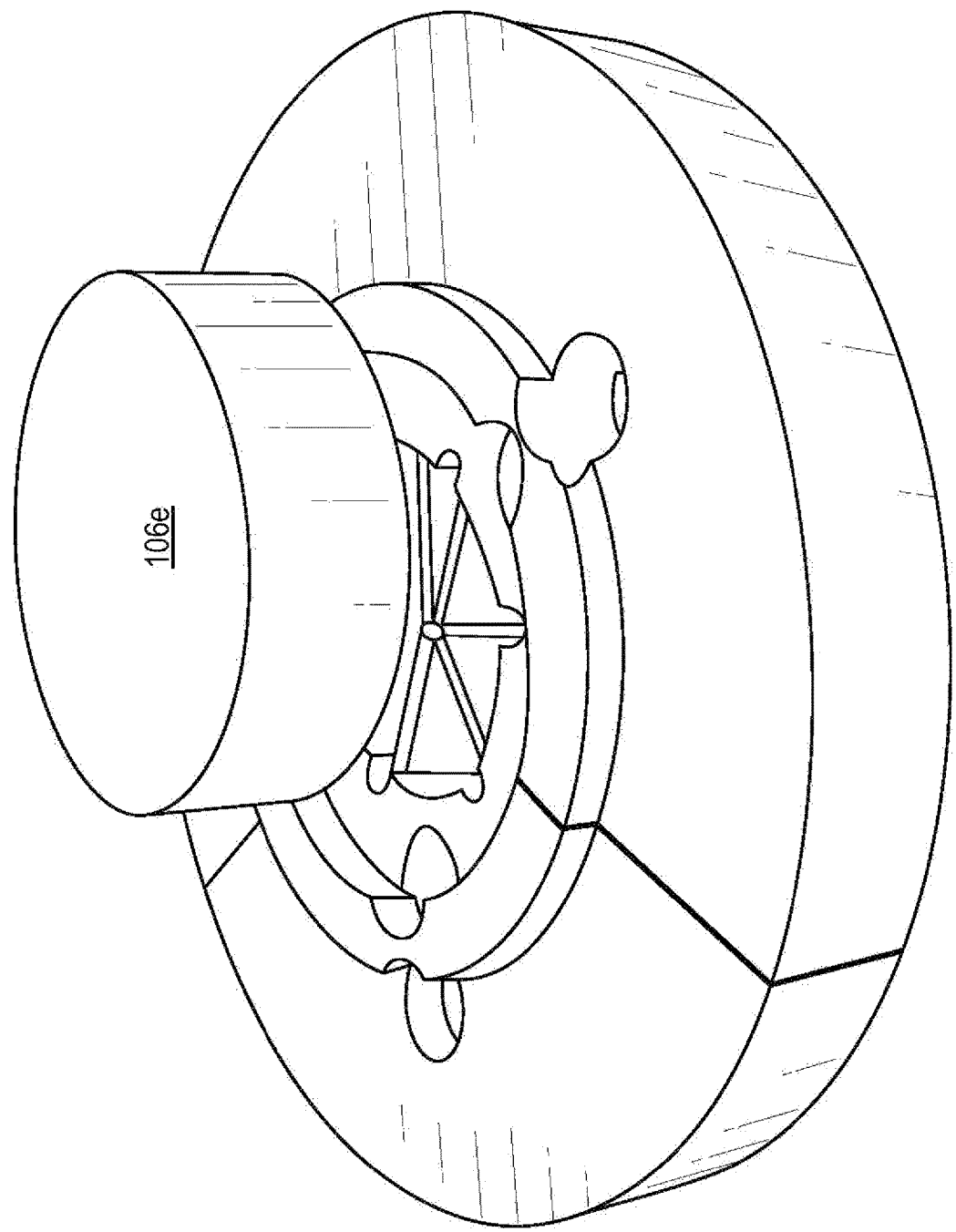
Figures 2, 4E:
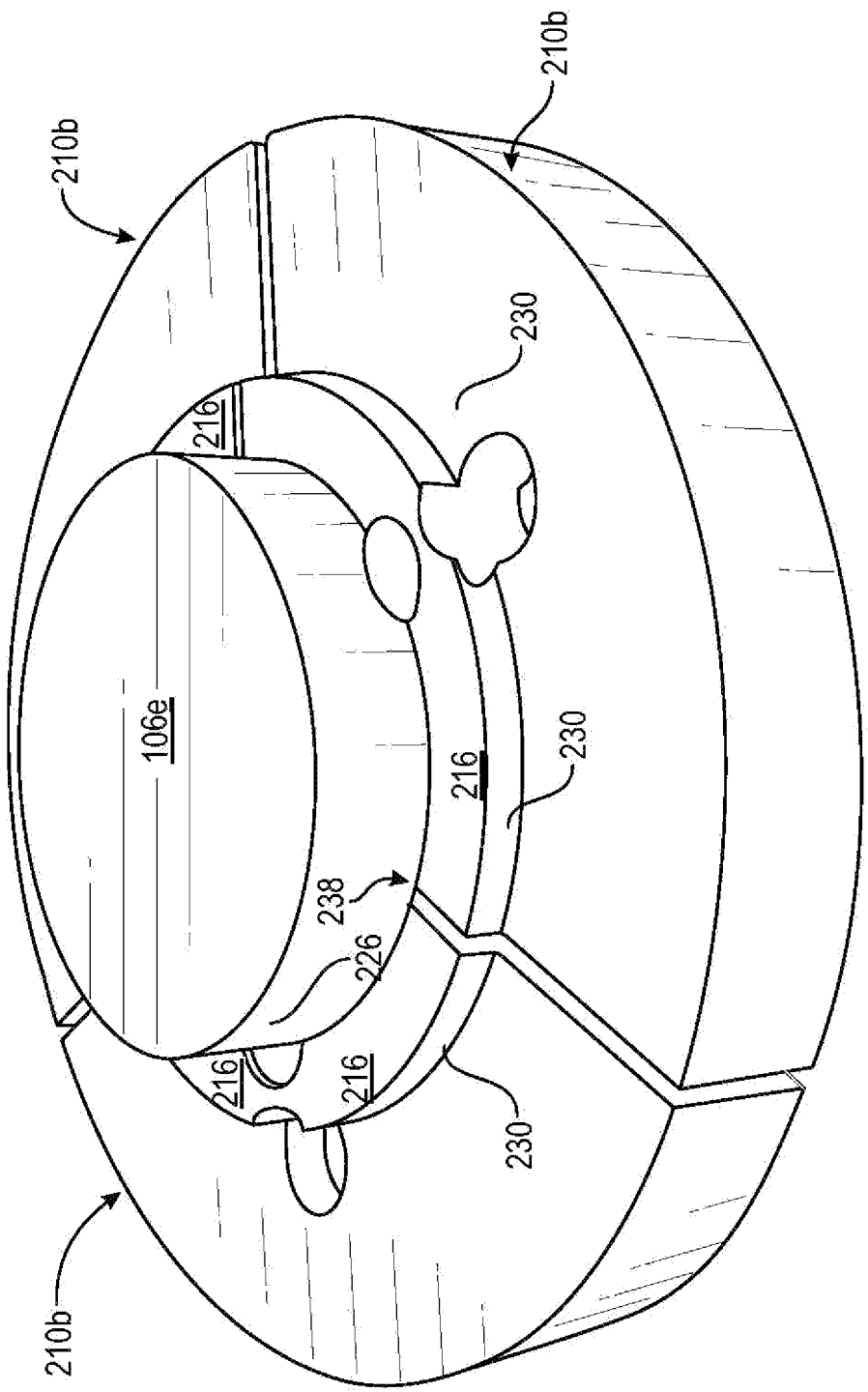

In the non-limiting, exemplary instance best shown in FIG. 4A, working-jaw 210b includes an annular protrusion 216 that may be used to grip workpiece 106a, 106b, 106c, 106e, and 106f as shown in FIGS. 4E-1 to 4F-2. Combined working-jaws 210b further include or form a polygonal recess 238 that may be used to grip a polygonal workpiece 106g as shown in FIGS. 4E-1 and 4E-2.

FIGS. 4E-1-1 to 4E-2 are non-limiting, exemplary illustration of the hybrid holding device illustrated in FIGS. 2A to 4G-2, progressively illustrating a non-limiting, exemplary method of mounting and securing a non-limiting, exemplary workpiece 106e (same disc shape as that of workpiece 106b, but with a shorter height).

Figures 1, 4F:
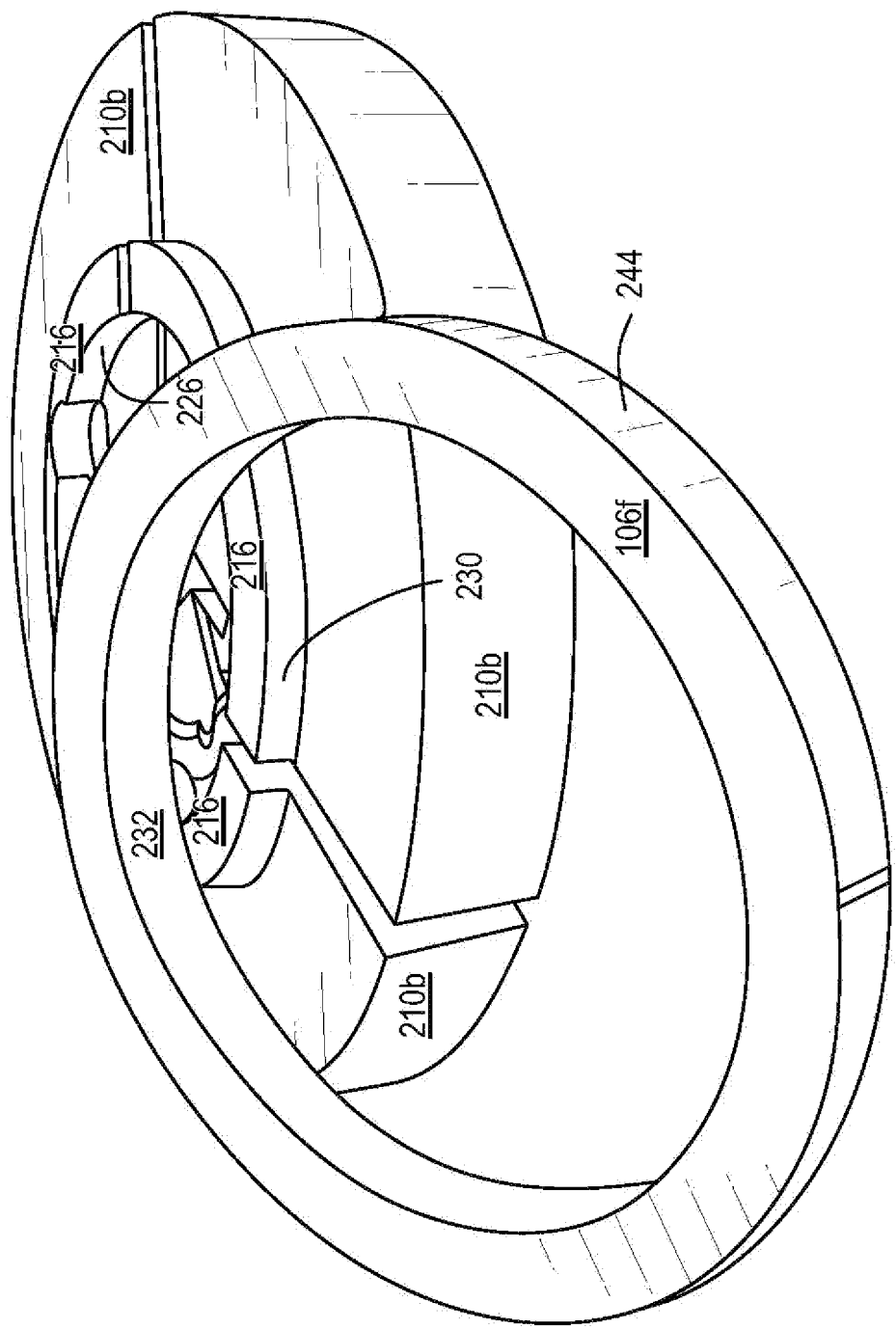
Figures 2, 4F:
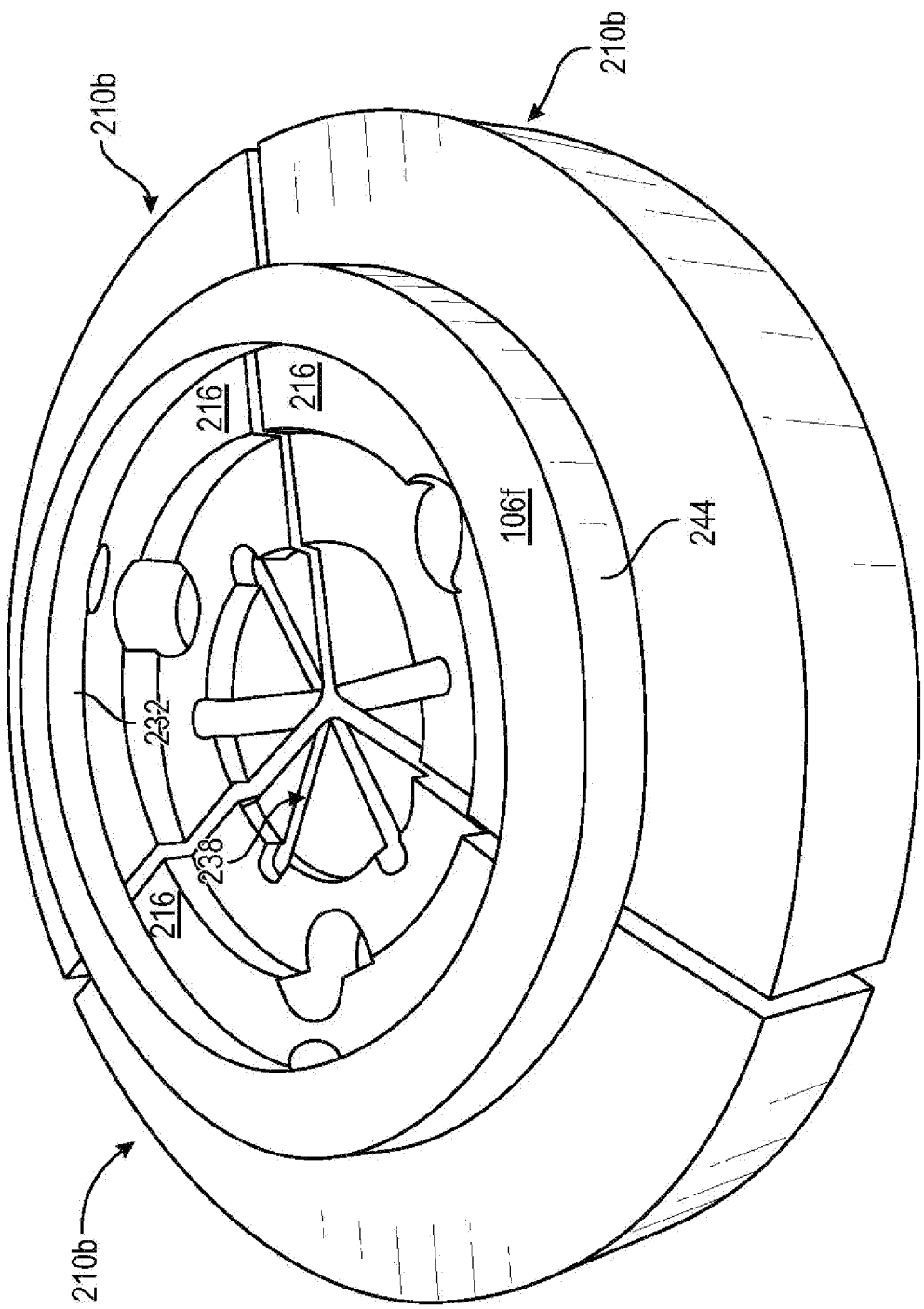
Figures 1, 4G:
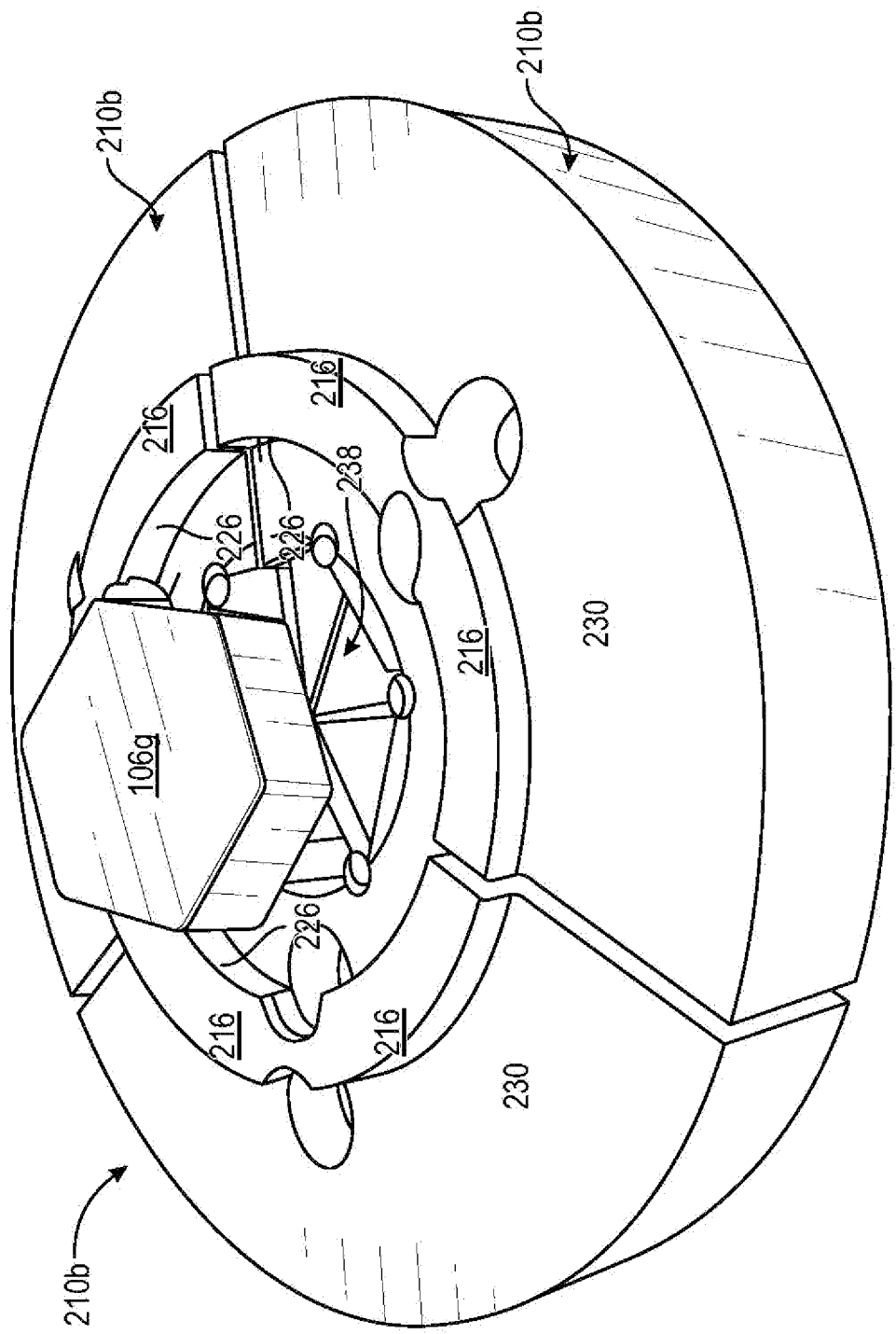
Figures 2, 4G:
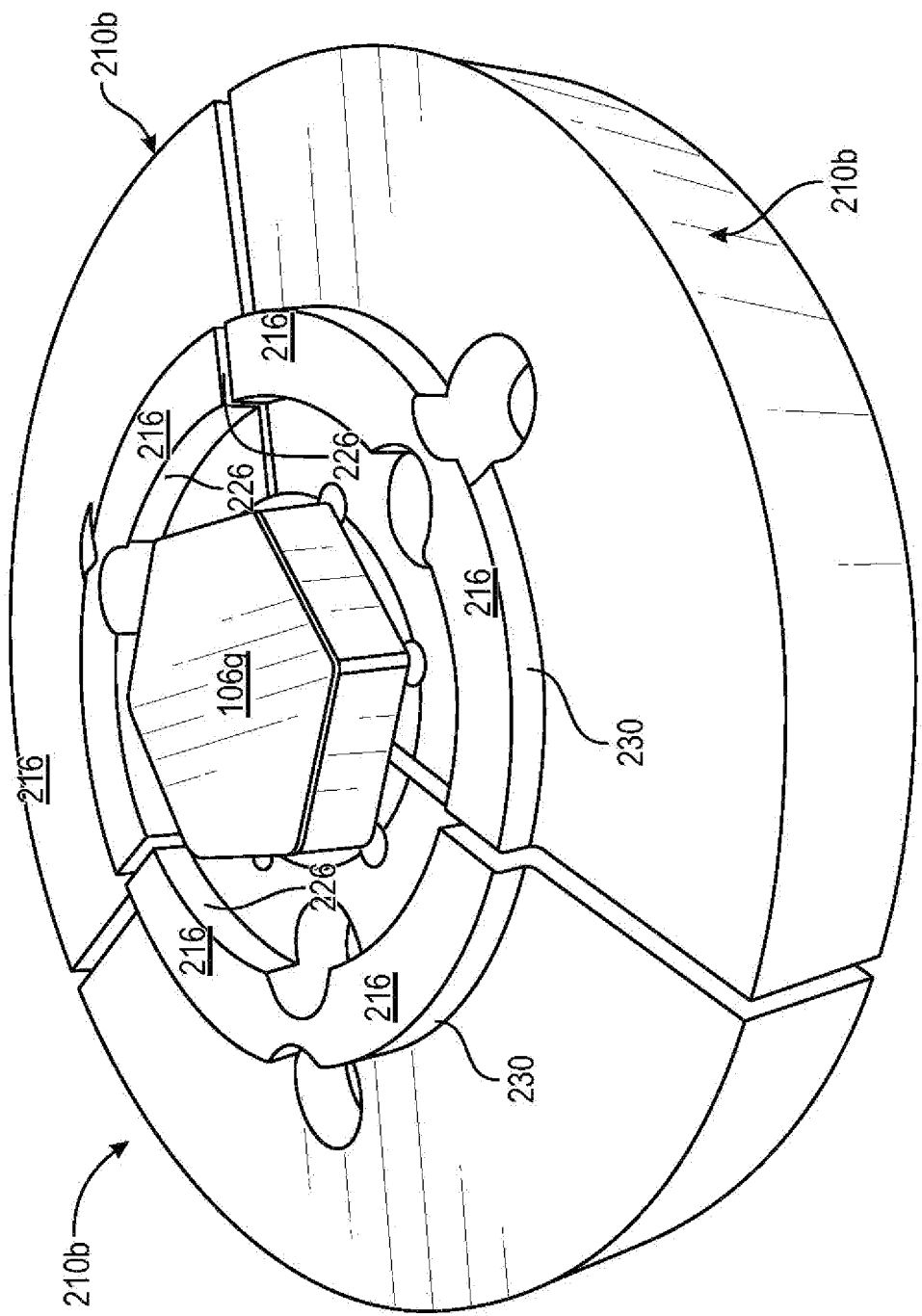
Figure 5A:
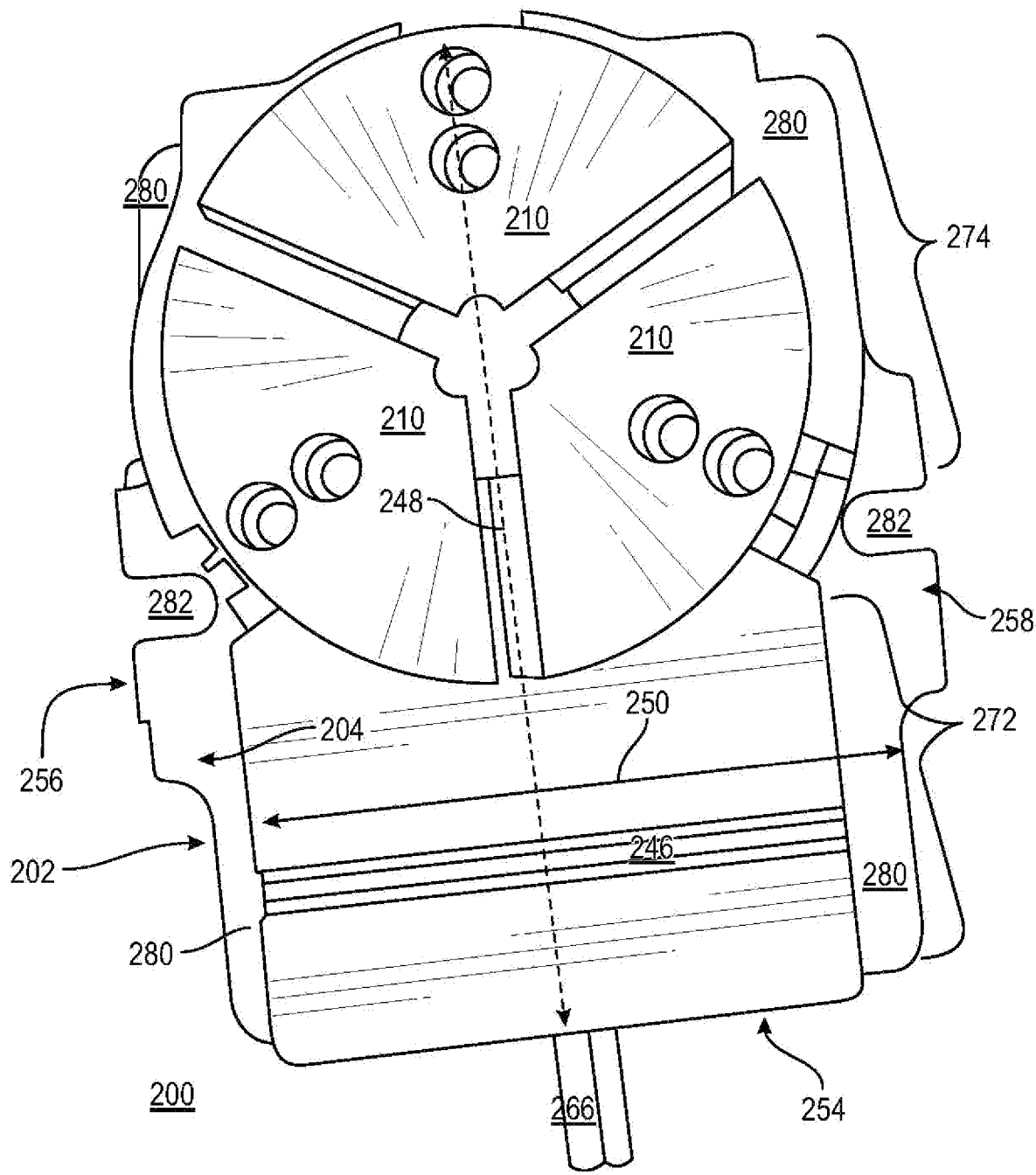
FIGS. 5A to 5J are non-limiting, exemplary illustrations of various perspective views of a fully assembled hybrid holding device shown in FIGS. 2A to 4G-2 but with handle removed and hybrid holding device placed outside milling machine in accordance with one or more embodiments of the present invention.
Figure 5B:
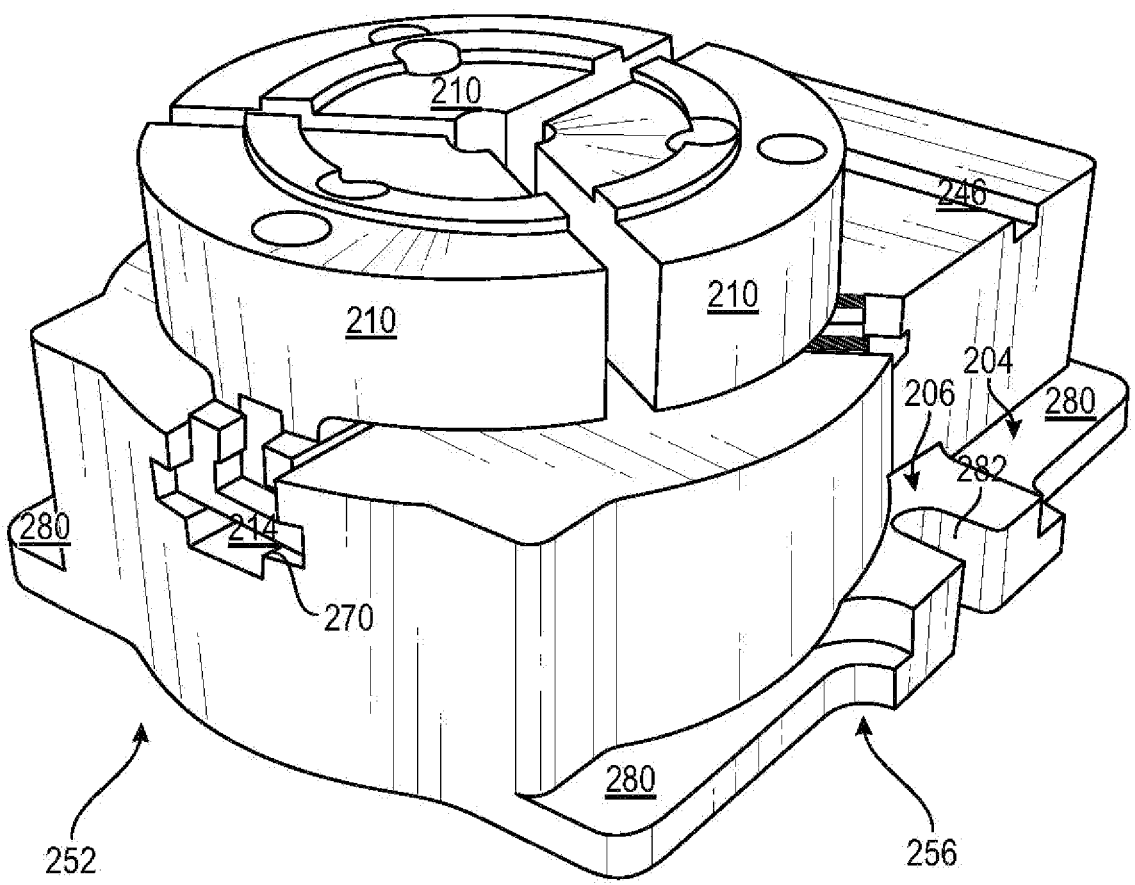
Figure 5C:
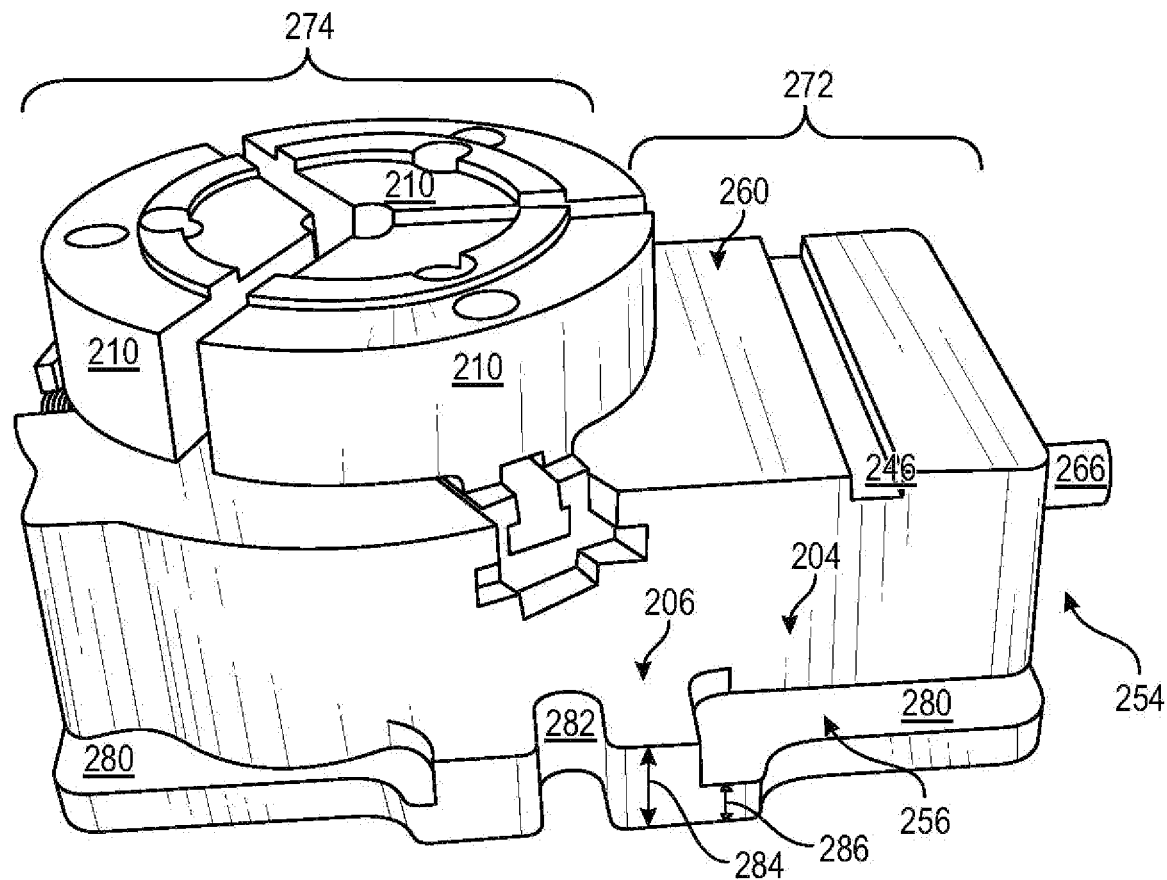
Figure 5D:
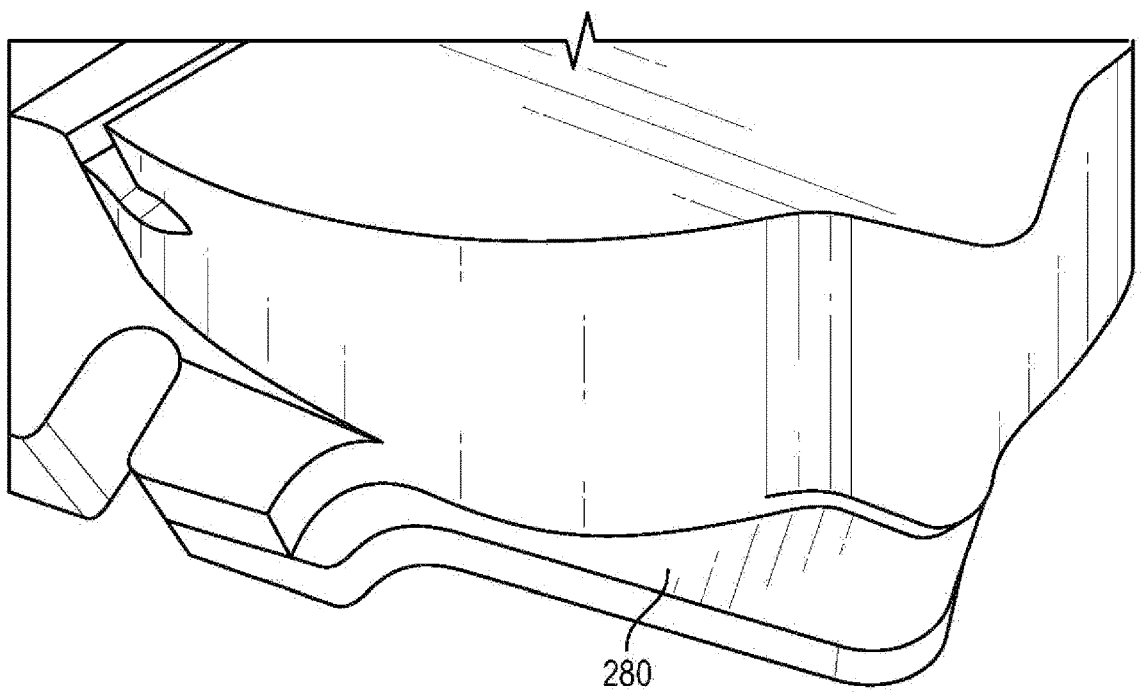
Figure 5E:
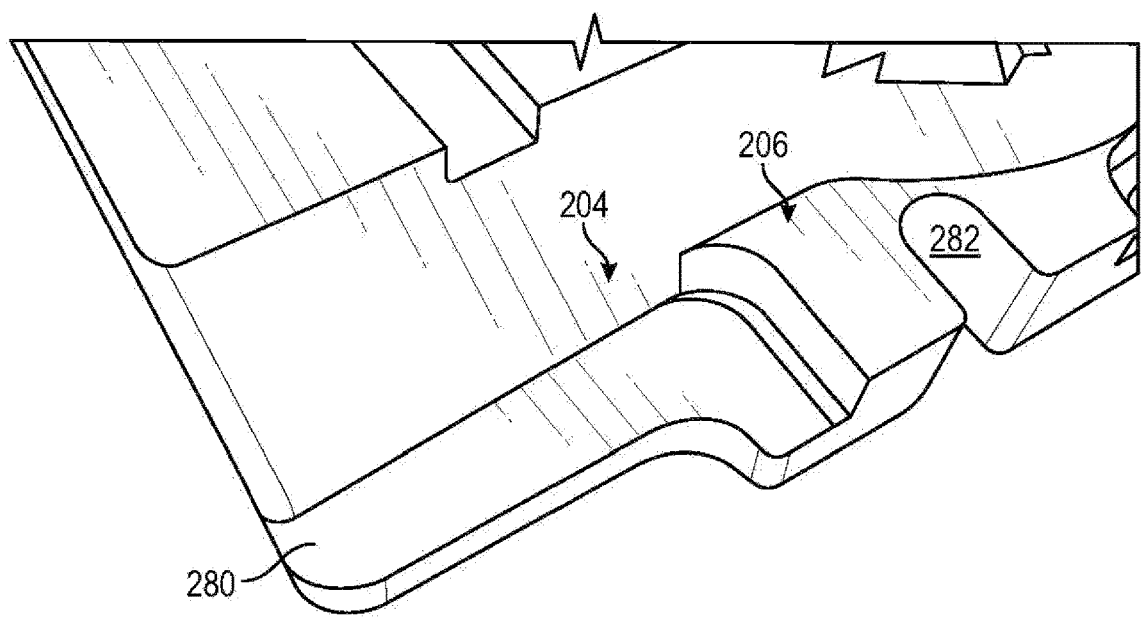
Figure 5F:
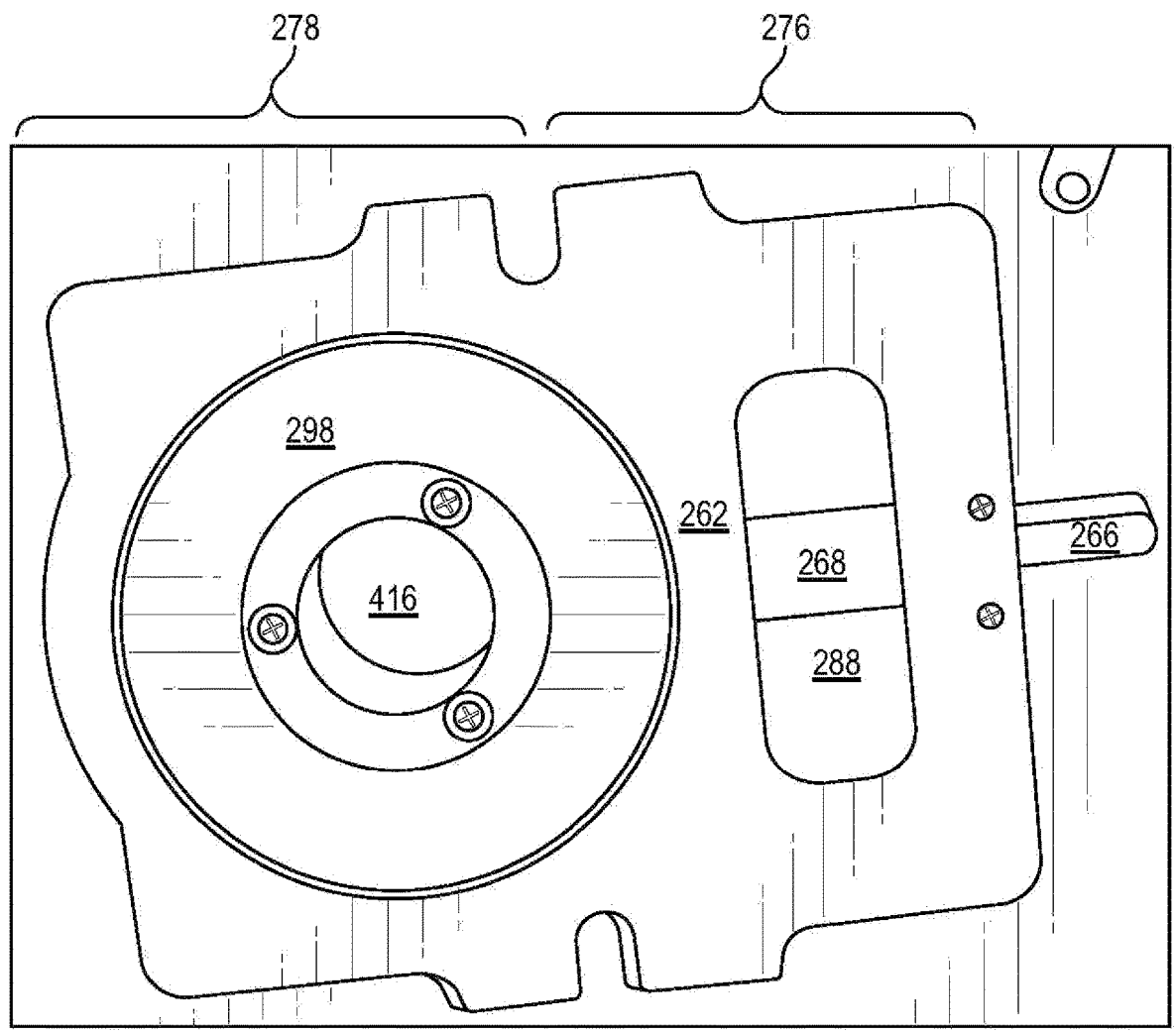
Figure 5G:
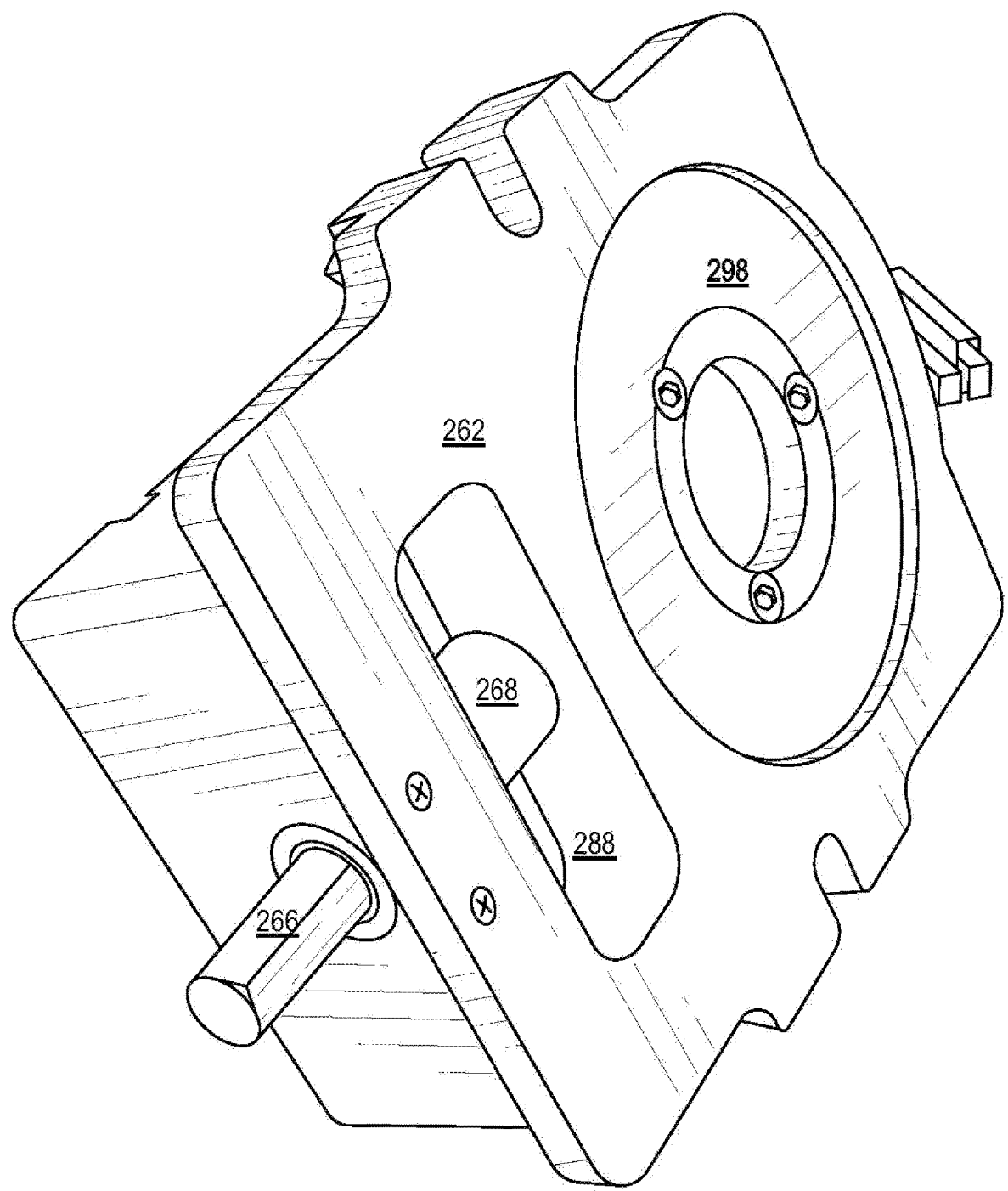
Figure 5H:
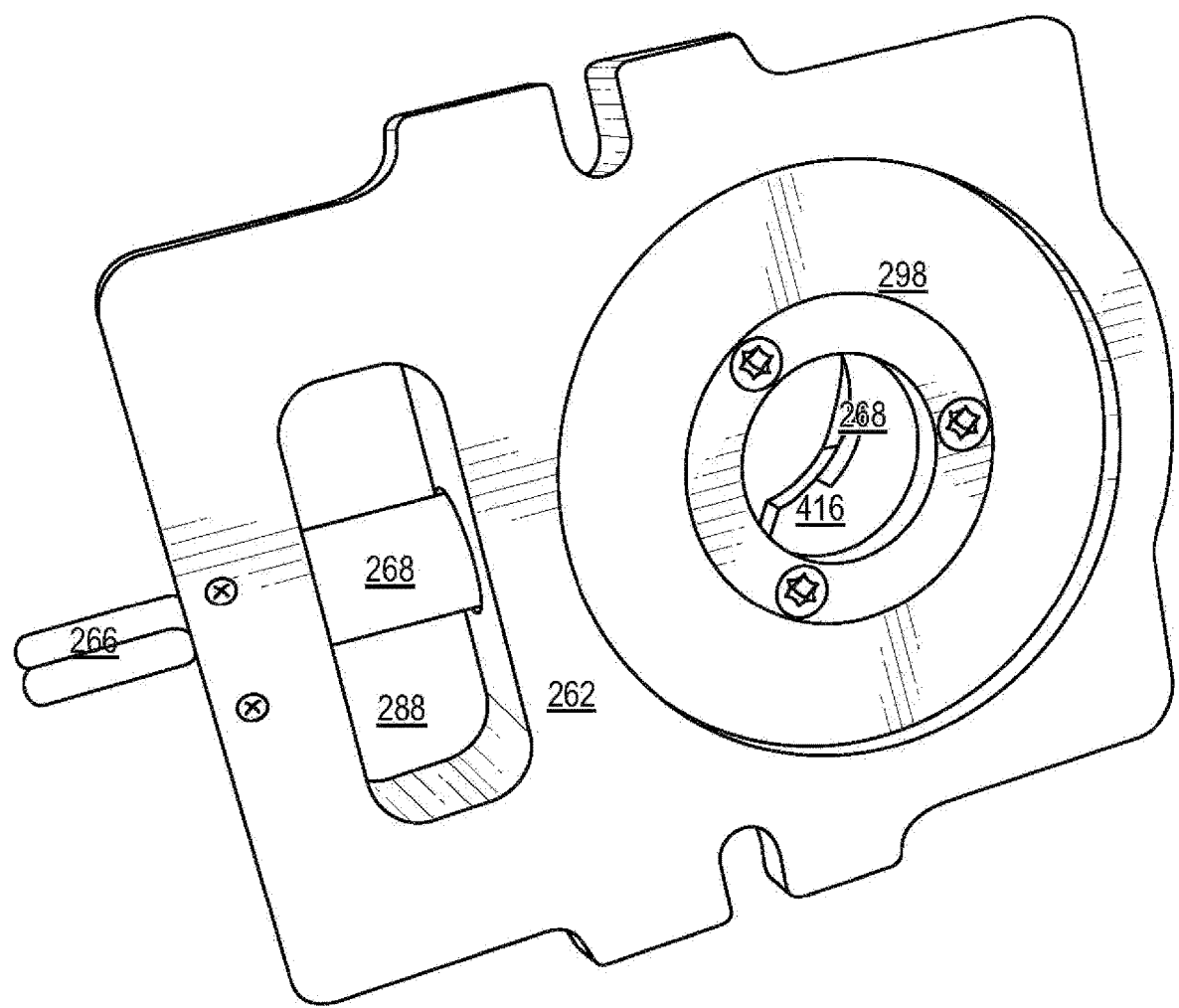
Figure 5I:
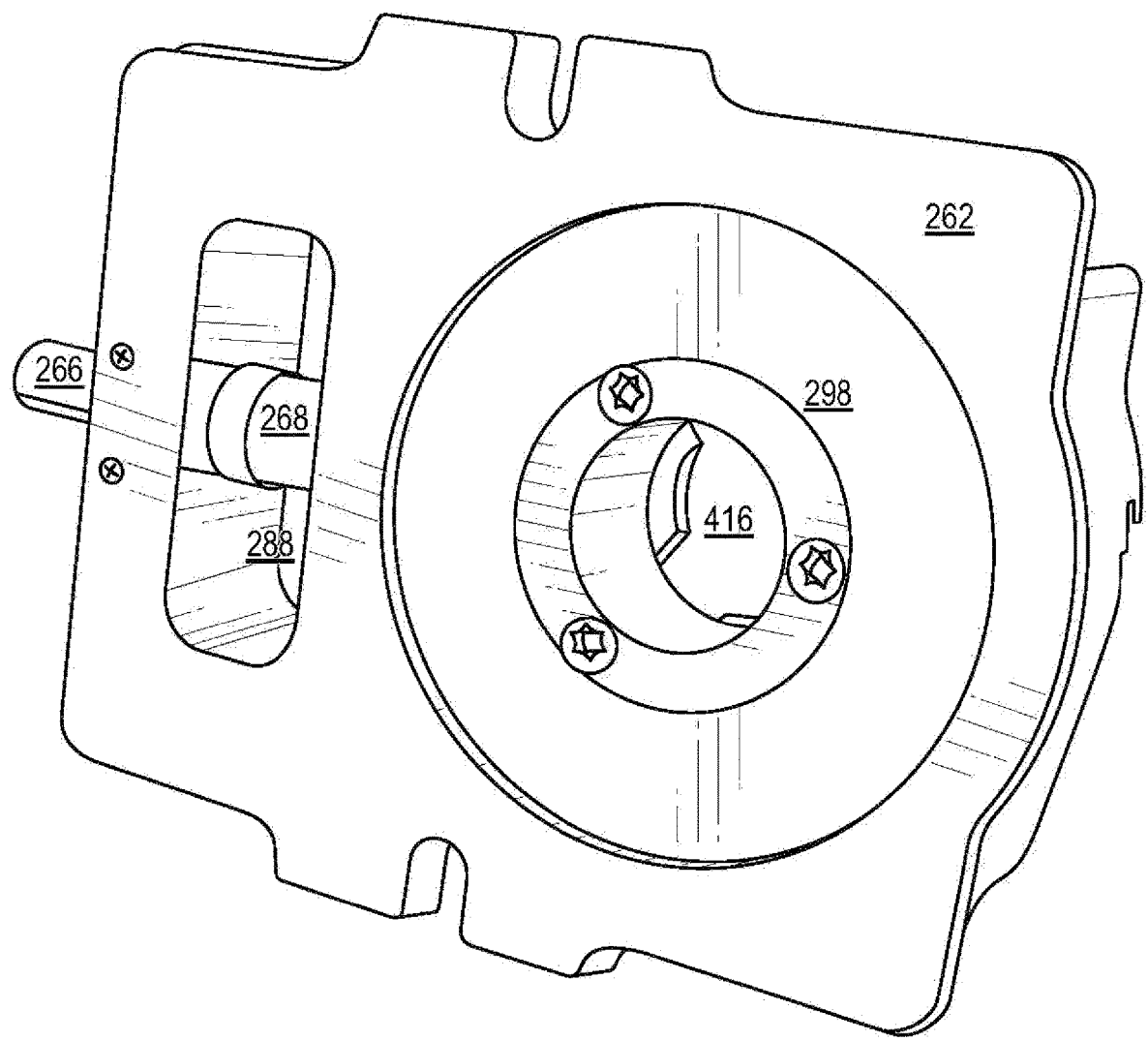
Figure 5J:
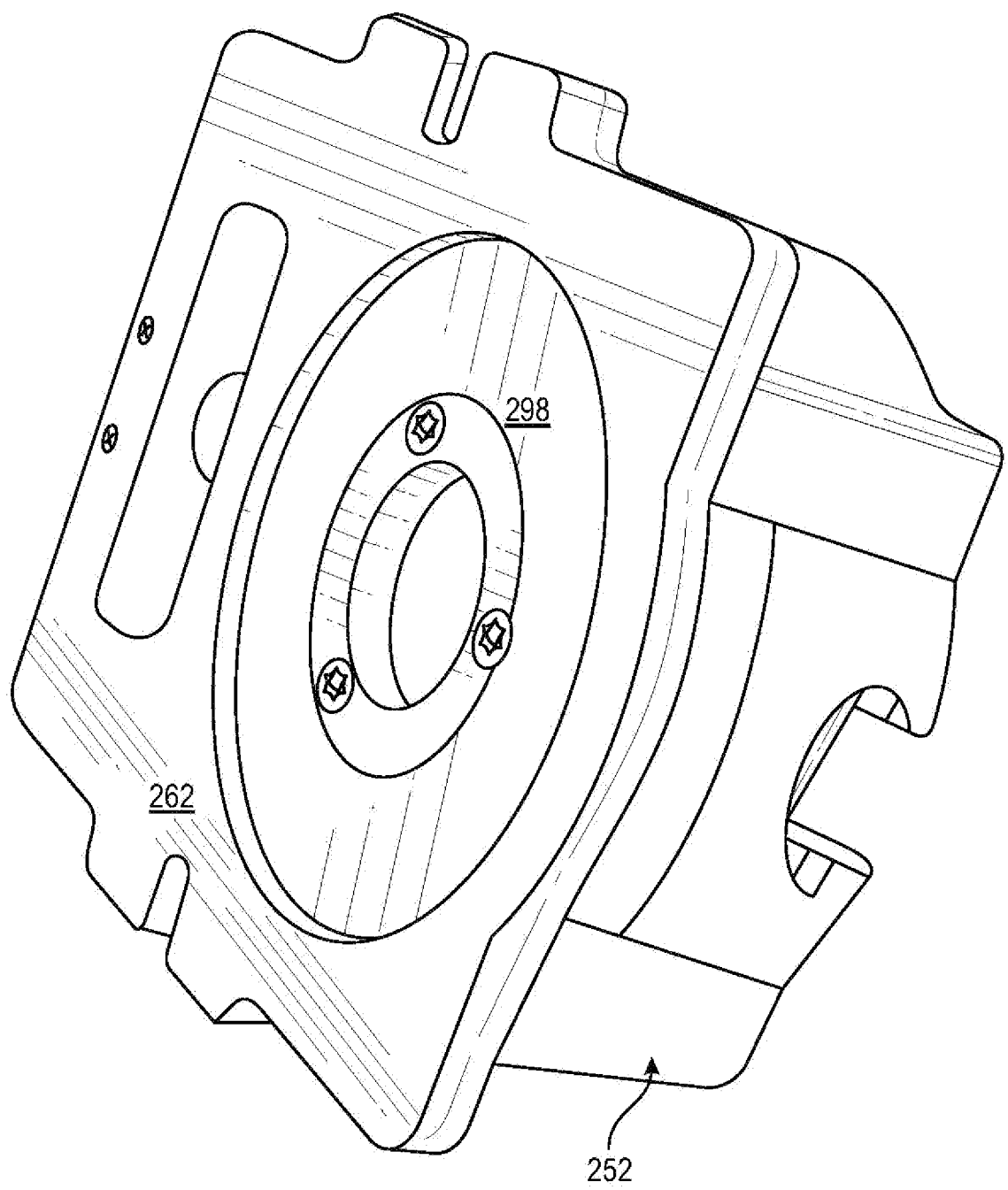

FIGS. 4F-1 and 4F-2 progressively illustrate a non-limiting, exemplary method of mounting and securing a non-limiting, exemplary workpiece 106f (same as annular ring as workpiece 106c).

FIGS. 4G-1 and 4G-2 progressively illustrate a non-limiting, exemplary method of mounting and securing a non-limiting, exemplary workpiece 106g, which is a polygonal shaped disc. As clearly illustrated in FIG. 4A, combined working-jaws 210b form a polygonal recess 238 that may be used to grip workpiece 106g as shown in FIGS. 4G-1 and 4G-2. As illustrated, polygonal recess 238 is comprised of three individual recessed sides 240 formed on each separate jaw 210b that together, form a polygonal recess 238 (or offset surface).

Therefore, blank-jaws 212 may be milled to form working-jaws 210 to hold a workpiece 106 of different shapes and sizes. Of course, in the non-limiting, exemplary instance shown in FIGS. 3A to 4G-2, grip surface features of both working-jaws 210a and 210b may have been combined into a single working-jaw 210. That is, a single set of blank-jaws 200 may be used to mill and generate all of the grip surface features of both working-jaws 210a and 210b into a single working-jaw 210.

For example, each jaw 210b (FIGS. 4A to 4G-2) may have been further milled to include concaved front surfaces 234 of working jaws 210a so that when in closing position, form a central cylindrical opening 236 (best shown in FIG. 3A) that may be used to secure an elongated cylindrical object (FIG. 3G) as a workpiece 106d. Alternatively, working-jaw 210a may have been further milled to include polygonal recess 238 featured on working-jaw 210b. Of course, other surface features may also be added to grip other odd shaped workpieces 106 not shown.

It should be note that the purpose for illustrating two separate working-jaws 210a and 210b with separate features rather than a single working-jaw 210 with all features included is for discussion purposes to illustrate that several sets of blank-jaws 212 may be milled to provide different sets of working-jaws 210 and that they may include any desired surface feature for gripping a workpiece 106. However, in practice, in the non-limiting, exemplary instances, all of the surface features of workings-jaws 210a and 210b may be combined to form a single working-jaw 210.

As illustrated in FIGS. 2A to 4G-2, hybrid holding device 200 includes multiple jaws 210 that directly receives and secures workpiece 106 without the need, requirement, or use of an adapter. It should be noted that since jaws 210 may be adjusted, it can receive and secure different sizes and shapes of workpiece 106. For example, different sized (e.g., diameter) annular rings 106c may be used with the same working-jaw 210a/210b.

Hybrid holding device 200 further includes a detachable handle 218 for tightening the grip of jaws 210 against workpiece 106. The method for operating handle 218 by a user is in the same manner as conventional vises used in milling machine 110. Accordingly, no new skills are required to operate handle 218 and secure a workpiece 106 onto hybrid holding device 200.

As further illustrated in FIGS. 3A to 4G-2, a working jaw 210 of hybrid holding device 200 may be used for gripping workpiece 106 in a "closed" position while moving radially inwardly (shown by arrows 242 in FIG. 4D-2) towards a center 220. Alternatively, jaws 210 of hybrid holding device 200 may be used for gripping workpiece 106 in an "open" position while moving radially outwardly (shown by arrows 242 in FIG. 4D-2), away from center 220.

As best illustrated in FIGS. 3F-1, 3F-2, 4F-1, and 4F-2, jaws 210 may be used for clamping an annular workpiece 106c/f by gripping one of an inner circumference 232 or an outer circumference 242 of workpiece 106c/f. In the non-limiting, exemplary instance illustrated in FIGS. 3F-1, 3F-2, 4F-1, and 4F-2, workpiece 106c/f is gripped by an inner circumference 232.

As illustrated in FIGS. 3A to 4G-2, jaws 210 are each comprised of an exemplary one-third (or 120° degrees) annular securing structure 216 that when in closed position, together form a disconnected annular protruding ring as shown for securing annular workpiece 106c/f (3F-1, 3F-2, 4F-1, and 4F-2) from inner circumference 232 of workpiece 106c/f by adjusting jaws 210 radially outwardly, away from center 220 to an "open" position.

One reason to grip annular workpiece 106c/f from an inner circumference 232 might be that workpiece 106 requires milling on outer circumference 244 and hence, jaws 210 cannot grip workpiece 106 by its outer circumference 232. Accordingly, jaws 210 may be adjusted outwardly away from center 220 (to "open" position) to grip workpiece 106 by its inner circumference 232 instead. Again, it should be noted that since jaws 210 may be adjusted, it can receive and secure different sizes and shapes of workpiece 106. Of course, the workpiece (annular disc or ring) may also be easily gripped by jaws 210 from its outer circumference 244 if milling work is required on inner part 232 of workpiece 106.

As further illustrated in FIGS. 2A to 4G-2, hybrid holding device 200 includes an alignment guide 246 comprised of a linear groove that extends along a transverse axis 246 of hybrid holding device 200, which that may be used to align hybrid holding device 200 with workbench 108 of a milling machine 110. Alignment guide 246 enables realignment of hybrid holding device 200 in relation to workbench 108 of milling machine 108 in the same position that workpiece 106 was worked on and hence, enabling different milling work to be performed on the same workpiece 106.

For example, a first version of a product may be developed (milled) with three openings, and at a later time, the second version of the same product may require it to be modified or milled to include a fourth opening. Using alignment guide 246, a machinist may easily align hybrid holding device 200 in the same exact position in relation to the workbench 108 of milling machine 110 that was used to develop the first version of the product and secure workpiece 106 thereon hybrid holding device 200. Thereafter, simply mill the additional fourth opening without having the need or requirement to redevelop a new adapter. Accordingly, a different milling work is performed on the same workpiece 106 but without requirement, need, or use of an adapter or development thereof.

FIGS. 5A to 5J are non-limiting, exemplary illustrations of various perspective views of a fully assembled hybrid holding device shown in FIGS. 2A to 4G-2 but with handle removed and hybrid holding device placed outside milling machine in accordance with one or more embodiments of the present invention. FIGS. 5A to 5E are non-limiting, exemplary illustrations of top and lateral perspective views whereas FIGS. 5F to 5J are non-limiting, exemplary illustrations of bottom perspective views in accordance with one or more embodiments of the present invention. FIGS. 5A to 5J have been merely arbitrarily illustrated with working-jaws 210a instead of working-jaws 210b or blank-jaws 200.

As illustrated in FIGS. 2A to 5J, hybrid holding device 200 used in milling machine 110 is comprised of body 202 having base 204. Body 202 of hybrid holding device 200 has a length that extends along longitudinal axis 248 of hybrid holding device 200, and a width that extends along a transverse axis 250 of hybrid holding device 200.

Body 202 of hybrid holding device 200 includes a front side 252, rear side 254, lateral sides 256 and 258, a top side 260, and a bottom side 262 (FIGS. 5F to 5J). Rear side 254 of body 202 of hybrid holding device 200 includes an opening 264 (FIG. 11G) for extending a handle engagement section 266 of a drive shaft 268 of drive mechanism 304, while front side 252 includes one of three actuator member openings 270 (detailed below). Drive mechanism 304 is comprised of at least drive shaft 268 and scroll plate 300.

Body 202 of hybrid holding device 200 further includes a first longitudinal top section 272 (FIG. 5D) that includes alignment groove 246 on top side 260. Body 202 X of hybrid holding device 200 further includes a second longitudinal top section 274 (FIG. 5A) that accommodates multi-jaw assembly 306 (FIGS. 7A to 7D, and 10H and 10I).

As further detailed below, second longitudinal top section 274 includes actuator member openings 270 configured to receive actuator members 214 (detailed below) of multi-jaw assembly 306.

Body 202 of hybrid holding device 200 further includes a first longitudinal bottom section 276 (FIG. 5F) that accommodates drive shaft 268 of drive mechanism 304 (detailed below) on bottom side 262. Body 202 of hybrid holding device 200 further includes a second longitudinal bottom section 278 (FIG. 5F) that accommodates drive mechanism 304.

Base 204 of body 200 is comprised of peripheral supporting flange 280 (FIGS. 5D and 5E) extending from periphery of bottom side 262 of body 202 of hybrid holding device 200, providing for a "wider" or more expansive base 204 for a more stable "foothold" resting position on workbench 108.

Peripheral supporting flange 280 may be used for further securing (or clamping) of hybrid holding device 200 from any part of any one side of hybrid holding device 200, preventing potential movement of hybrid holding device 200 while in use.

In particular, peripheral supporting flange 280 of base 204 includes a mounting structure 206 at lateral sides 256 and 258 of hybrid holding device 200 for detachably securing hybrid holding device 200 in a fixed stationary position directly onto a workbench 108 of milling machine 110. As illustrated, mounting structure 206 is bulkier 284 (compared to thickness 286 of supporting flange 280 best shown FIG. 5C) but is part of peripheral supporting flange 280 with a "U" shaped recess or relief 282 for receiving conventional fastener 208 for securely holding hybrid holding device 200 in place on workbench 108. Bulkier build 284 of mounting structure 206 provides added strength in terms of structural integrity of hybrid holding device 200 so to withstand the forces experienced from the milling head (e.g., a drill head) as a result of milling workpiece 106.

First longitudinal bottom section 276 includes first and second drive shaft mounting openings 264 and 286 (best shown in FIGS. 11G and 11H), which enable secure mounting of drive shaft 286 without it being wobbles (move out of its central longitudinal (or pivot) axis while being rotated). Further included in first longitudinal bottom section 276 is a cavity 288 between first and second drive shaft mounting openings 264 and 286. Cavity 288 is to save material and weight as the body 200 may be manufacturing by casting (e.g., made of cast-iron).

Adjacent first drive shaft mounting opening 264 are interlocking openings 290 and 292 (FIG. 11E) at opposite sides that receive couplers 294 (e.g., shoulder bolts) that engage a securing structure 296 of drive shaft 268. Interlocking openings 290 and 292 extend perpendicular first longitudinal bottom section 276 (longitudinal axis 248 of hybrid holding device 200).

Second longitudinal bottom section 278 includes a main opening 424 (FIG. 11A) closed by a cover 298 that houses scroll plate 300 and accommodates pinion 302 of drive shaft 268, while second longitudinal top section 274 accommodates multi-jaw assembly 306.

Figure 6A:
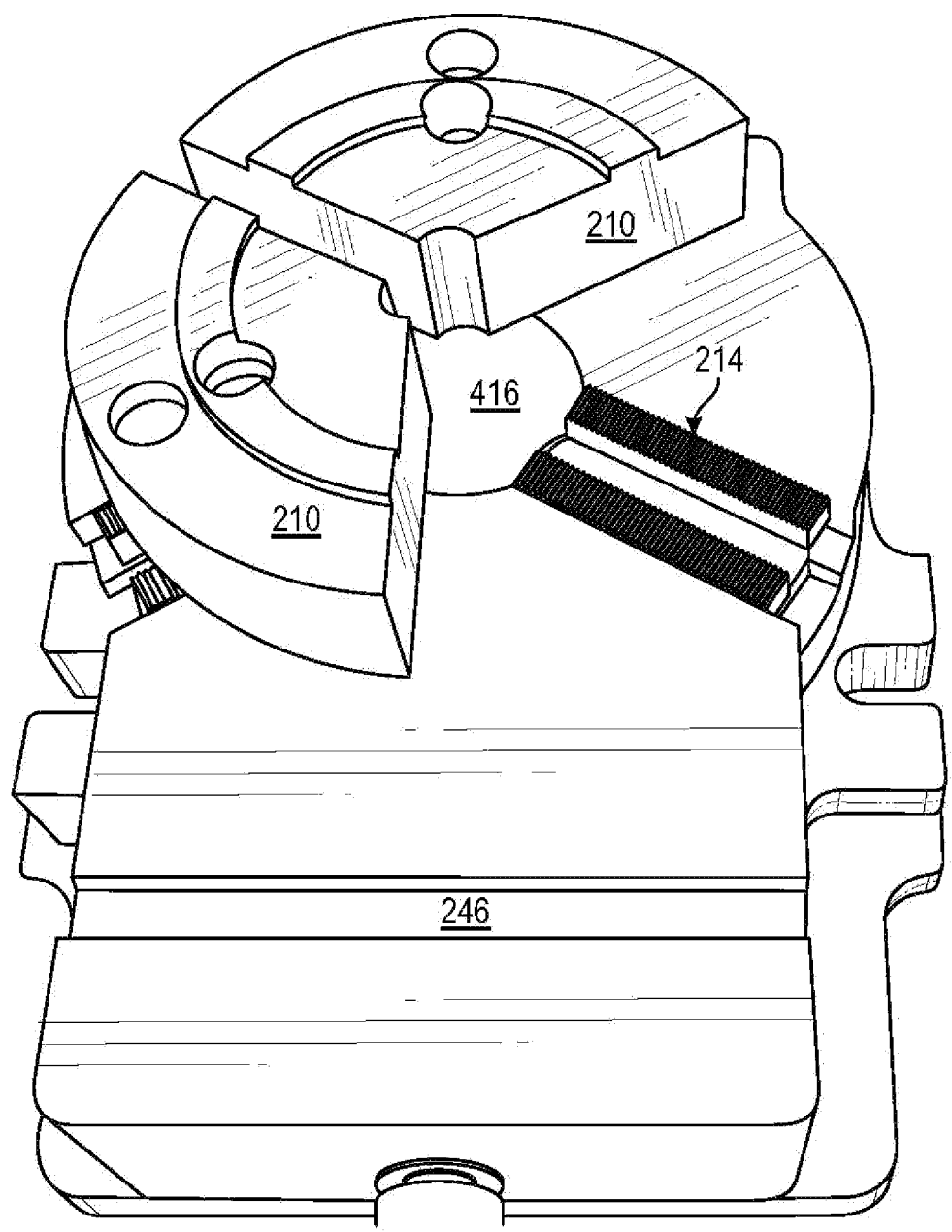
FIGS. 6A to 6H are non-limiting, exemplary illustration of hybrid holding device shown in FIGS. 2A to 5J, with one jaw and its securing member removed to clearly illustrate the movement of jaws and actuator members in accordance with one or more embodiments of the present invention.
Figure 6B:
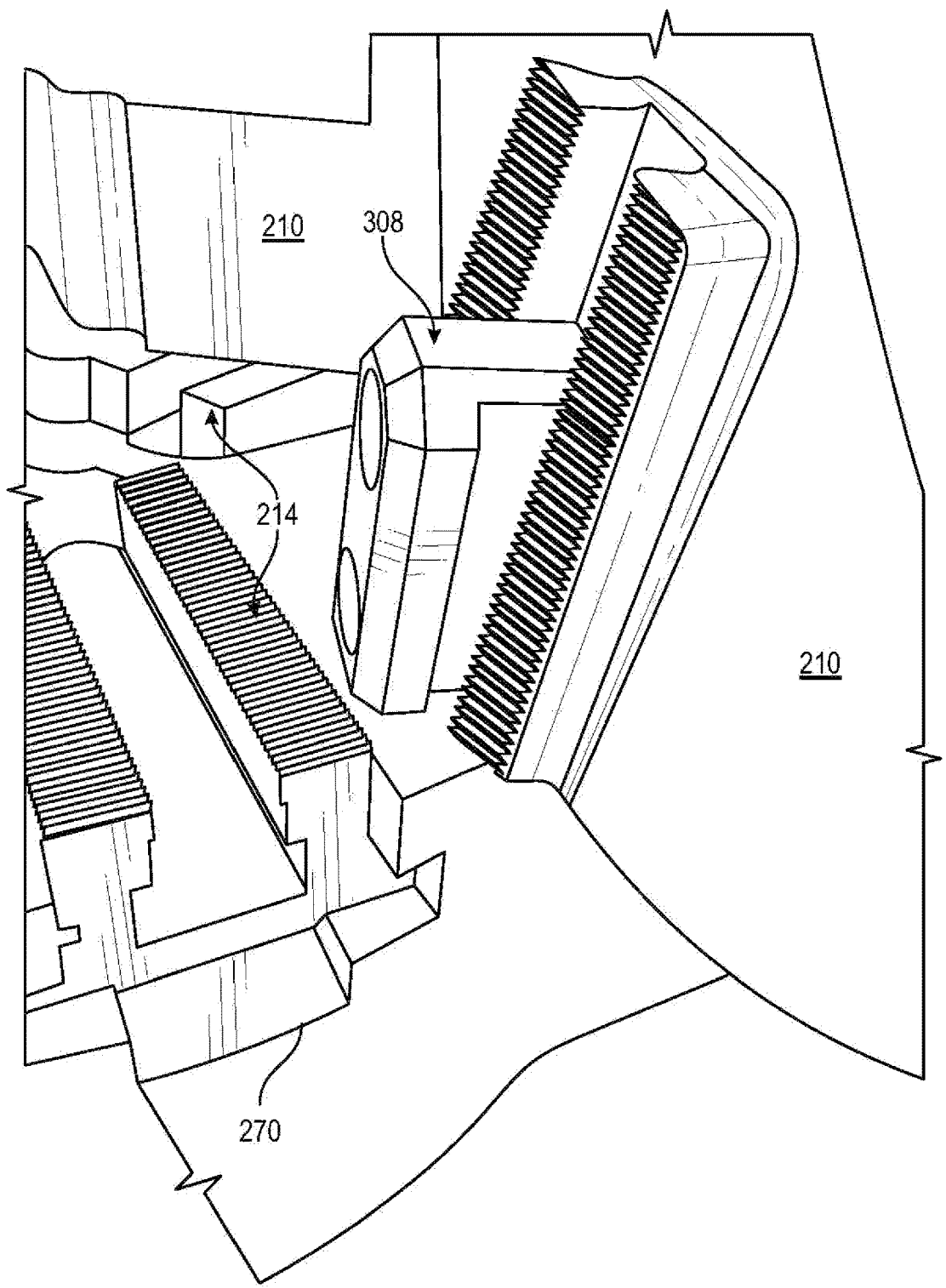

FIGS. 6A to 6H are non-limiting, exemplary illustration of hybrid holding device shown in FIGS. 2A to 5J, with one jaw and its securing member removed to clearly illustrate the movement of jaws and actuator members. FIG. 6B is a non-limiting, exemplary illustration of hybrid holding device 200, progressively illustrating a non-limiting, exemplary method of removing a jaw 210 and its securing member 308. The securing member 308 fastened to jaw 210 is slid out of engagement with actuator member 214.

Figure 6C:
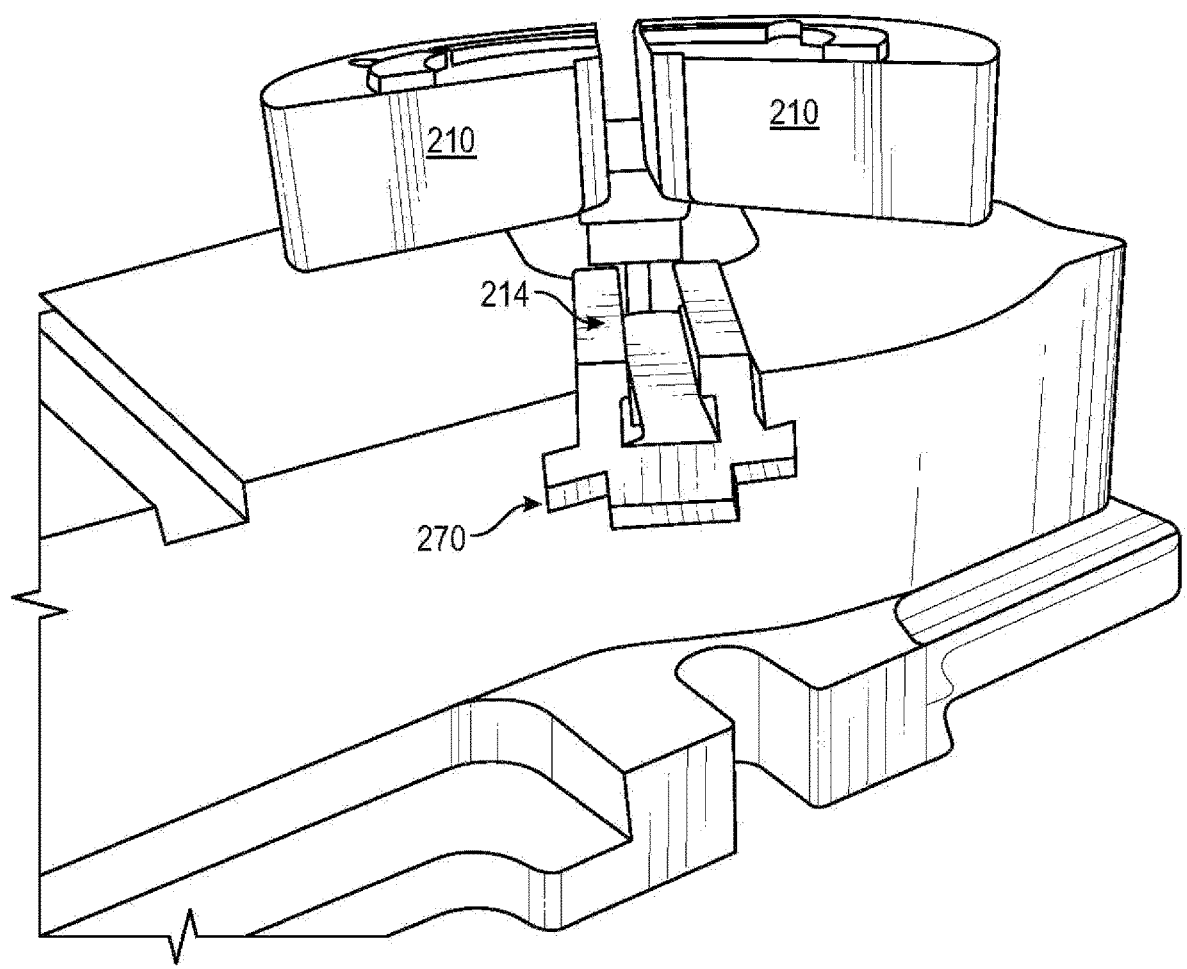
Figure 6D:
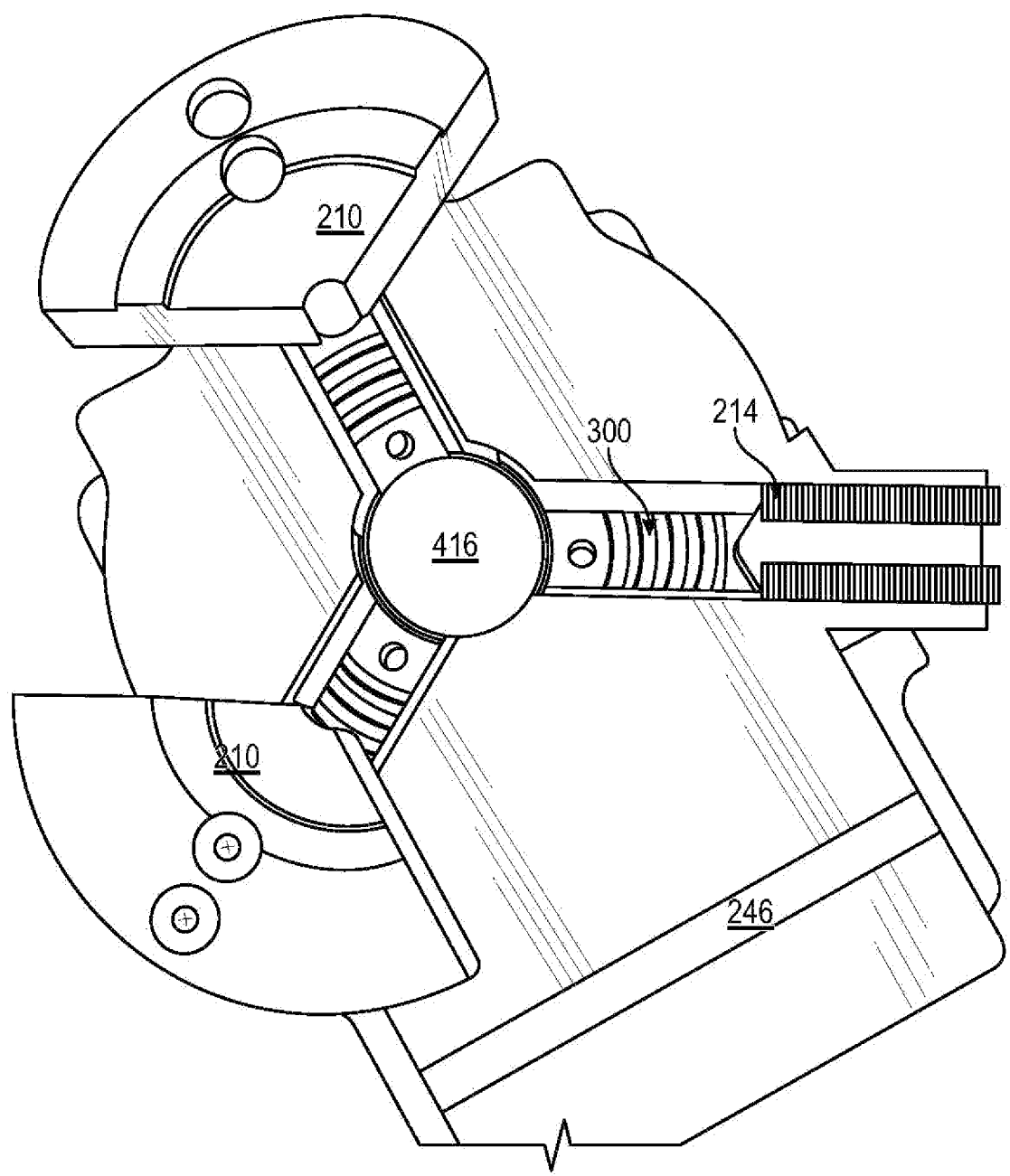
Figure 6E:
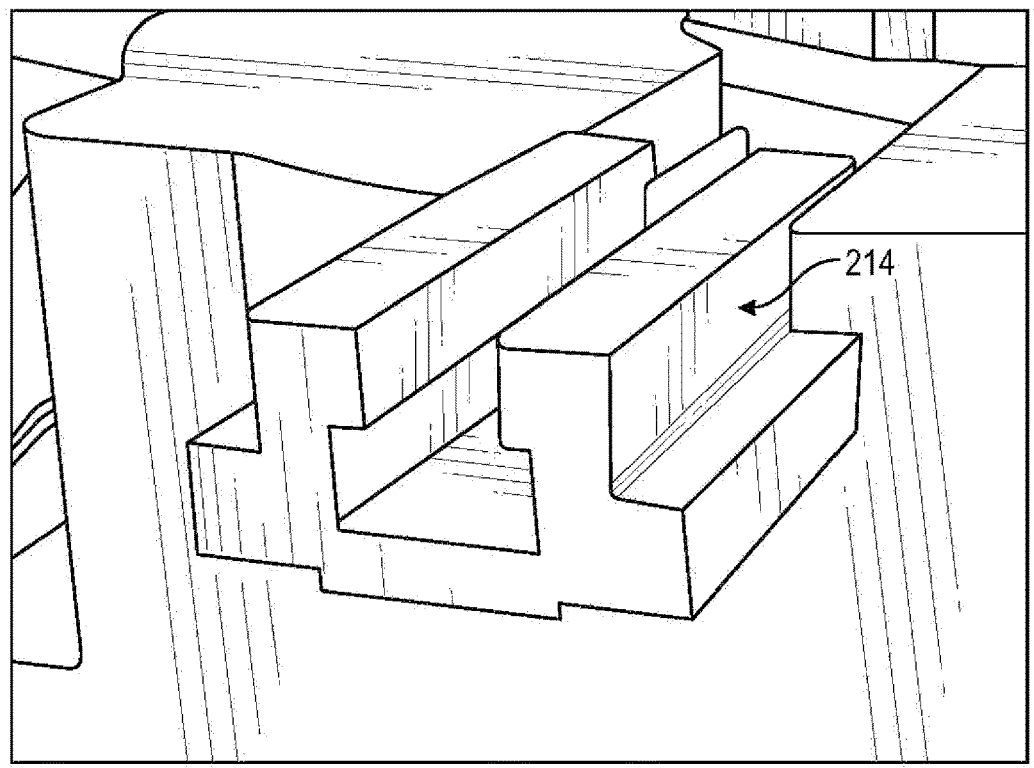
Figure 6F:
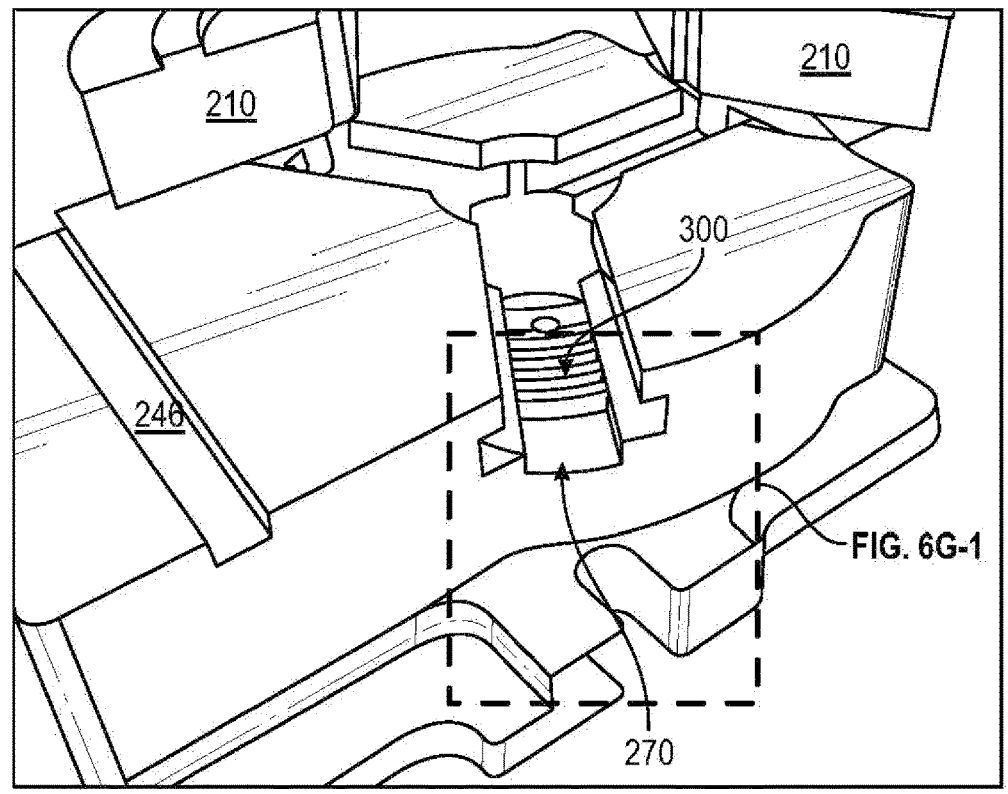
Figures 1, 6G:
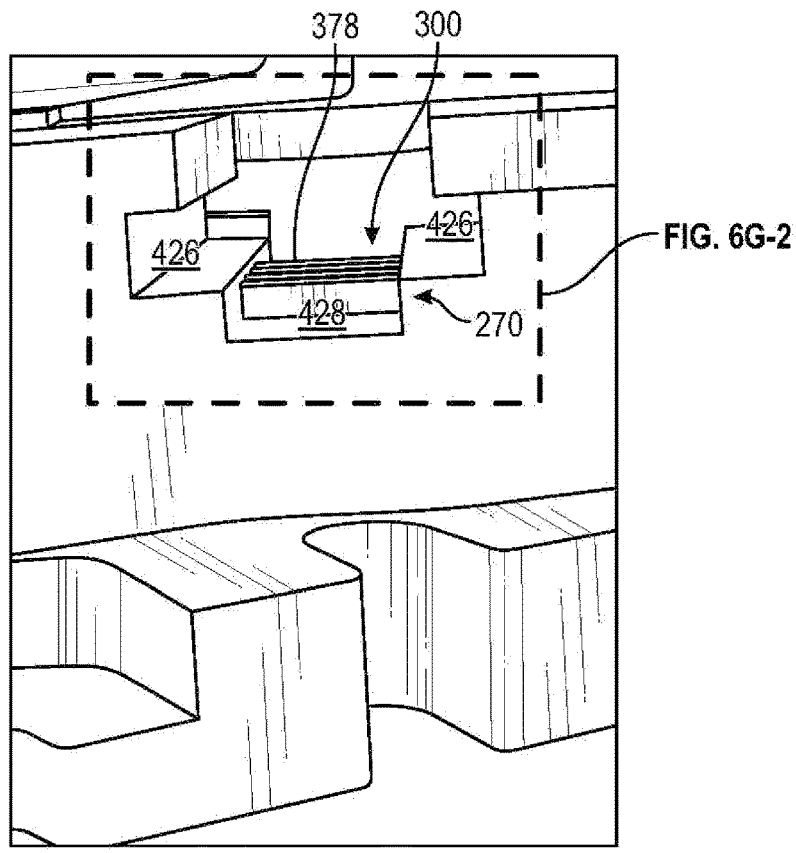
Figures 2, 6G:
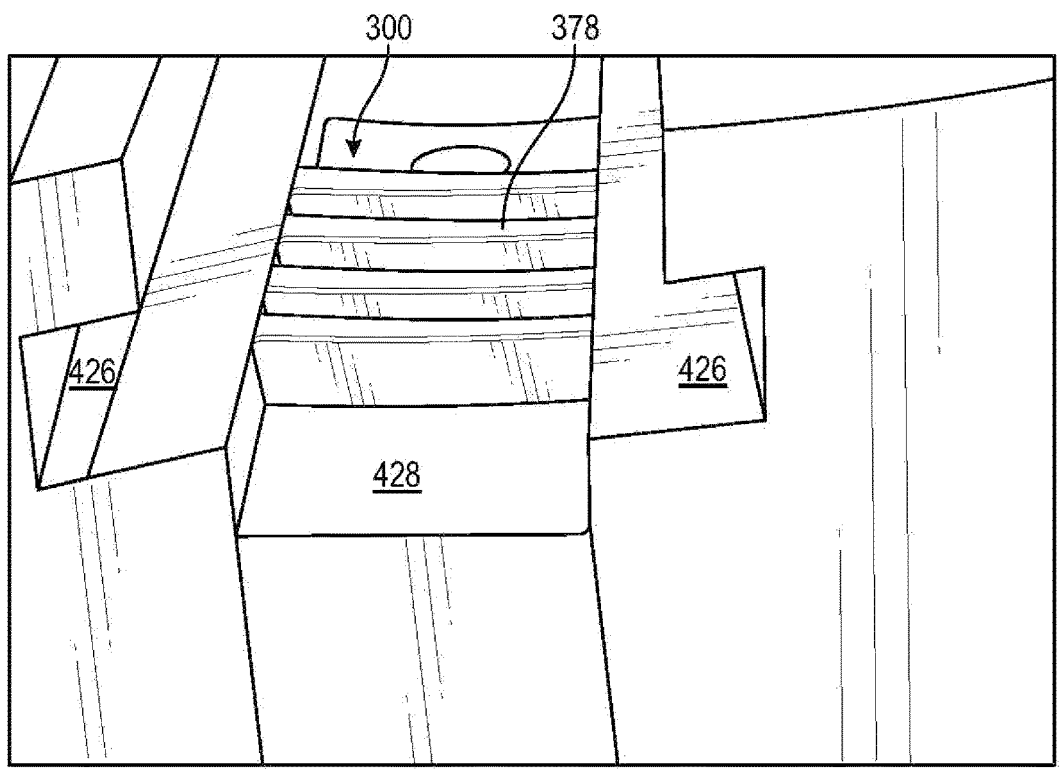

FIGS. 6C to 6E progressively illustrate a non-limiting, exemplary method of radial movement of jaws 210 (and the one exposed actuator member 214) away from center 220, with FIGS. 6F to 6G-2 illustrating a fully removed actuator member 214, fully exposing an actuator member opening 270.

Figure 6H:
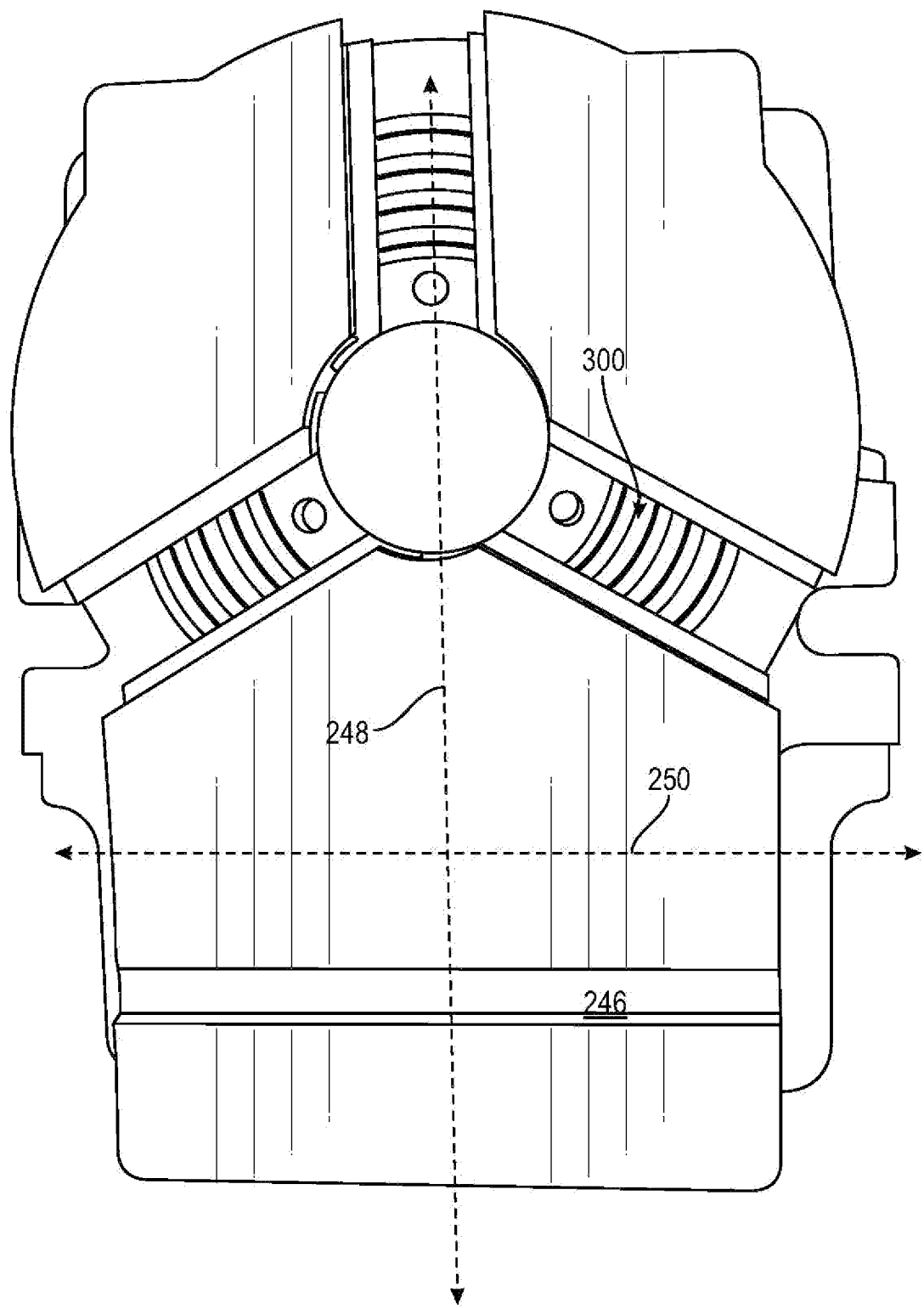

FIG. 6H is a non-limiting, exemplary top view illustration of hybrid holding device shown in FIGS. 2A to 6G-2 with all multi-jaw assemblies (i.e., jaws 210, securing members 308, and actuator members 214) removed to clearly expose and illustrate scroll plate 300 via actuator member openings 270 housed within body 200 of hybrid holding device 200 in accordance with one or more embodiments of the present invention.

FIGS. 7A to 7D are non-limiting, exemplary illustrations of a multi-jaw assembly of the hybrid holding device shown in FIGS. 2A to 6H in accordance with one or more embodiments of the present invention. As illustrated in FIGS. 2A to 7D, multi-jaw assembly 306 of hybrid holding device 200 may include blank-jaws 202 or working-jaws 210. In the non-limiting, exemplary instance, hybrid holding device 200 includes at least three multi-jaw assemblies 306 that move in unison to one of a tightening or a releasing position, which may be either a radial move to a center 220 or radial move away from center 220.

Multi-jaw assembly 306 of hybrid holding device 200 may further comprise of a securing member 308 that is detachably fastened to a jaw 210 or 200 with fasteners 310, with securing member 308 engaging an actuator member 214 (detailed below).

Actuator member 214 engages scroll plate 300 of drive mechanism 304, which enables actuator member 214 to move, which, in turn, moves securing member 308 and associated jaw 212/210.

FIGS. 8A to 8E-2 are non-limiting, exemplary illustrations of a jaw of a multi-jaw assembly of hybrid holding device shown in FIGS. 2A to 7D in accordance with one or more embodiments of the present invention. As illustrated, a working jaw 210 of multi-jaw assembly 306 is comprised of one or more engagement surfaces 216, 234, and others to grip hold of one or more holding surfaces of workpiece 106. In particularly, a jaw 210 is comprised of lateral engagement surface to engage a workpiece laterally (e.g., sideways) and top engagement surfaces to engage a workpiece from a top side of jaw 210.

A bottom side 312 of a jaw 212 or 210 includes two parallel raised surfaces 314 that have serrations 316 on top sides 318 for engagement with actuator member 214. Further included are through-holes 320 positioned in between the two parallel raised surfaces 314 for receiving fasteners 310 for detachably securing jaw 210 (or 200) with a securing member 214.

Figure 8B:
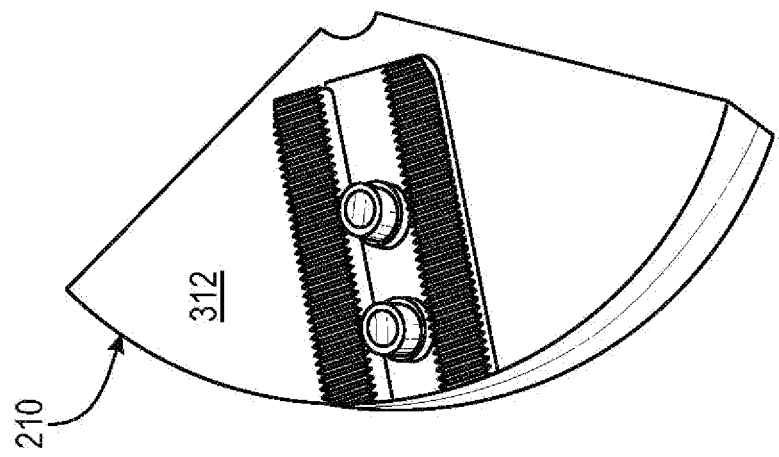
Figure 8A:
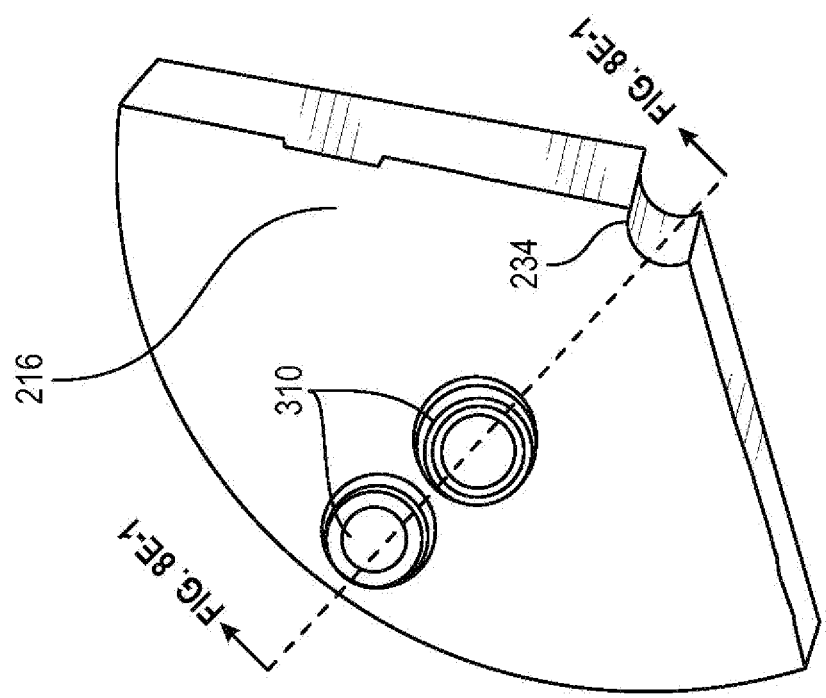
Figure 8C:
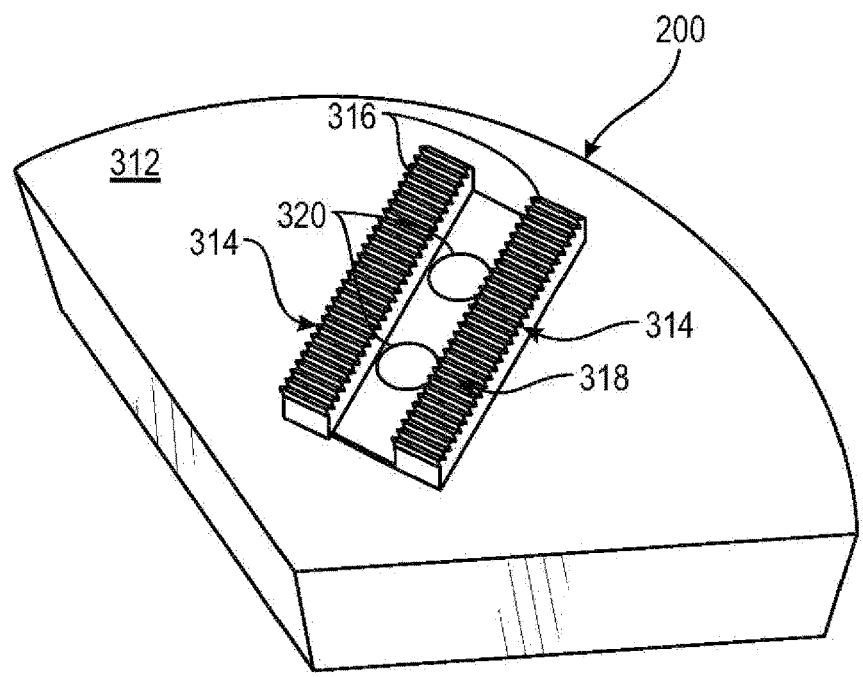
Figure 8D:
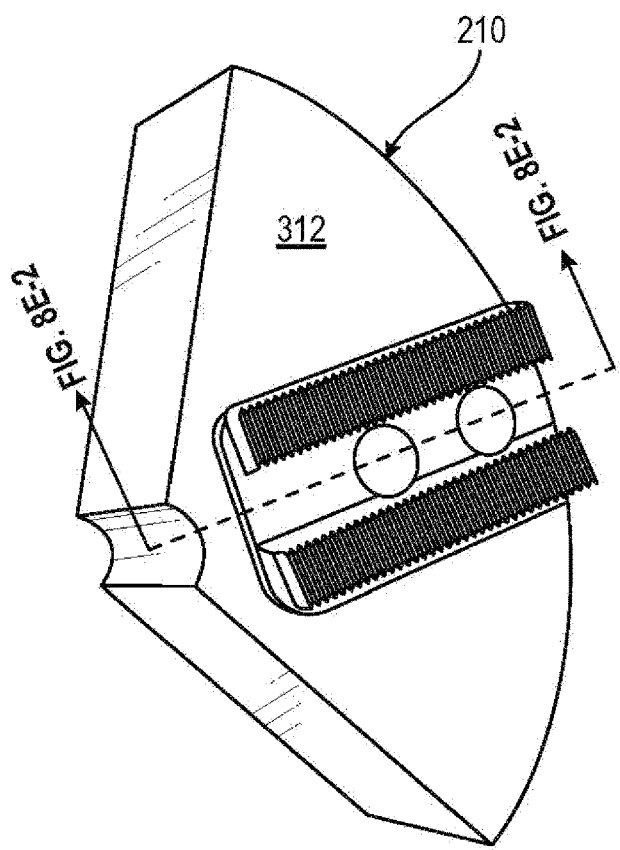
Figures 1, 8E:
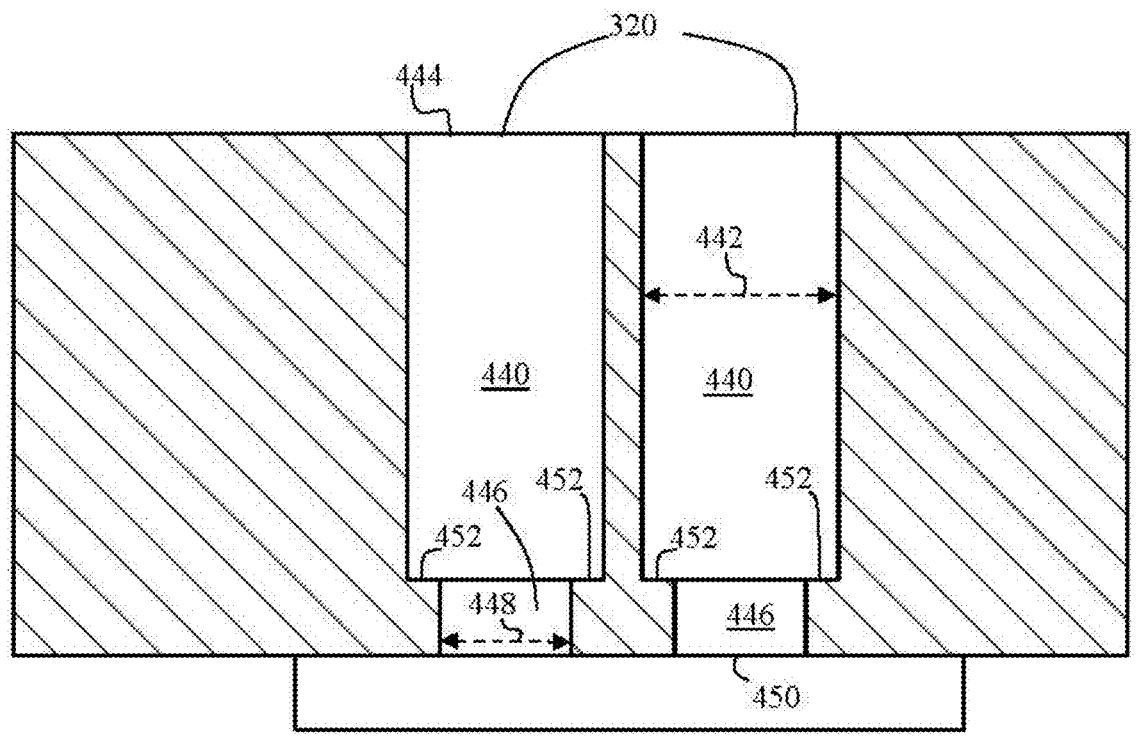
Figures 2, 8E:
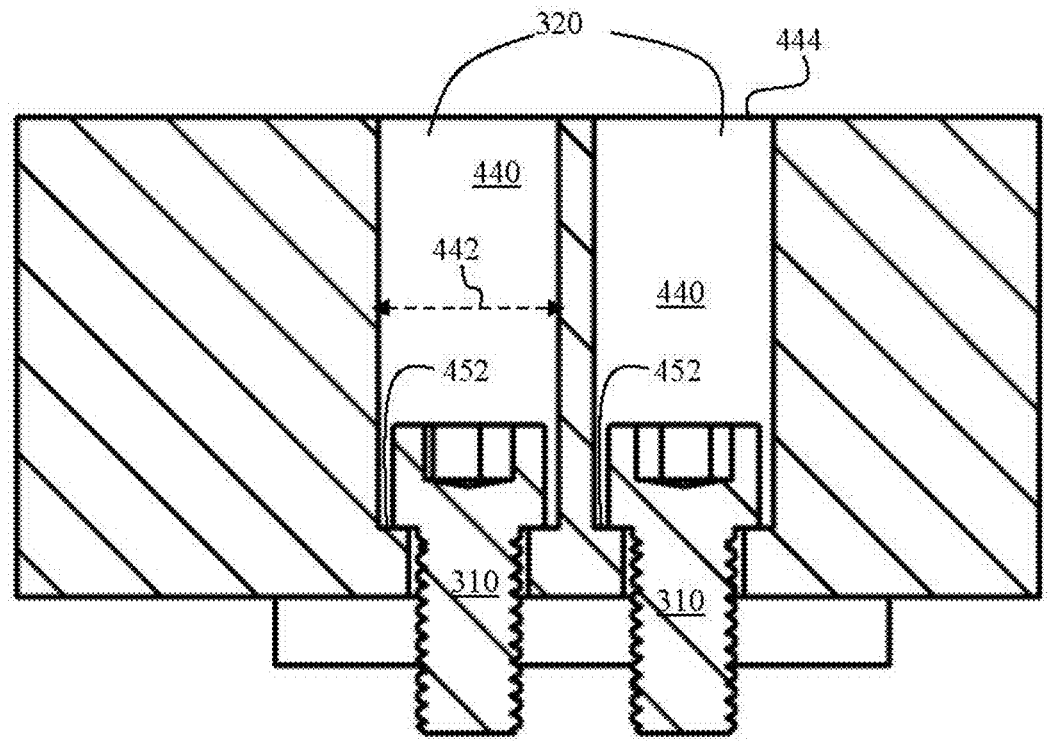

As best illustrated in FIGS. 8E-1 and 8E-2, a through-hole 320 is comprised of a top through-hole portion 440 with a first diameter 442, with top through hole portion 440 extending from a top opening 444 on a top surface of jaw 212 or 210. Through-hole 320 further includes a bottom through-hole portion 446 with a second diameter 448 extending from a bottom opening 450 on a bottom surface of jaw 212 or 210.

Top through-hole portion 440 and bottom through-hole portion 450 are concentric, with second diameter 448 having a shorter span than first diameter 442 to form a supporting surface 452 for fastener 310. This way, a short fastener may be used that will be position well inside the through hole 320 (inserted from top opening 444), with bottom surface of fastener 310 head resting against supporting surface 452 (best shown in FIG. 8E-2).

Through-hole 320 is comprised of a set of through-holes (two of them) that are aligned and positioned in between the two parallel raised surfaces 314 for receiving a set of fasteners 310 for detachably securing jaws 212 or 210 with securing member 308.

It should be noted the size and configuration or shape of jaws 212 or 210 may be varied for gripping different types of workpieces and further for providing different methods of gripping the same workpieces. The combination of the vast range of motion of jaws 210 and their variety of different shapes and sizes used may accommodate a very large number of various shaped workpieces. Accordingly, the different shapes and sizes of jaws 212/210 may be provided for hybrid holding device.

FIGS. 9A to 9G are non-limiting, exemplary illustration of a securing member of the multi-jaw assembly of hybrid holding device shown in FIGS. 2A to 8E-2 in accordance with one or more embodiments of the present invention. As illustrated, securing member 308 is comprised of an elongated T-slot nut having a T-configuration cross-sectional profile that extends longitudinally along a length 324 of securing member 308.

Securing member 308 is comprised of a single, unitary block with a threaded through-hole opening 326 for receiving set of fasteners 310 from jaw 202/210 to detachably fasten jaw 212/210 to securing member 308. Securing member 308 has block portion 328 that is secured onto bottom side 312 of jaw 202/210 (between raised surfaces 314 (best shown in FIG. 9D).

Figure 7A:
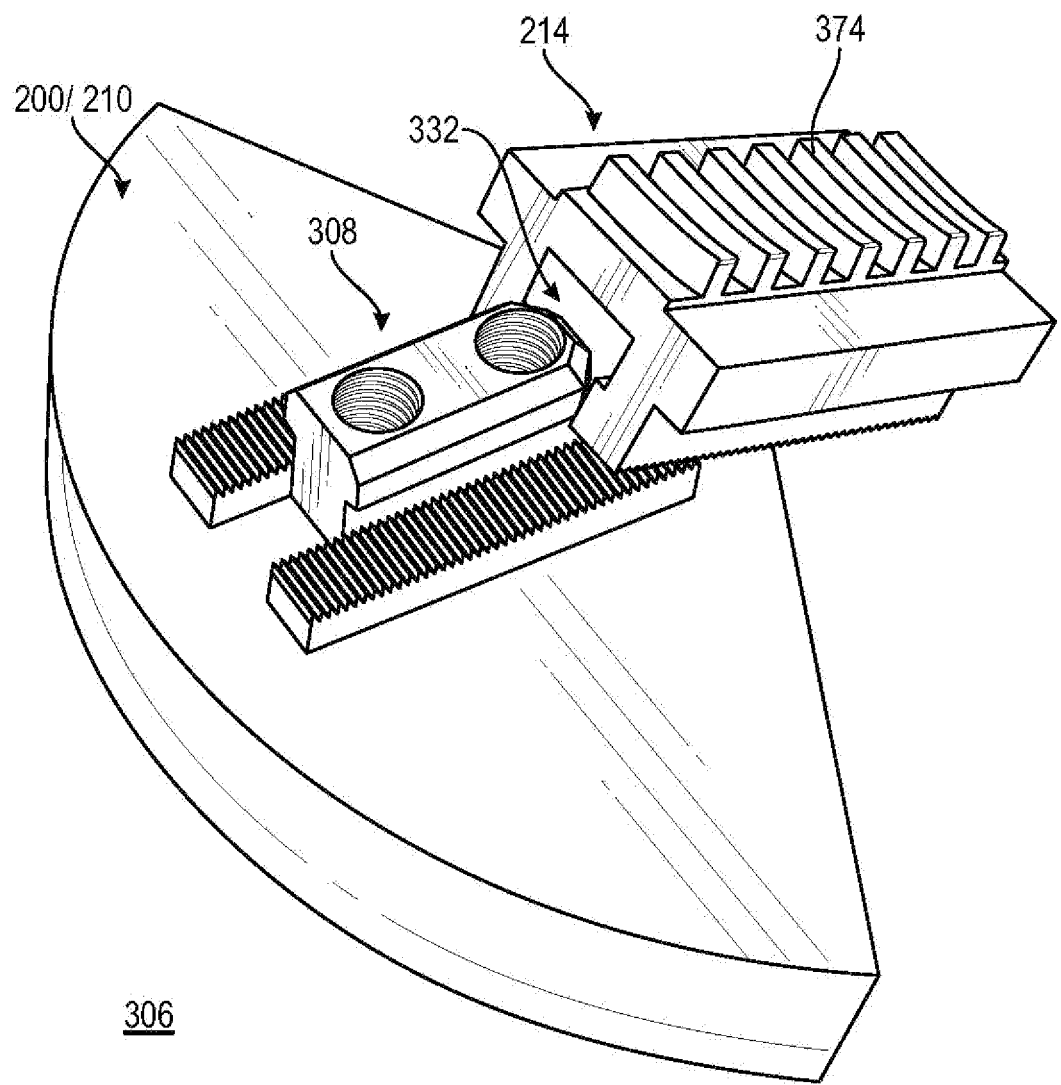
FIGS. 7A to 7D are non-limiting, exemplary illustrations of a multi-jaw assembly of the hybrid holding device shown in FIGS. 2A to 6H in accordance with one or more embodiments of the present invention.
Figure 7B:
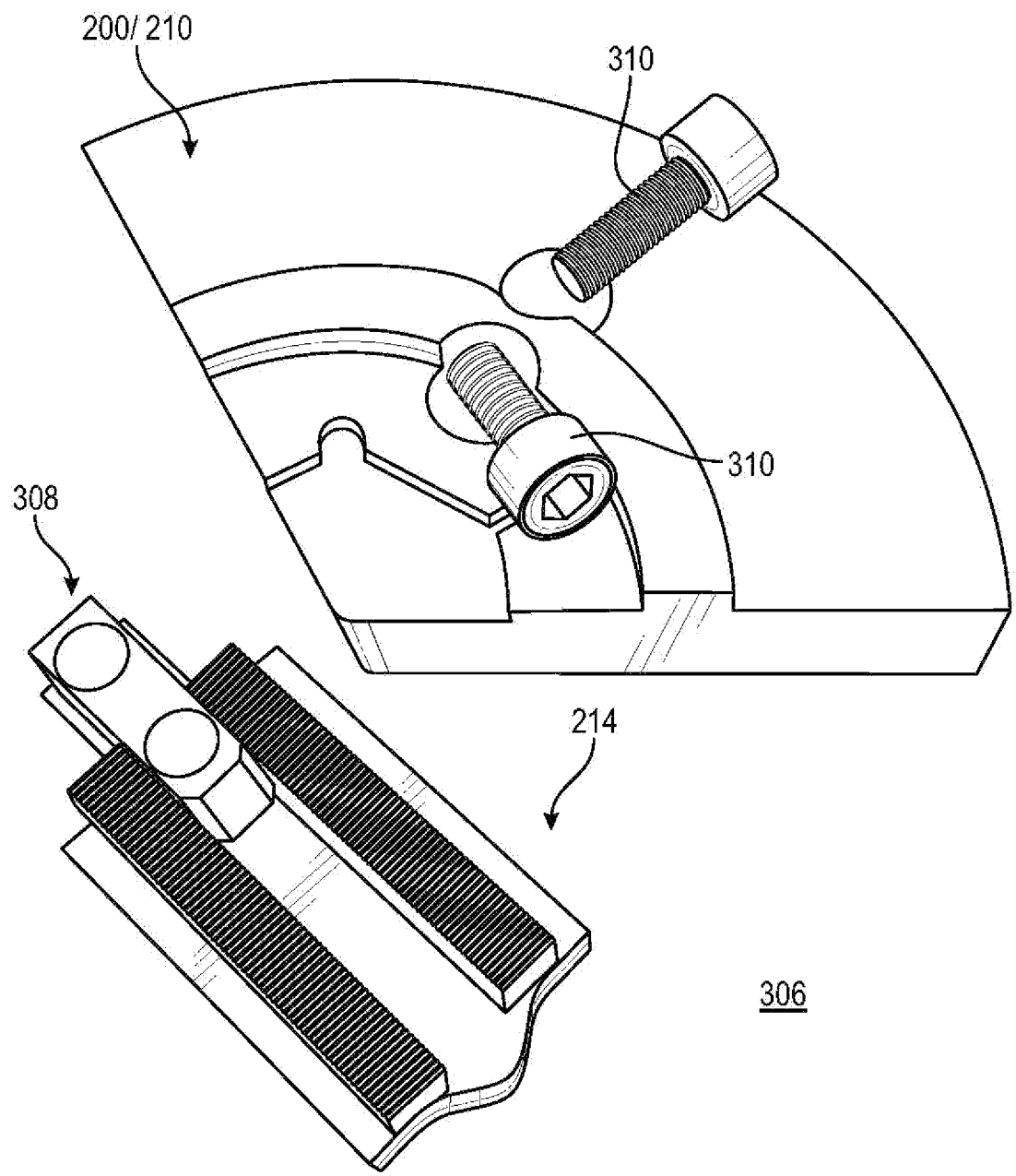
Figure 7C:
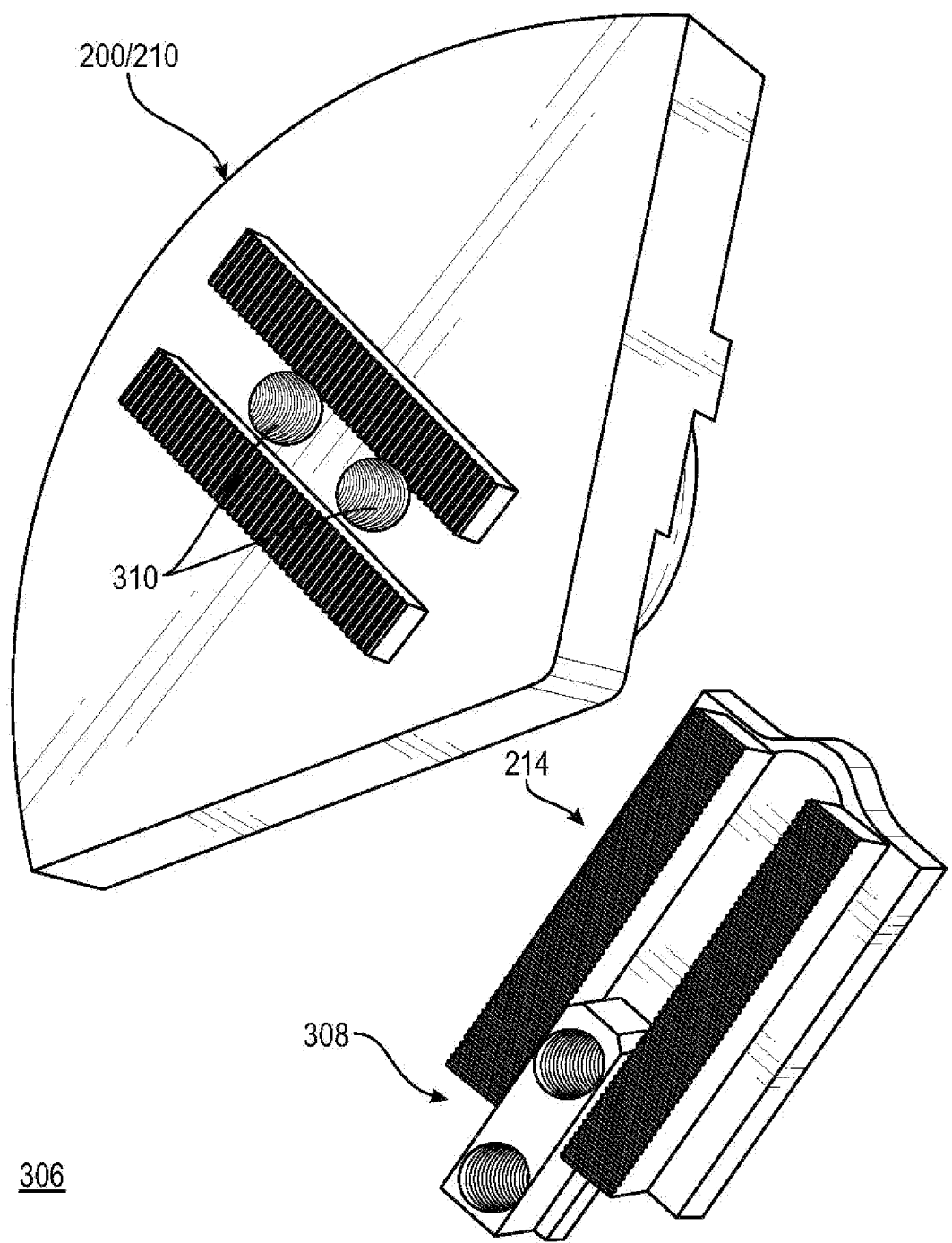
Figure 7D:
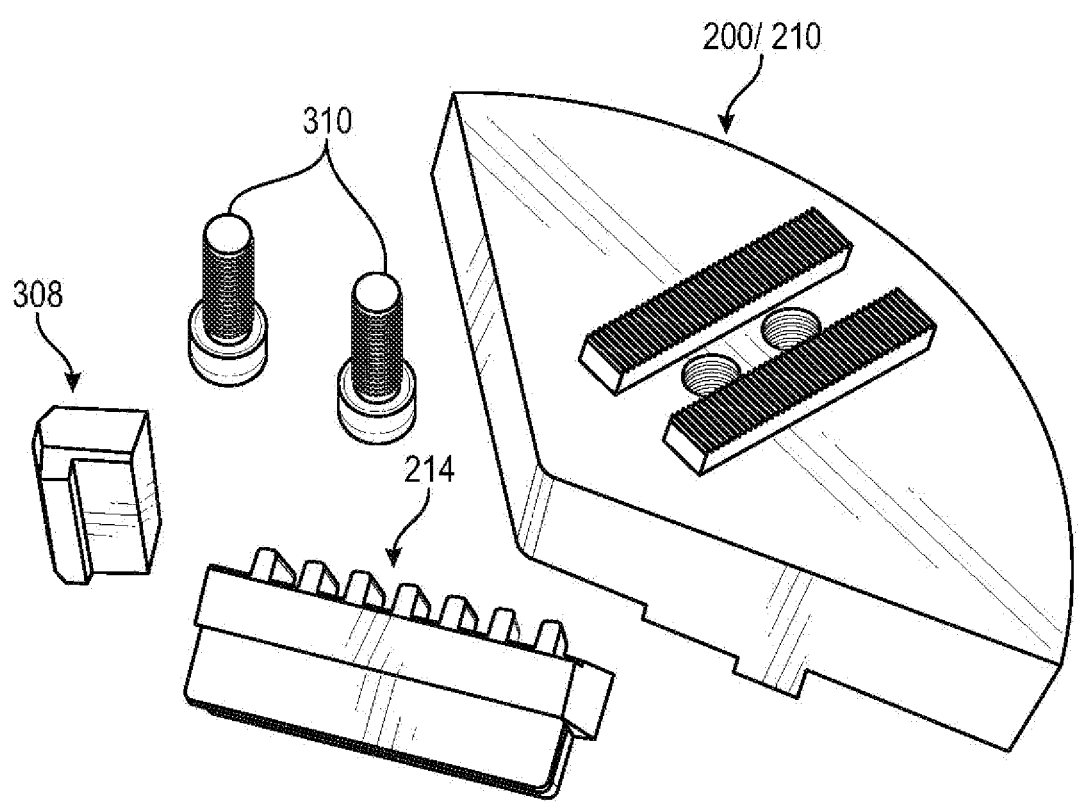

Securing member 308 has a set of flanges 330 (that form the "T") that extend along length 324 that enable securing member 308 to slide onto a corresponding T-slot track 332 of actuator member 214 (best shown in FIG. 7A). Front-end 334 of securing member 308 at flanges 330 is chamfered 336 for easy insertion and removal in relation to actuator member 214, while rear end 338 is flat.

It should be noted that threaded through-hole opening 326 is oriented transverse length 324 of securing member 308 and that openings 326 are aligned, and parallel threaded through-openings.

Figure 9A:
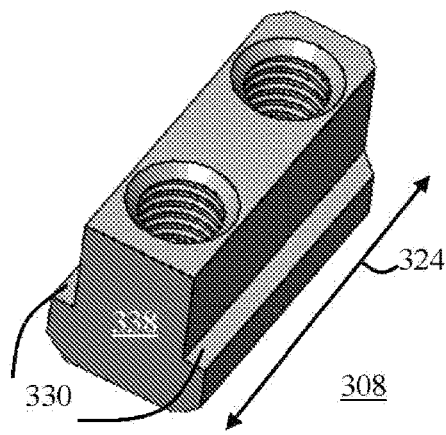
FIGS. 9A to 9G are non-limiting, exemplary illustration of a securing member of the multi-jaw assembly of hybrid holding device shown in FIGS. 2A to 8E-2 in accordance with one or more embodiments of the present invention.
Figure 9B:
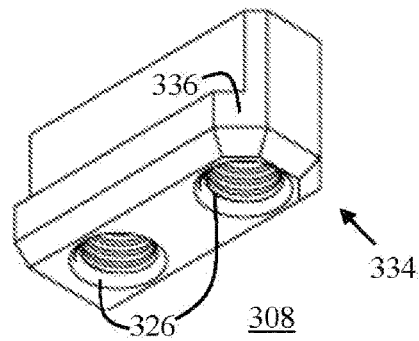
Figure 9C:
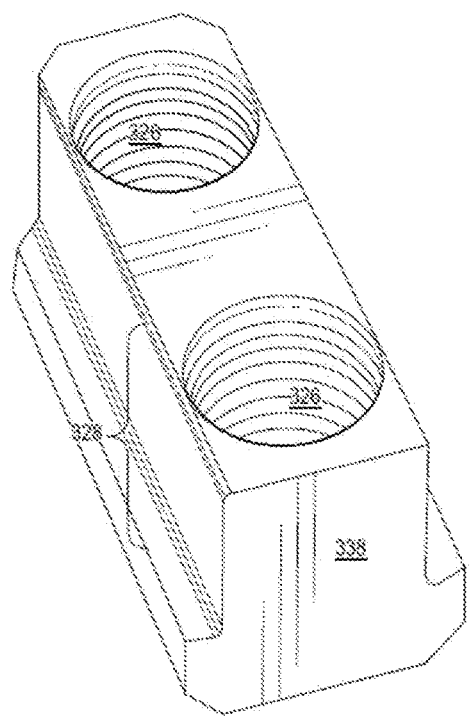
Figure 9D:
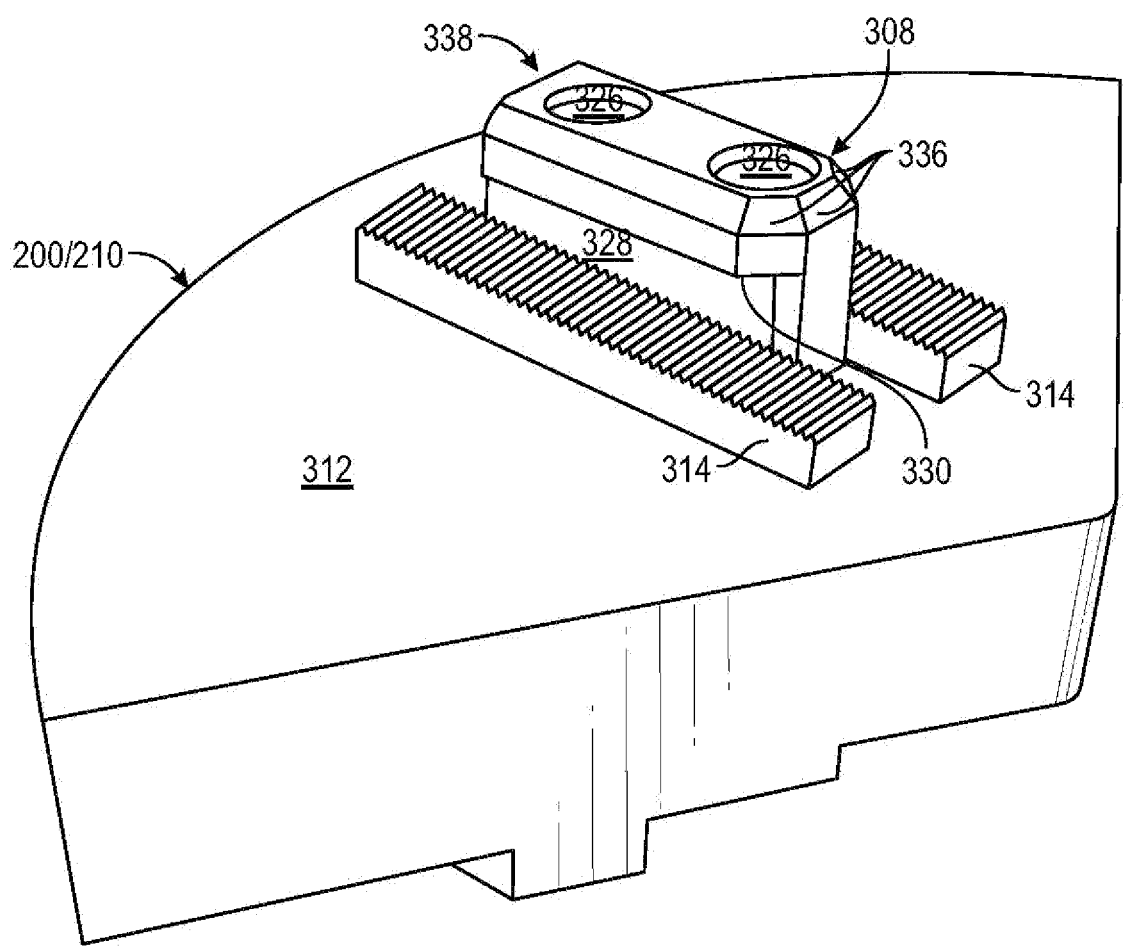
Figure 9E:
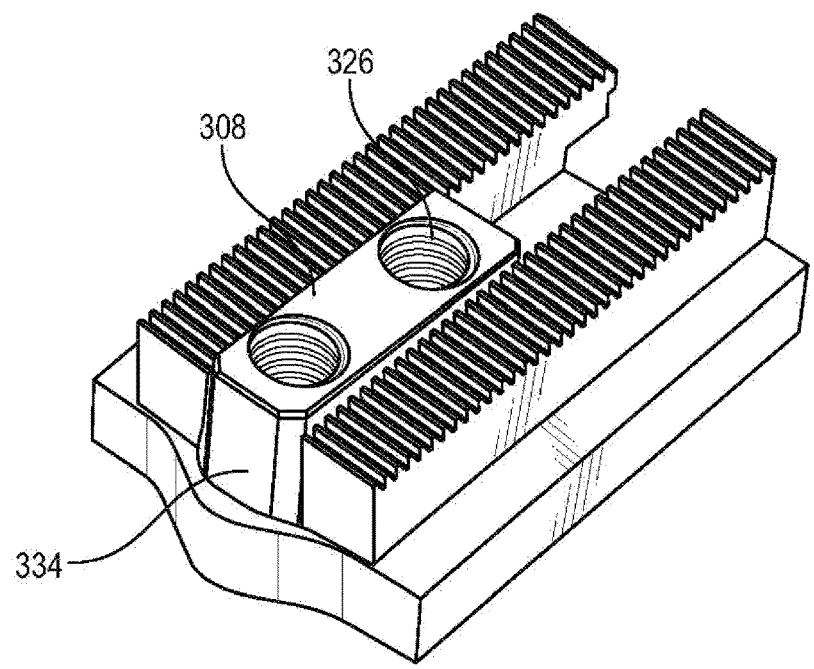
Figure 9F:
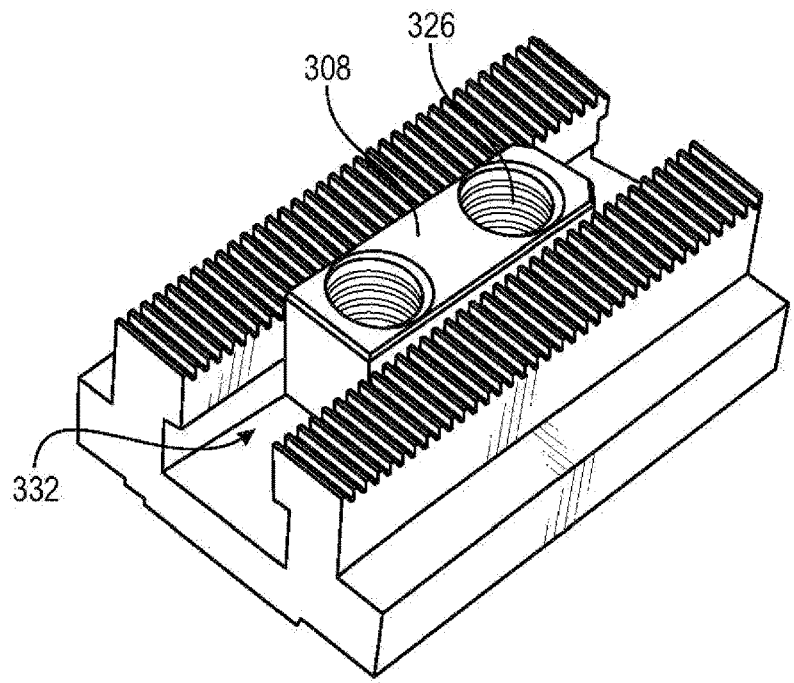
Figure 9G:
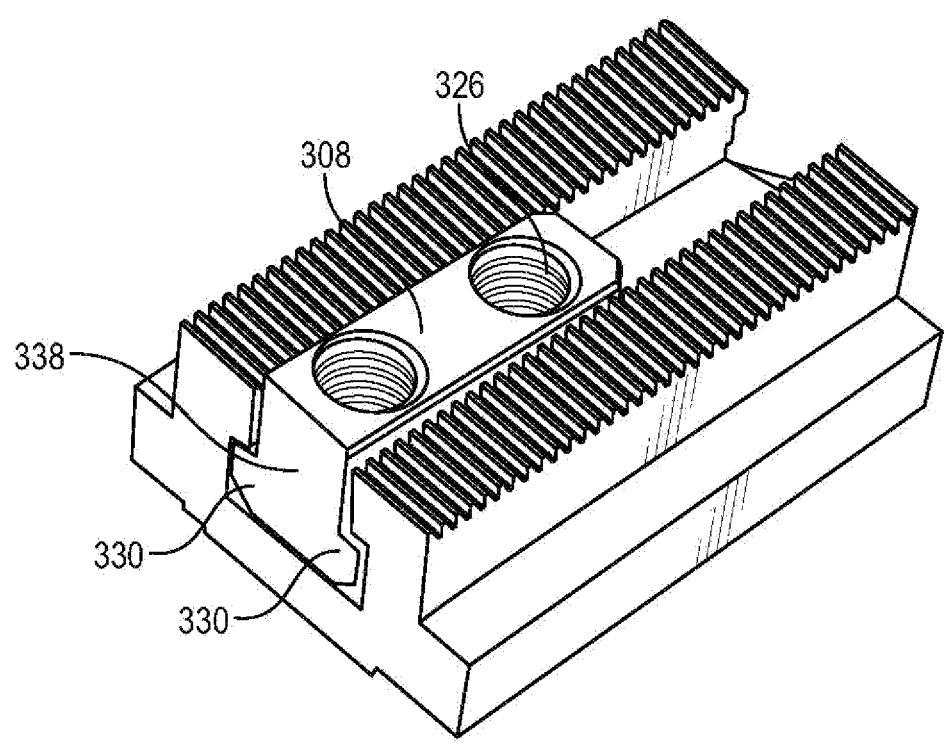

As best illustrated in FIGS. 9E to 9G, the position of securing member 308 in relation to actuator member 214 may be varied within T-slot track 332 when securing member 308 is attached to jaw 212/210. This provides a much greater flexibility in terms of gripping different size/shape workpiece 106. In other words, variations in the position of securing member 308 in relation to actuator member 214 with T-slot track 332 will enable varying the positioning of jaws 210/212 in relation to actuator member 214 in view of workpiece 106 configuration.

FIGS. 10A to 10I are non-limiting, exemplary illustration of an actuator member of the multi-jaw assembly of hybrid holding device shown in FIGS. 2A to 9G in accordance with one or more embodiments of the present invention. As illustrated, the multi-jaw assembly 306 is further comprised of an actuator member 214 that enables movement of a jaw 212/210 of multi-jaw assembly 202/210.

Actuator member 214 is comprised of a single unitary block comprised of first engagement surfaces (or inner surfaces) for engagement with securing member 308, and second engagement surfaces for engagement with jaw 202/210, drive mechanism 304, and actuator member opening 270 of body 202 of hybrid holding device 200.

Actuator member 214 is comprised of a main section 340 that has a length that extends along a longitudinal axis 342 of actuator member 214, and a width that extends along a transverse axis 344 of actuator member 308.

Main section 340 has a rear side 346 that is flat and a front side 348 that has centrally extended projection 350 configured as a V shape that prevents further movement of actuator member 214 toward center of hybrid holding device 200, with lateral sections 352 of the front side being flat. Main section 340 further includes lateral sides 354 that extend along longitudinal axis 342 of actuator member 214 and that are flat.

Actuator member 214 is further comprised of two projecting, parallel walls 356 raised from a top side 358 of main section 340, a distance 360 away from distal edges 362 of lateral sides 354 of main section 340 to form actuator engagement flanges 364. The formed flanges 364 due to position of walls 356 in relation to main section 340 enable engagement with corresponding surfaces of actuator member openings 270 of body 202 of hybrid holding device 200.

Walls 356 extend longitudinally along a general length of main section 340, defining an elongated groove or channel (a T-slot, best shown in FIG. 10D) for receiving a securing member 308, which is a T-slot nut. In other words, two inner sides 366 of walls 356 from a general T-slot for receiving securing member 308. Walls having sufficient interior and exterior heights 368 and 370 (FIG. 10D) to accommodate securing member 308 and further be secured within actuator engagement openings 270 of hybrid holding device 200. As further shown, top surface 372 walls 356 is serrated.

Figure 10A:
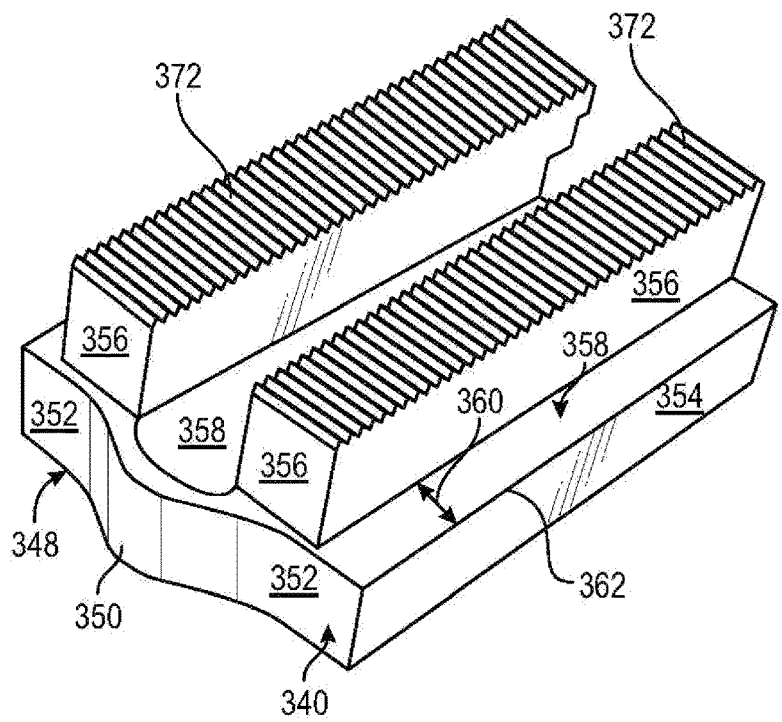
FIGS. 10A to 10I are non-limiting, exemplary illustration of an actuator member of the multi-jaw assembly of hybrid holding device shown in FIGS. 2A to 9G in accordance with one or more embodiments of the present invention.
Figure 10B:
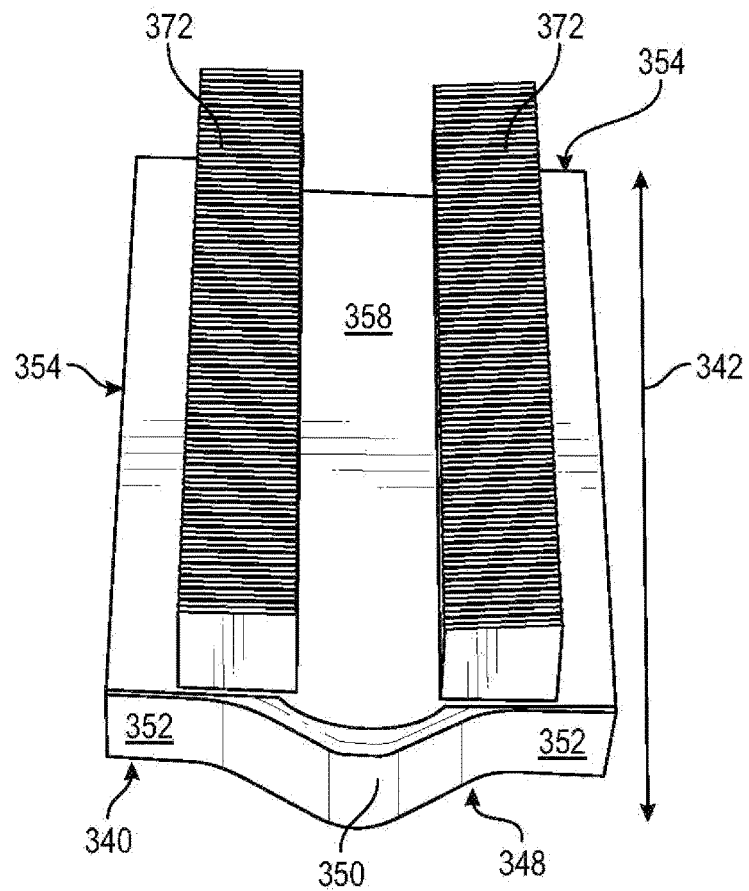
Figure 10C:
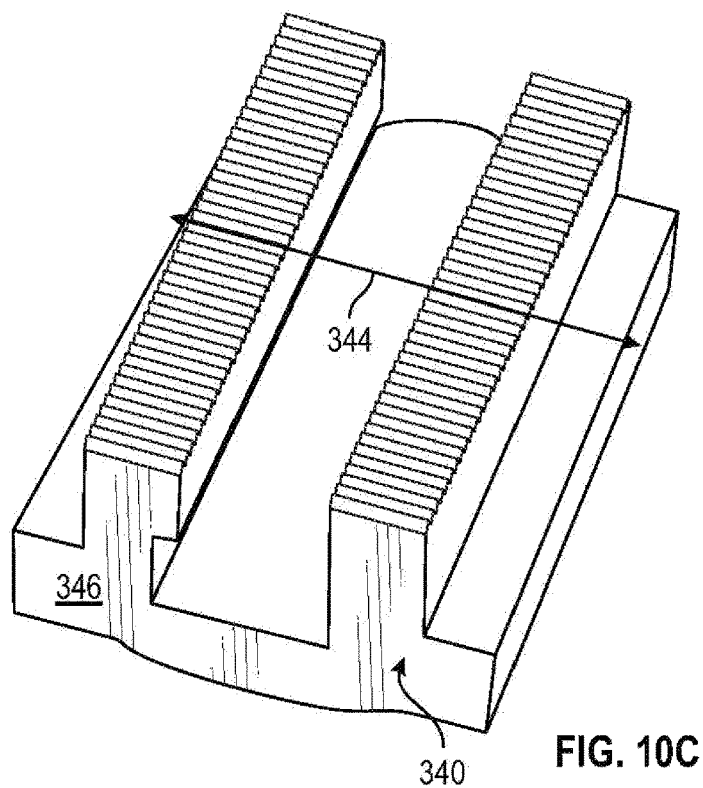
Figure 10D:
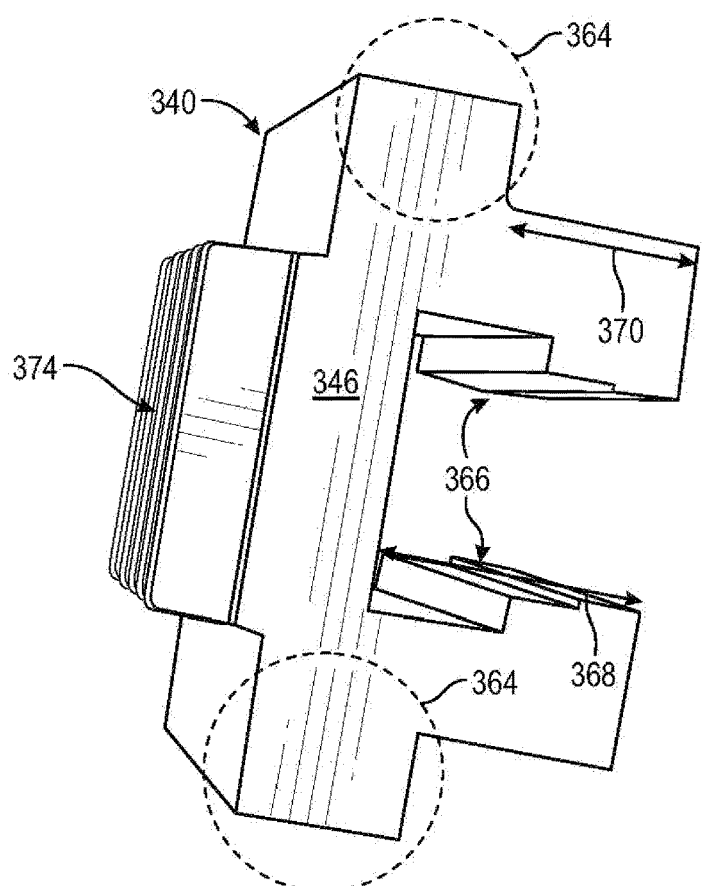
Figure 10E:
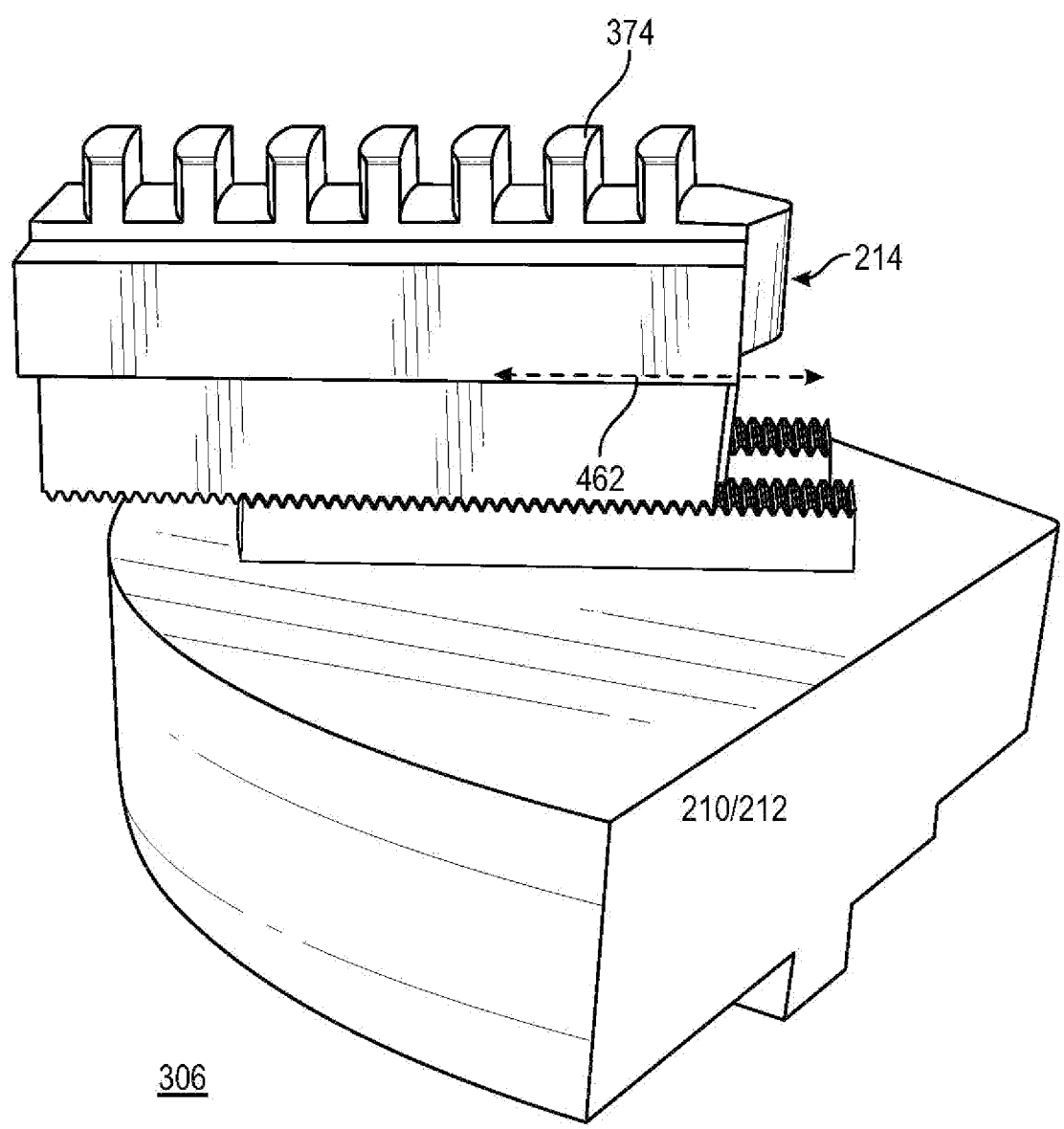
Figure 10F:
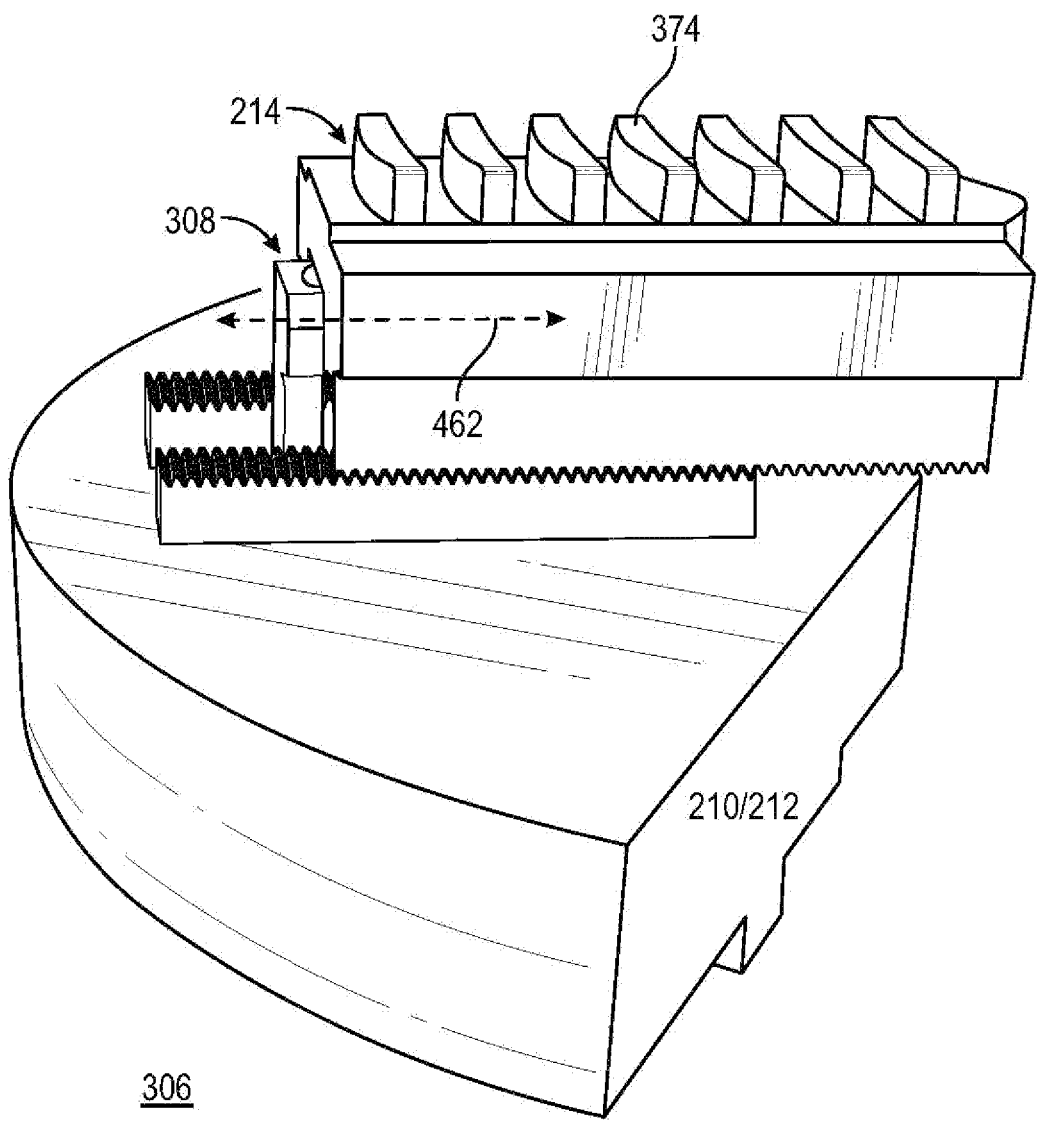
Figure 10G:
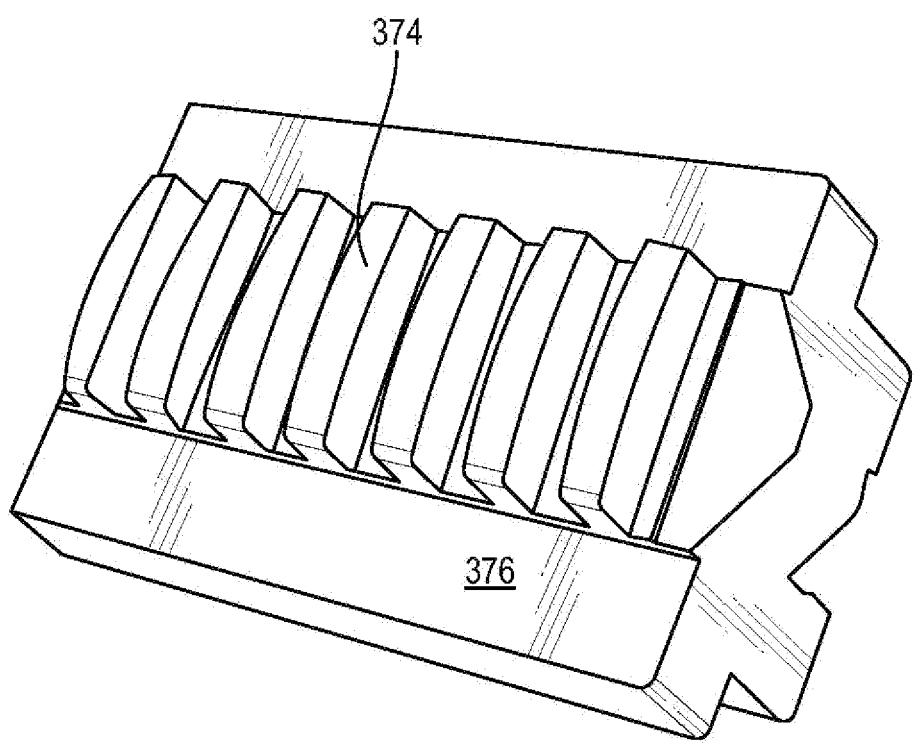
Figure 10H:
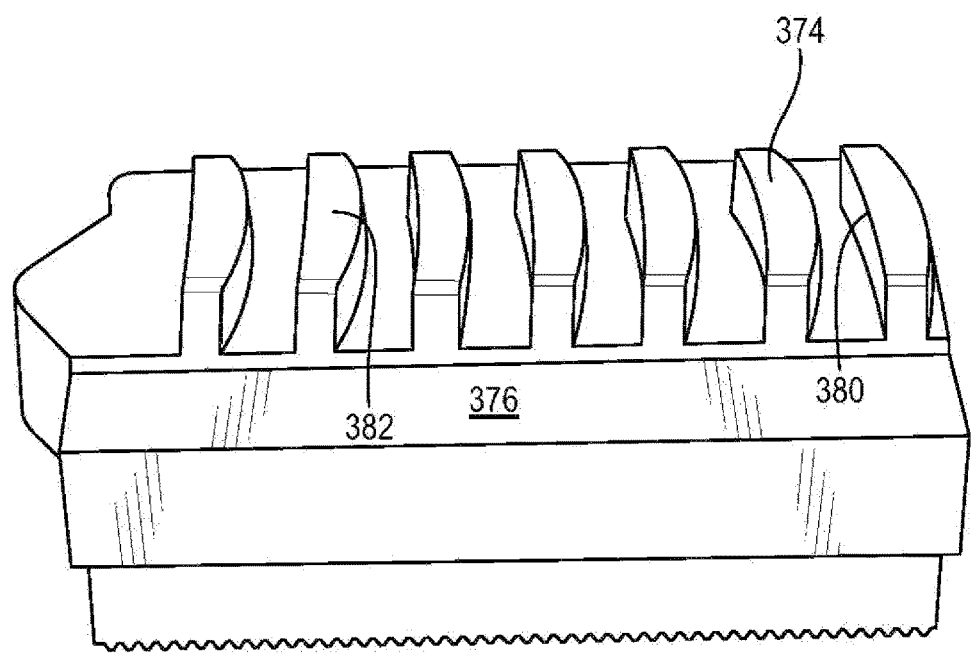
Figure 10I:
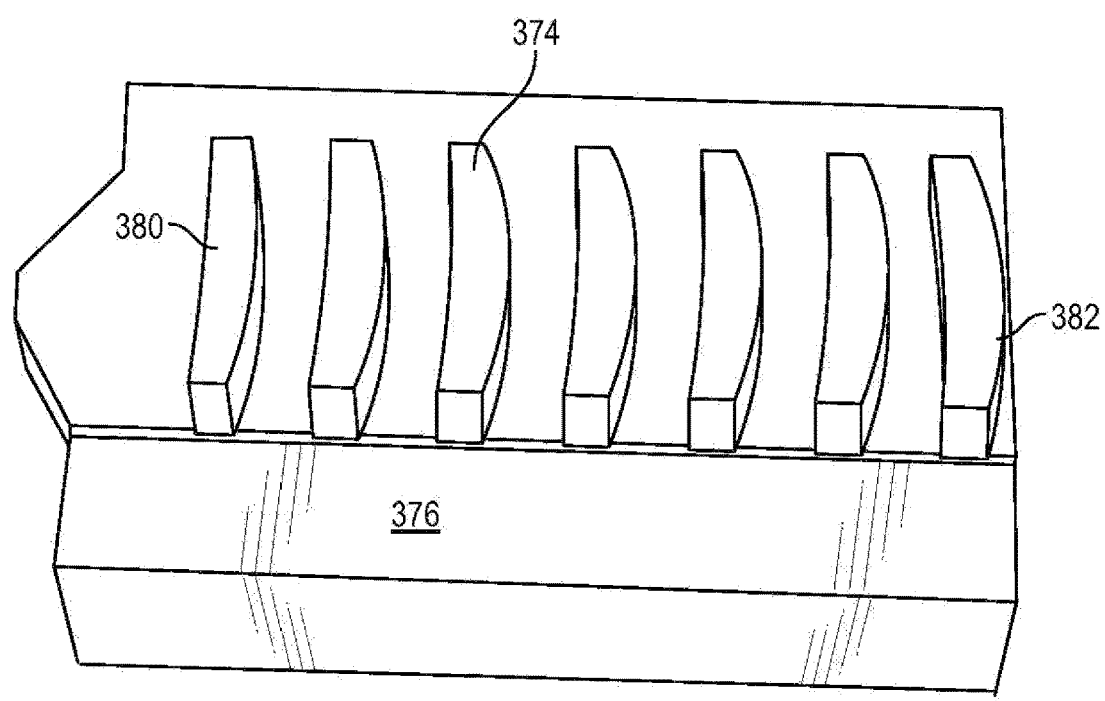

As best illustrated in FIGS. 10E and 10F, serrations of actuator member 214 engage with serrations of jaw 212/210 to prevent slippage of jaws and actuator member 214. In other words, the both set of serrations assist in positioning and retentions of jaws 212/210 in relation to each other and center 220. This way all jaws 212/210 may be equally positioned away from main center 220 (if desired) and retained therein without slippage. This will enable all jaws 212/210 to close and open in unison (if desired). In other words, relationship between serrations and the fact that securing member 308 may slide 462 to different positions within T-slot track 332 in relation to actuator member 214 enable positioning of jaws 210/212 in relation to actuator member 214 in view of the workpiece configuration. For example, the workpiece may comprise an odd shape where one of the jaws 212/210 must be positioned further away from center 220 compared to the others to firmly securely hold workpiece.

As best illustrated in FIGS. 10A to 10I and 6A to 6H, walls 356 include outer sides that are generally flat that enable actuator member 214 to smoothly engage corresponding flat surfaces of actuator engagement openings 270 of hybrid holding device 200. The shape of actuator member openings 270 of body 202 of hybrid holding device 200 are configured to receive actuator members 214. This prevents wobbling of actuator member 214 as it is moved. In other words, the commensurate configurations of actuator member openings 270 and the projections (e.g., flanges 364) of actuator members 214 prevent undesired motions (e.g., in plane or out of plane motions) of actuator member 214 as it is moved.

In particular, as best illustrated in FIG. 6G-2, actuator member openings 270 is comprised of longitudinally extending lateral recesses 426 that receive flanges 364 of actuator member 214. Actuator member openings 270 further include a bottom recess 428 that functions as a relief to receive bottom side 376 of actuator member 214, and allow interlocking cogs 374 (detailed below) to pass through to reach rail guides 378 (FIG. 11J) of scroll plate 300. As best illustrated in FIG. 11L, bottom recess 428 leads to opening 270 through which rail-guides 378 of scroll plate 300 are exposed to engage interlocking cogs 374 of actuator member 214.

Actuator member 214 is further comprised of a set of interlocking cogs 374 raised from a bottom side 376 that engage a spiral railing guides 378 of scroll plate 300, which when rotated, moves actuator member 214 by the set of interlocking cogs 374. Interlocking cogs 374 are comprised of a first curved side 380 with a first arc radius, and a second curved side 382 with a second arc radius.

FIGS. 11A to 11L are non-limiting, exemplary illustration of a drive mechanism housing and a drive mechanism of hybrid holding device shown in FIGS. 2A to 10I in accordance with one or more embodiments of the present invention.

Figure 11A:
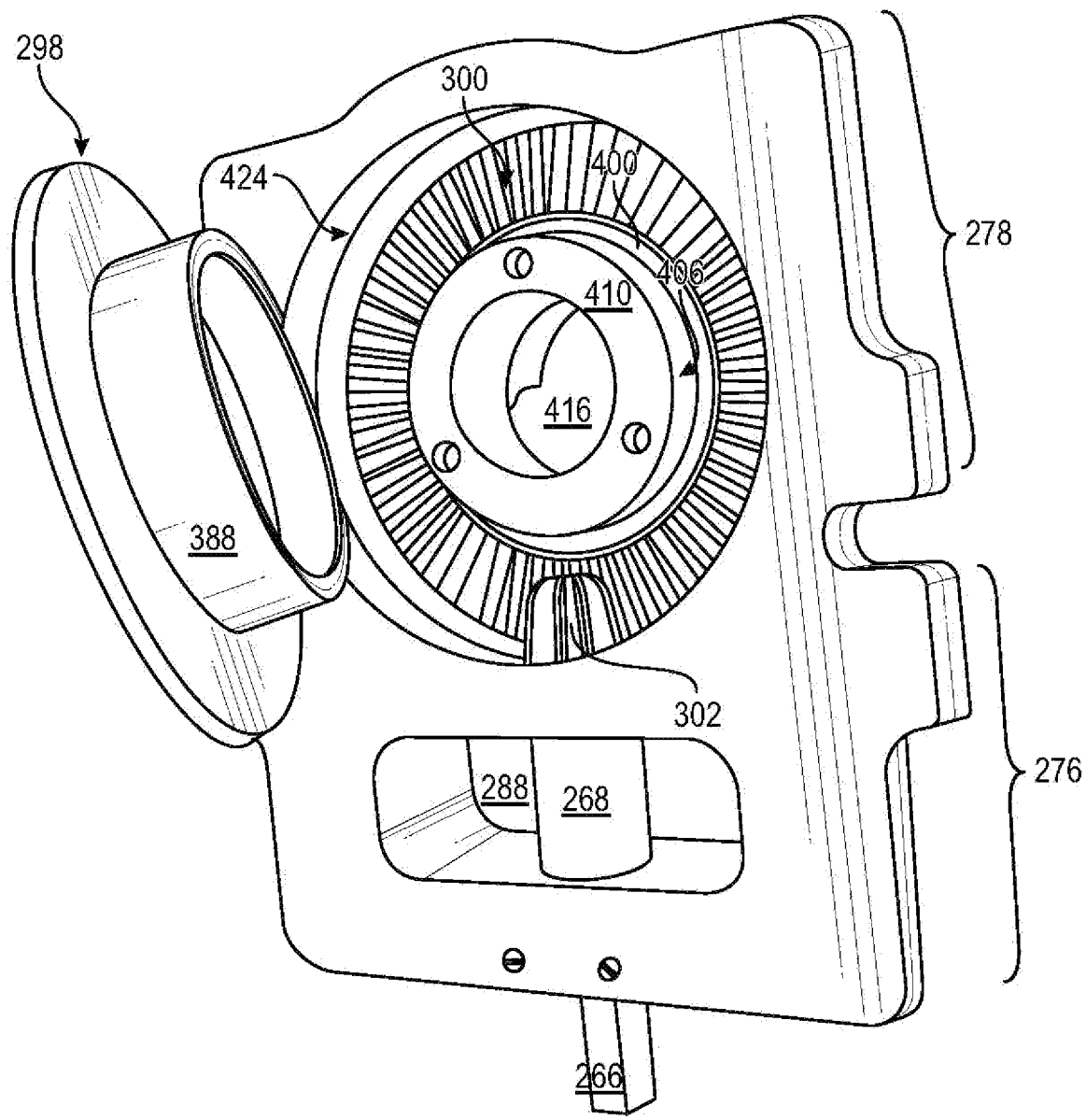
FIGS. 11A to 11L are non-limiting, exemplary illustration of a drive mechanism housing and a drive mechanism of hybrid holding device shown in FIGS. 2A to 10I in accordance with one or more embodiments of the present invention.
Figure 11B:
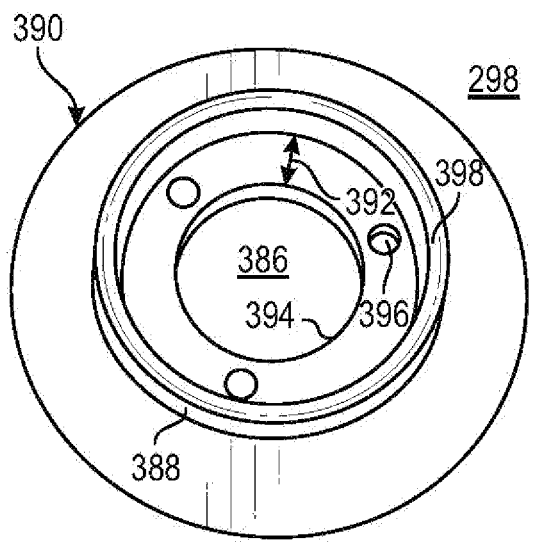
Figure 11C:
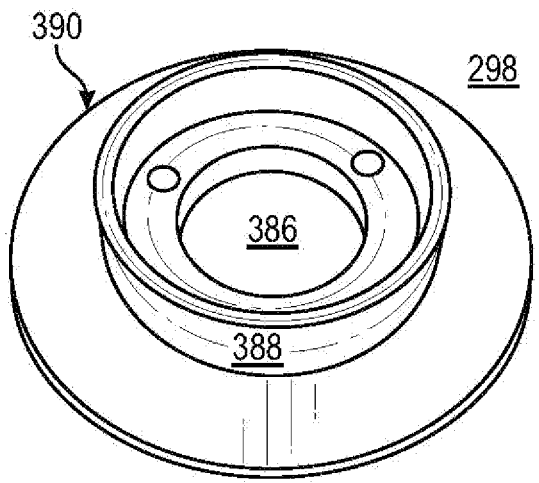
Figure 11D:
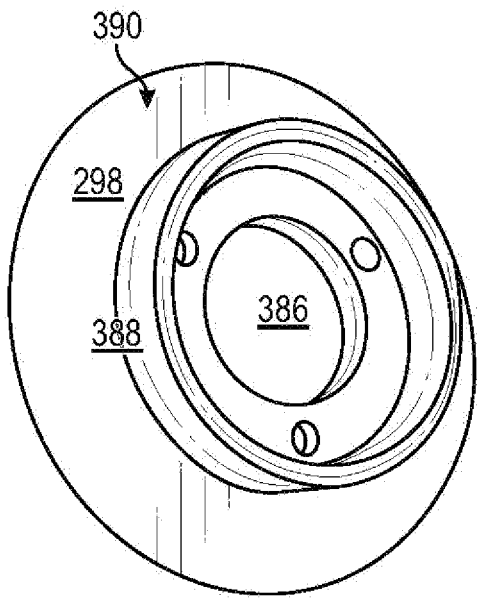
Figure 11E:
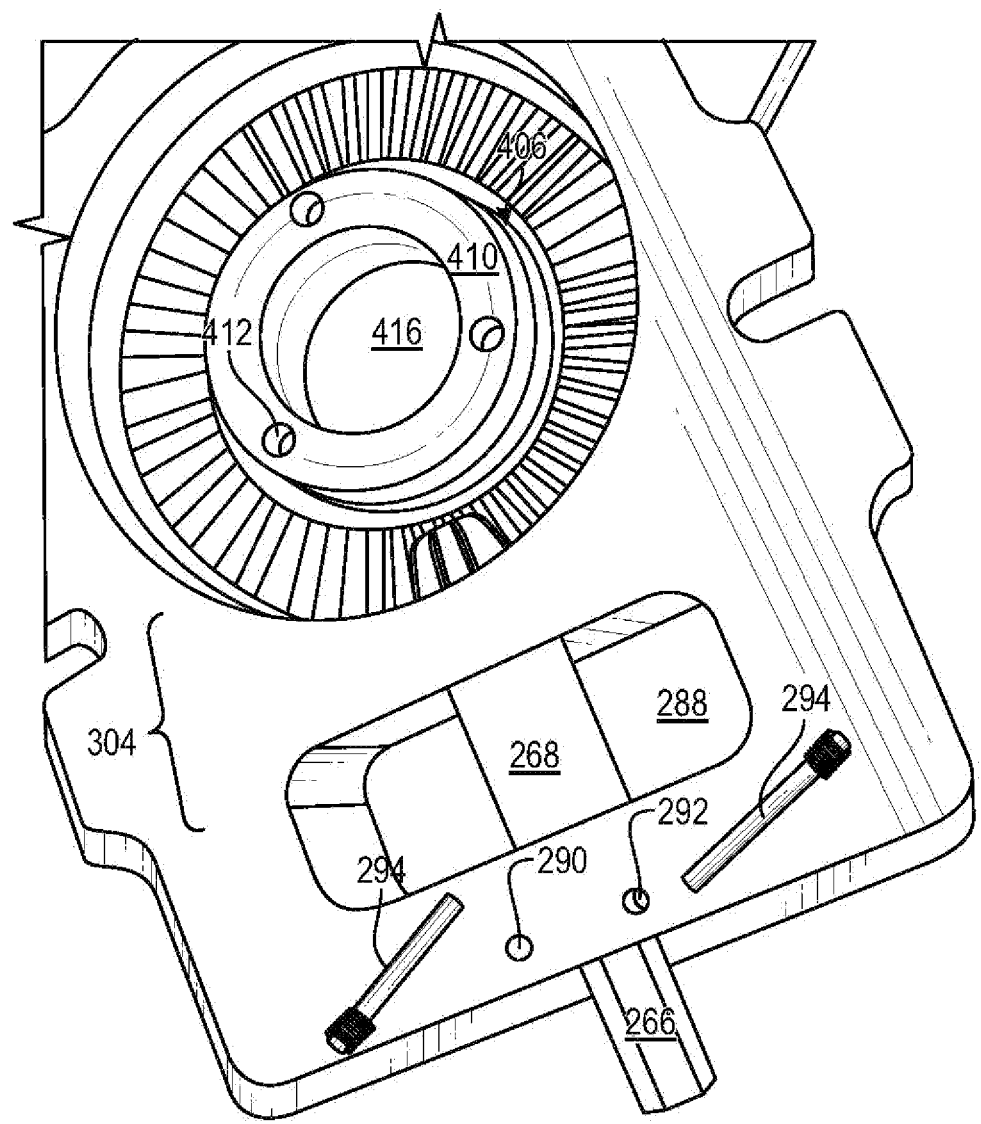
Figure 11F:
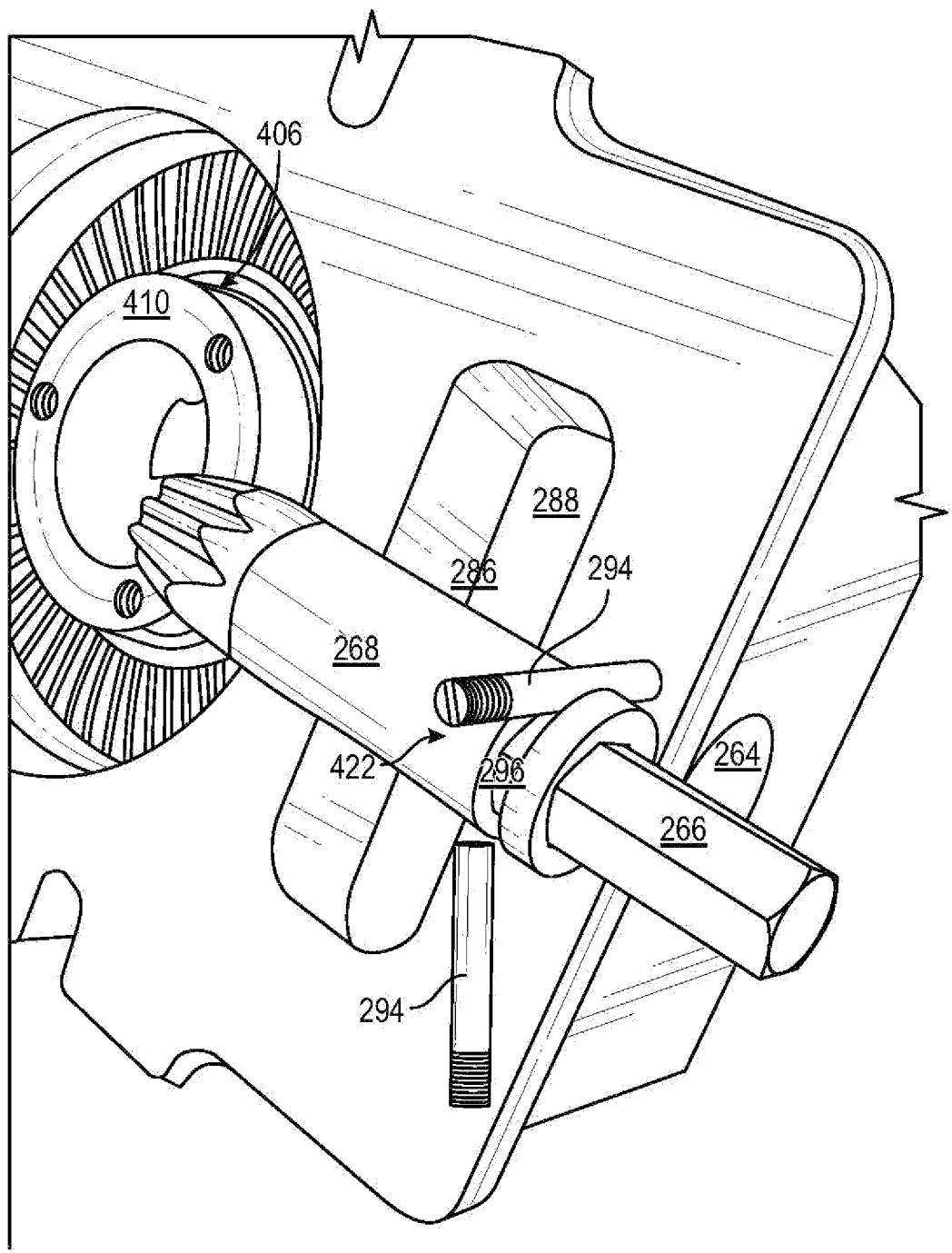
Figure 11G:
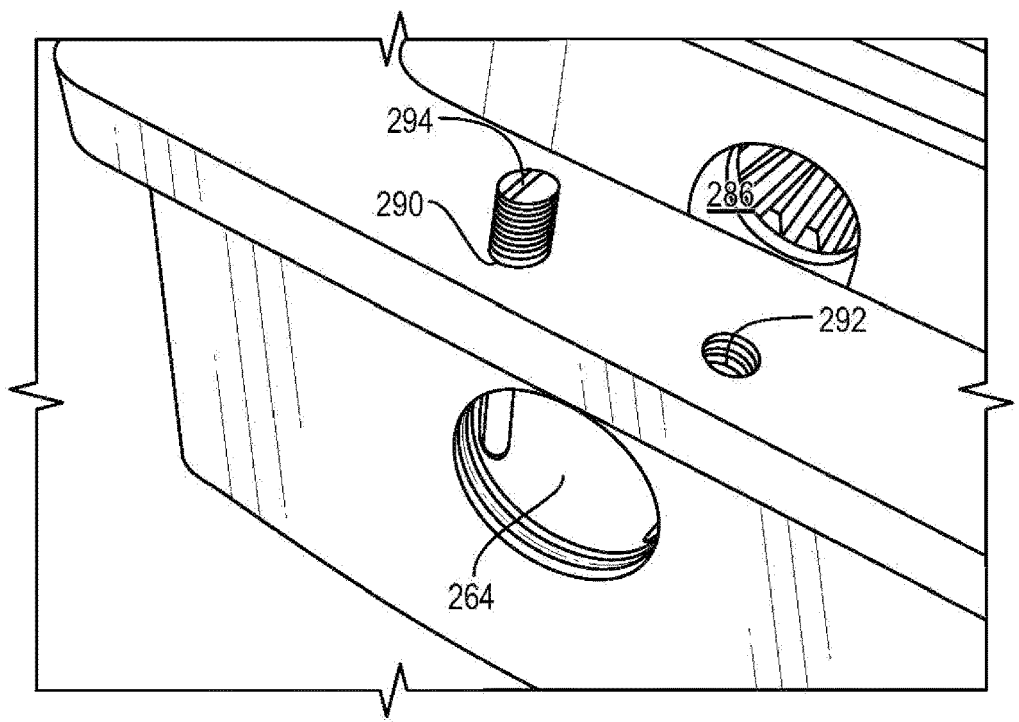
Figure 11H:
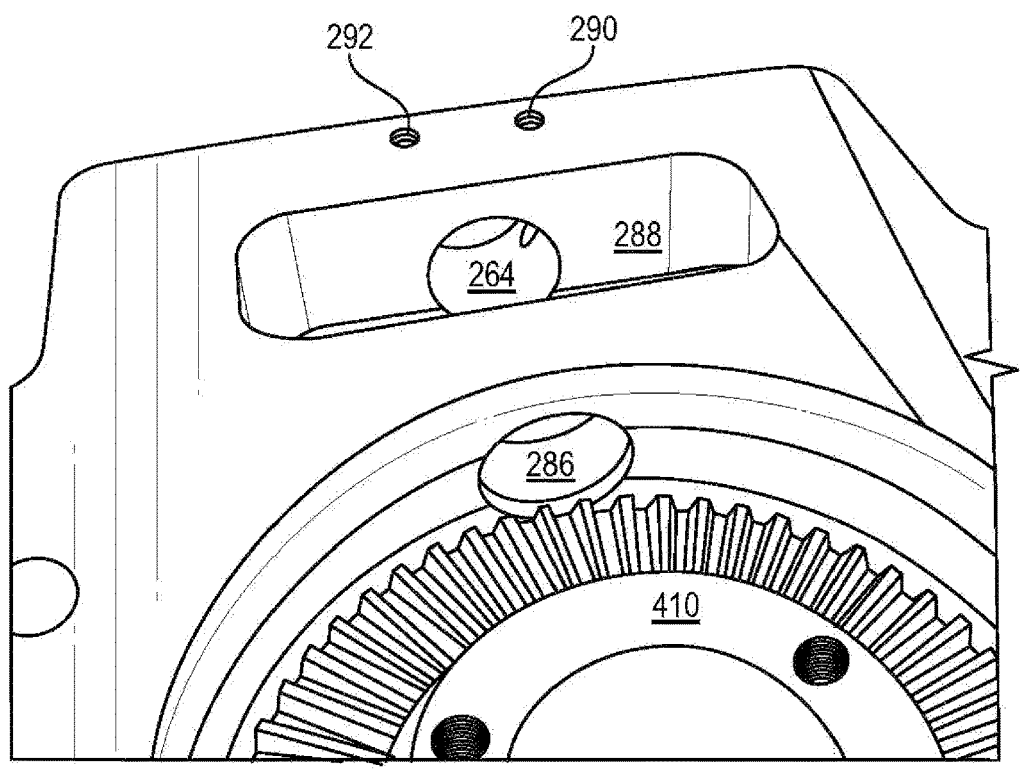
Figure 11I:
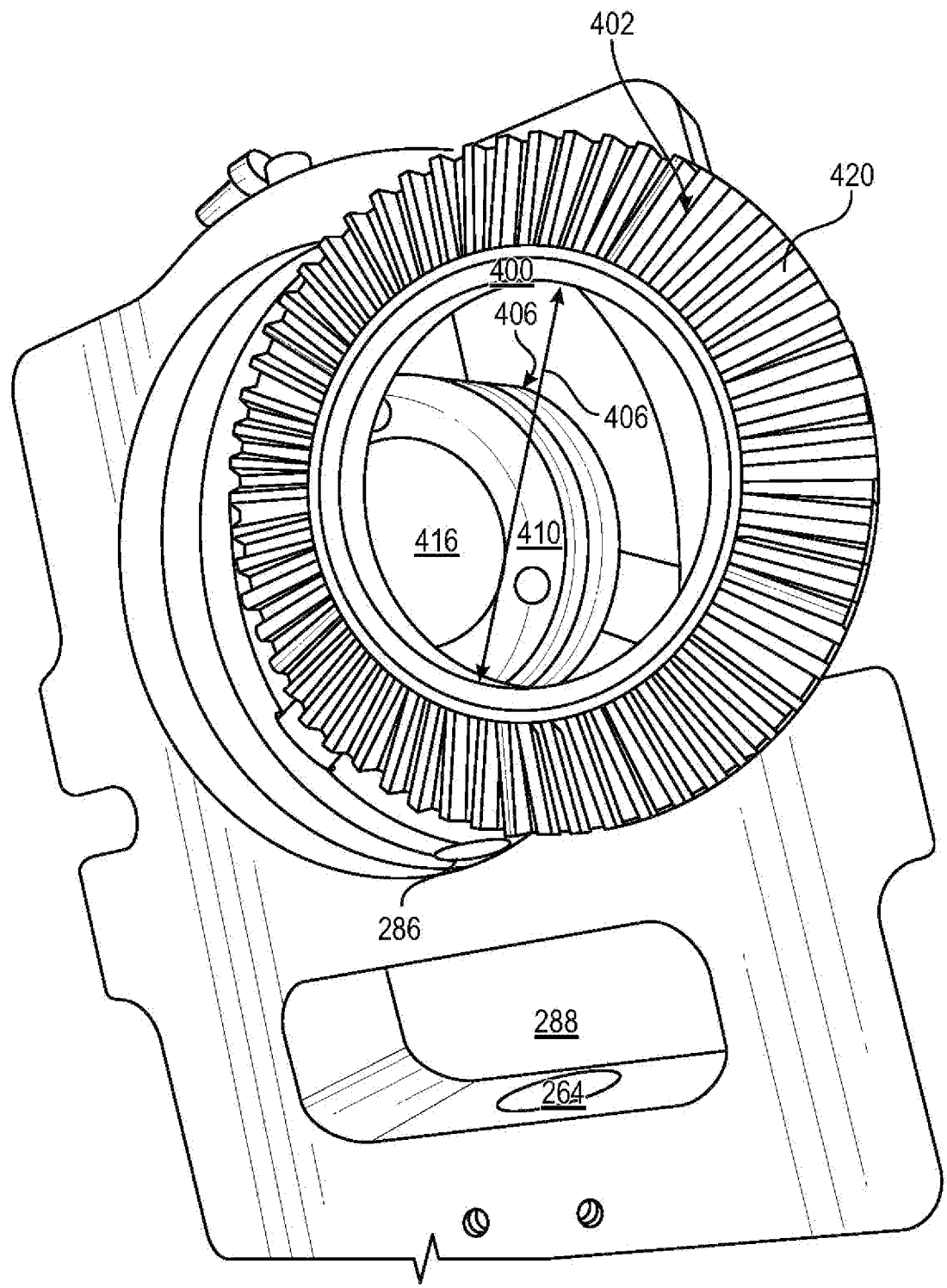
Figure 11J:
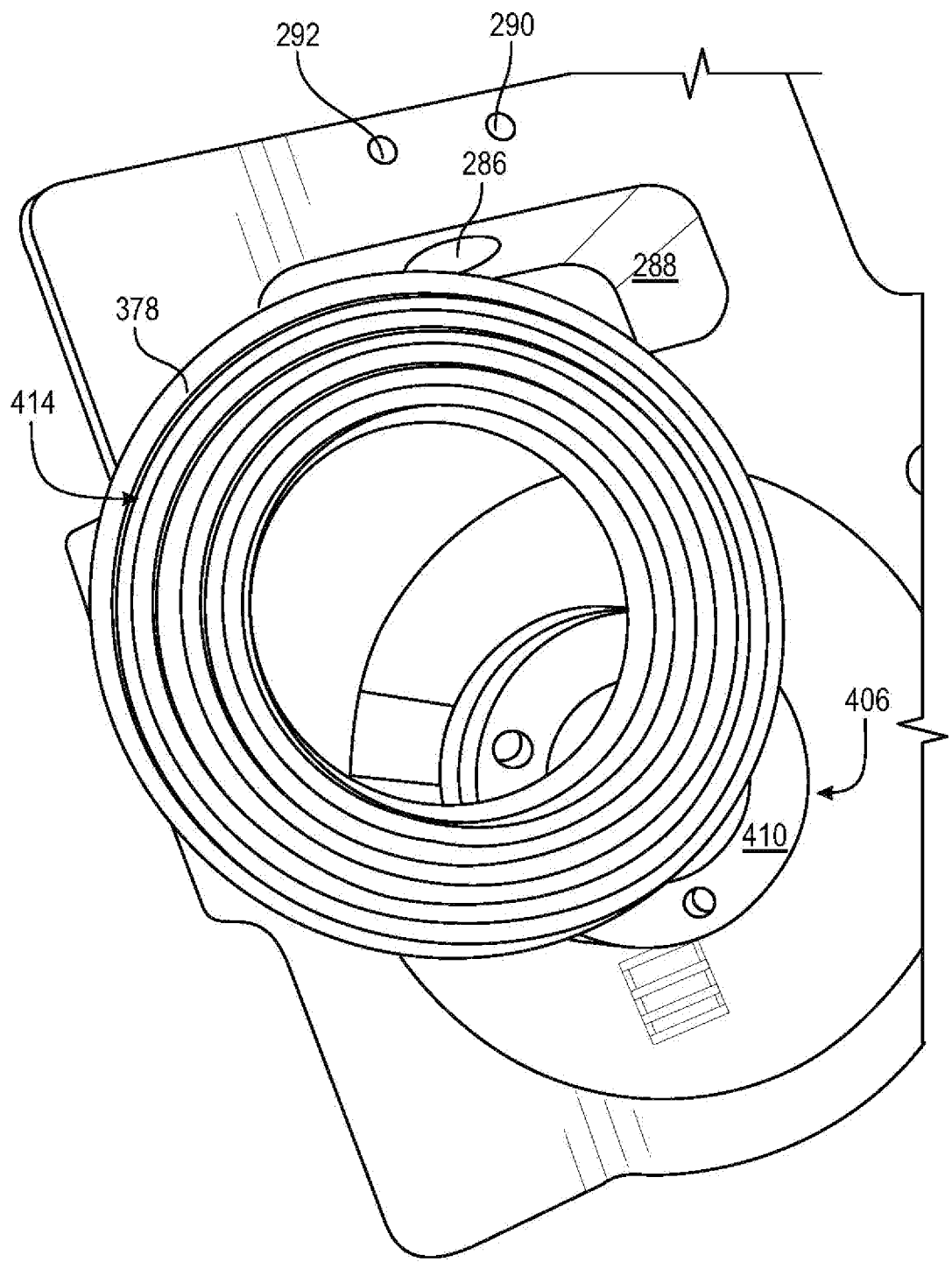
Figure 11K:
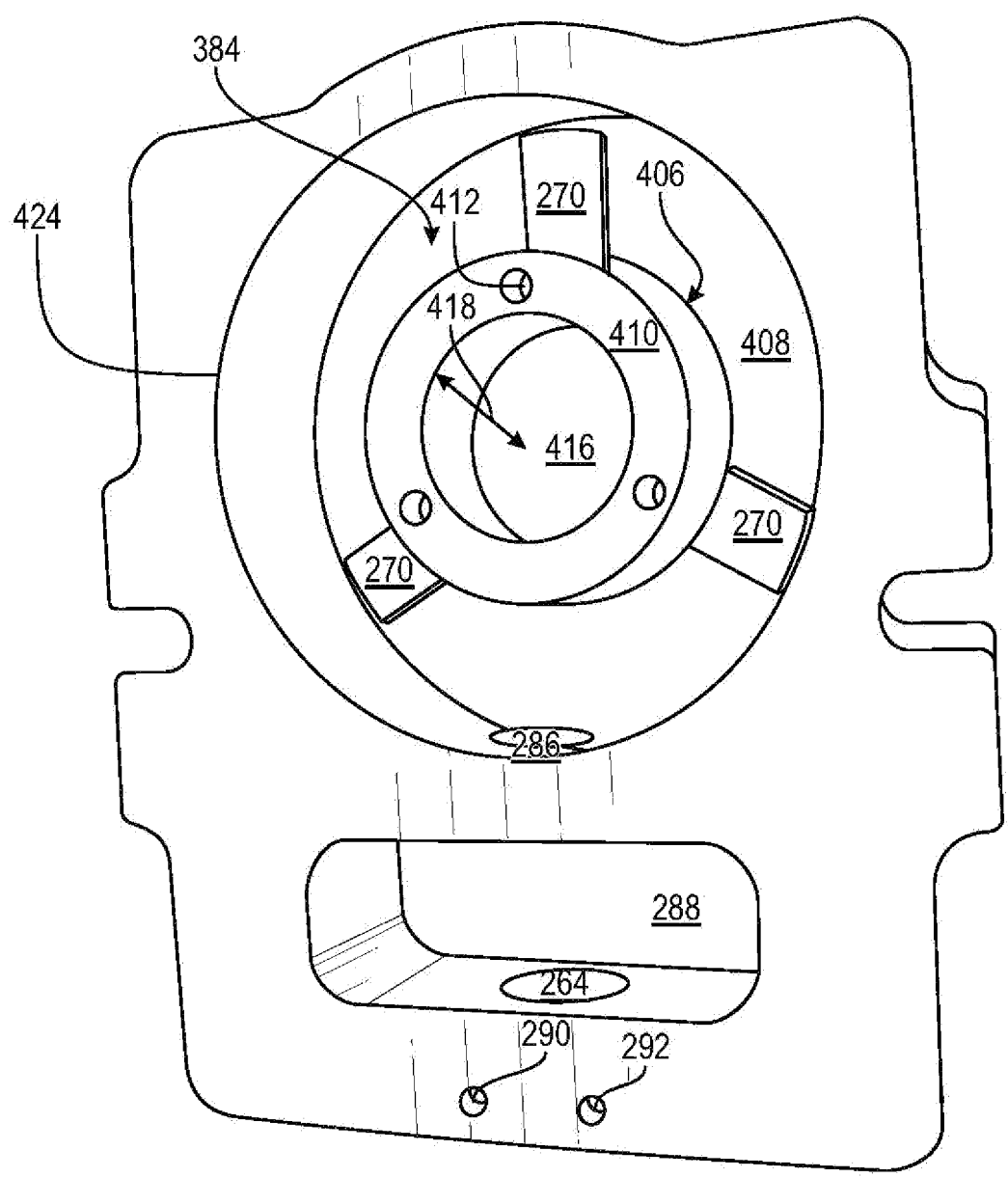
Figure 11L:
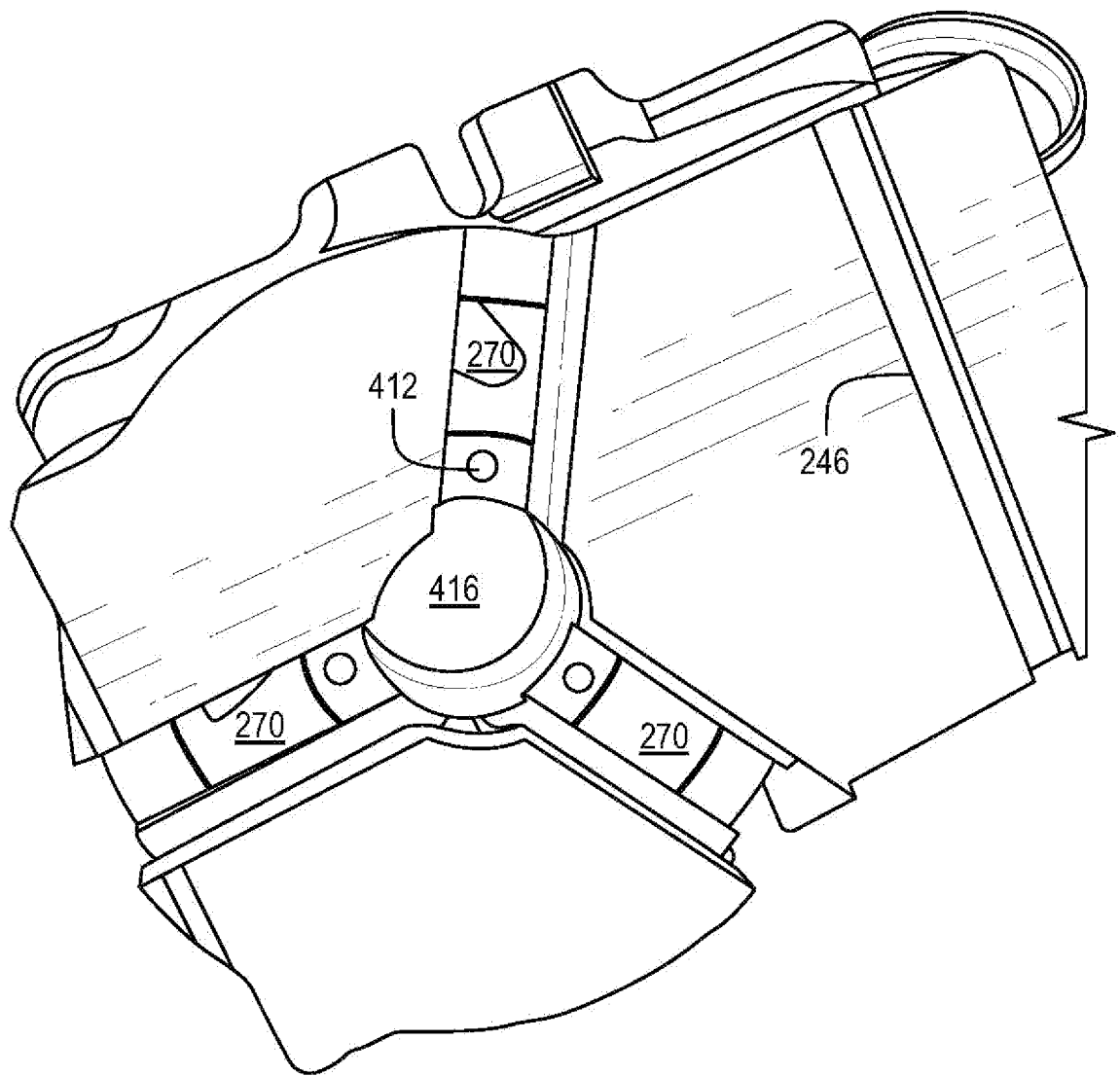
Figure 12A:
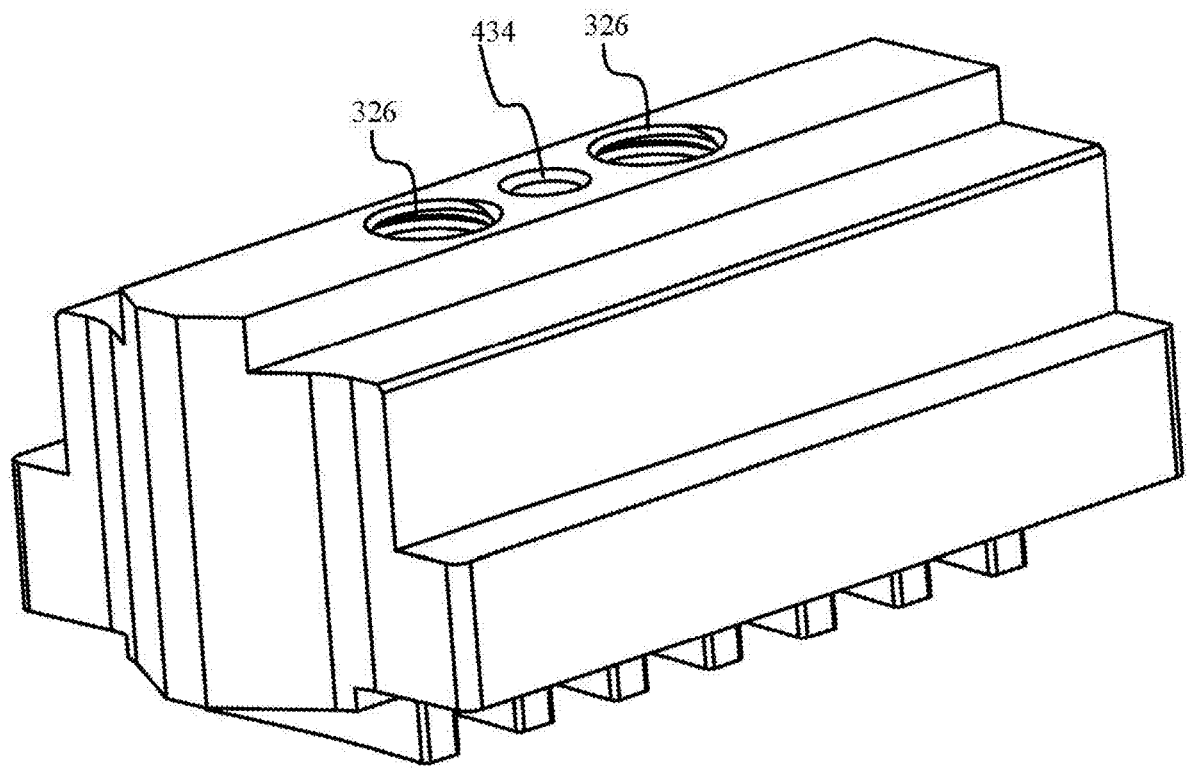
Figure 12B:
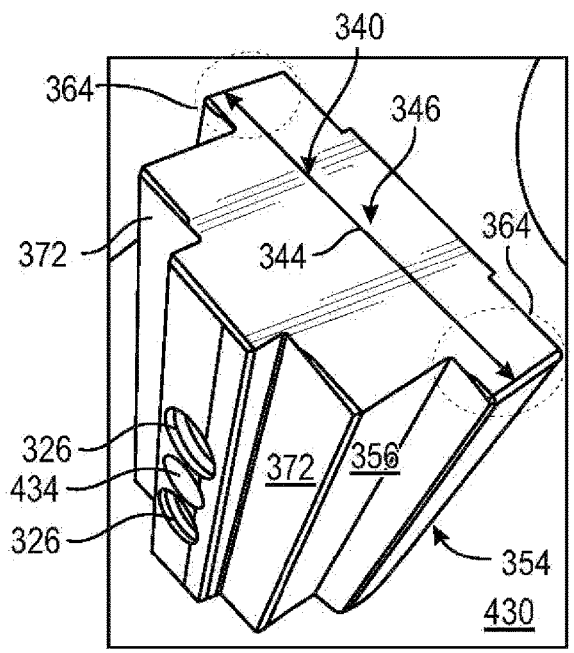
Figure 12C:
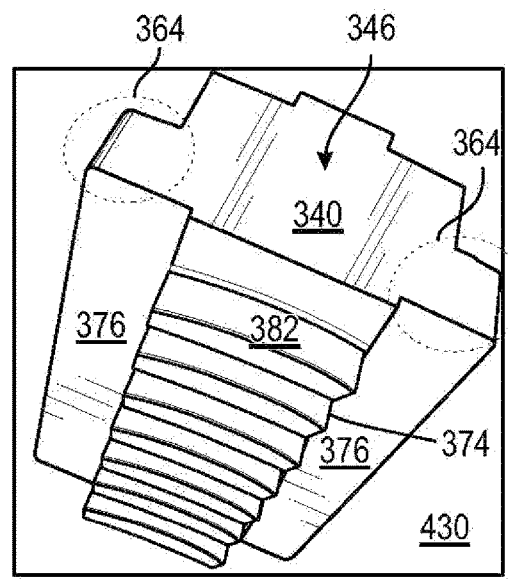
Figure 12D:
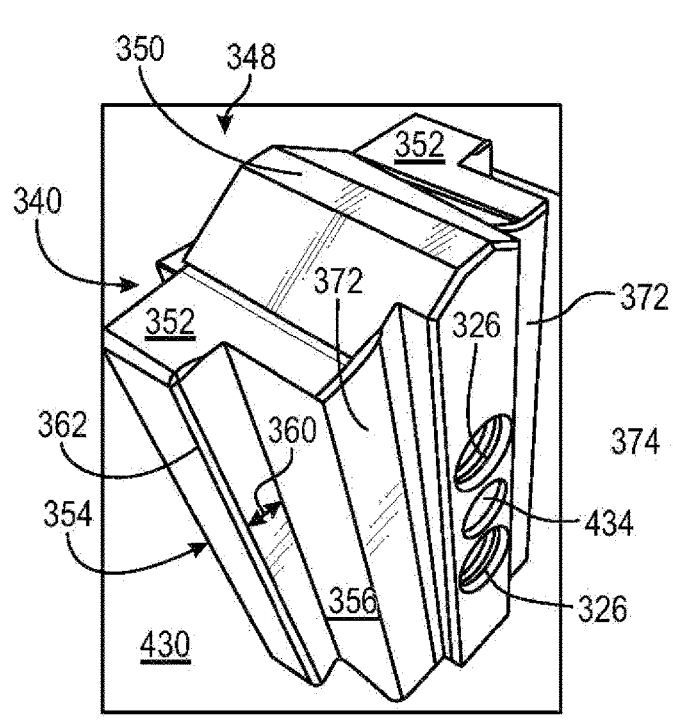
Figure 12E:
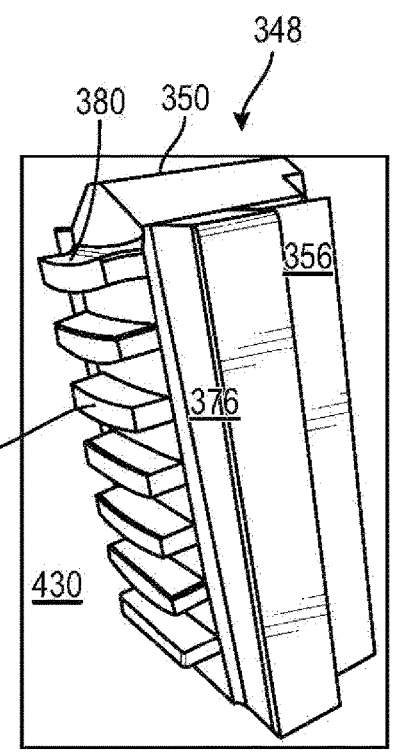
Figure 12I:
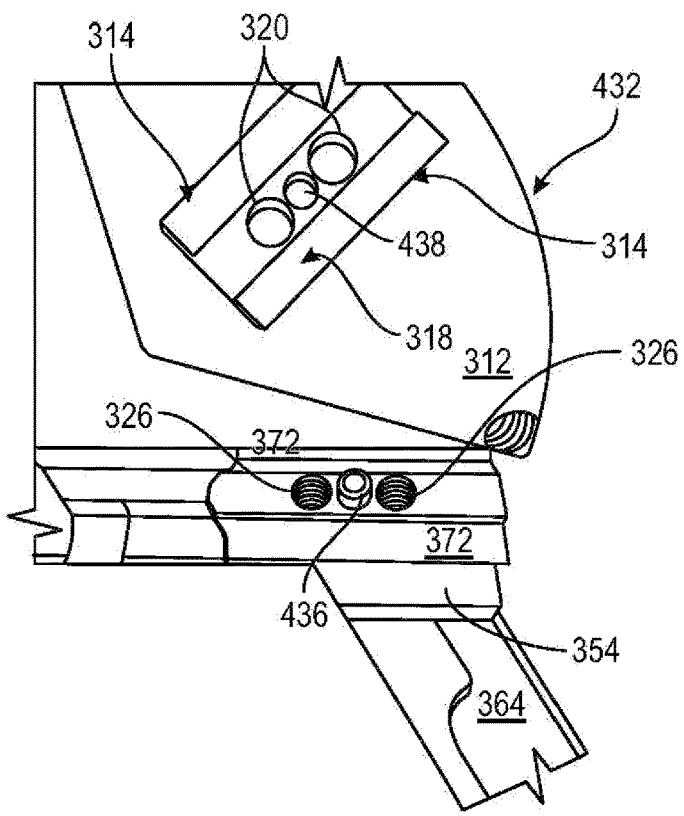
Figure 12J:
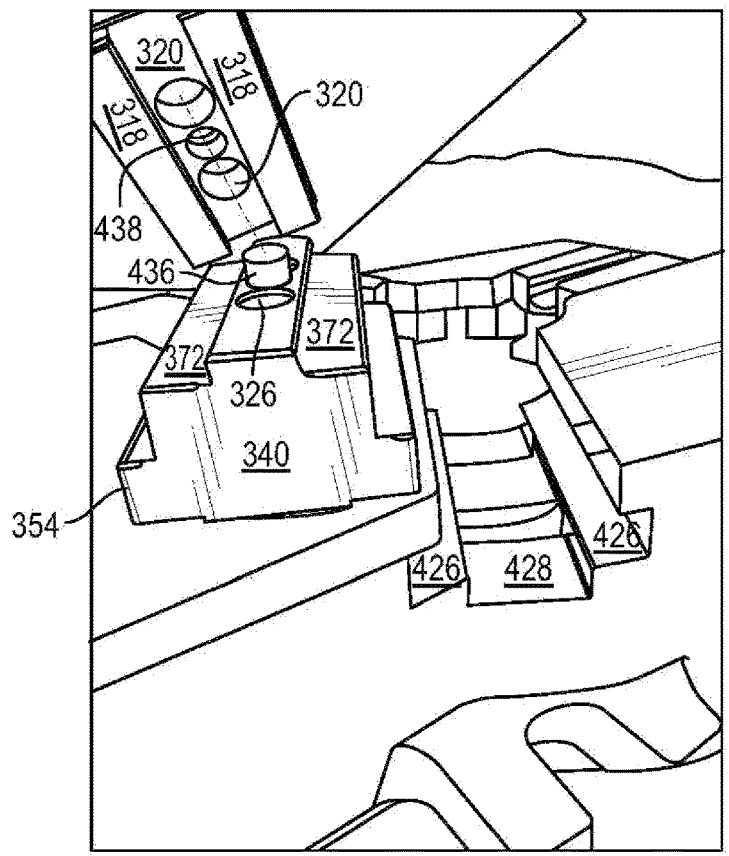
Figure 12K:
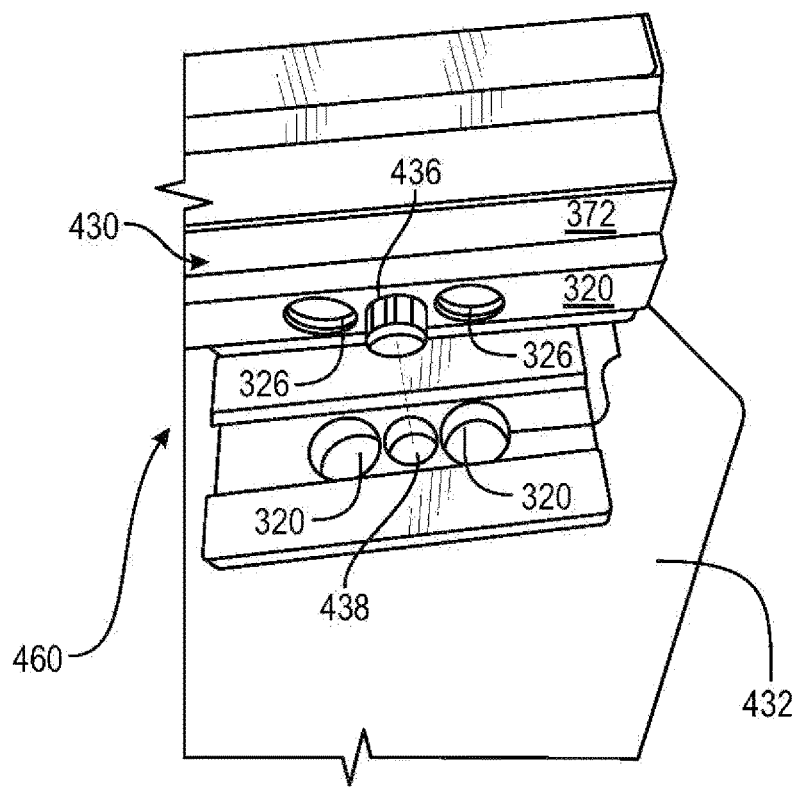
Figure 12M:
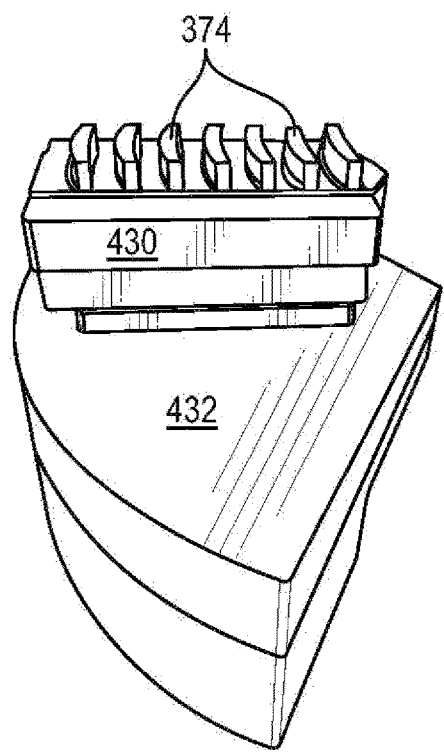
Figure 12L:
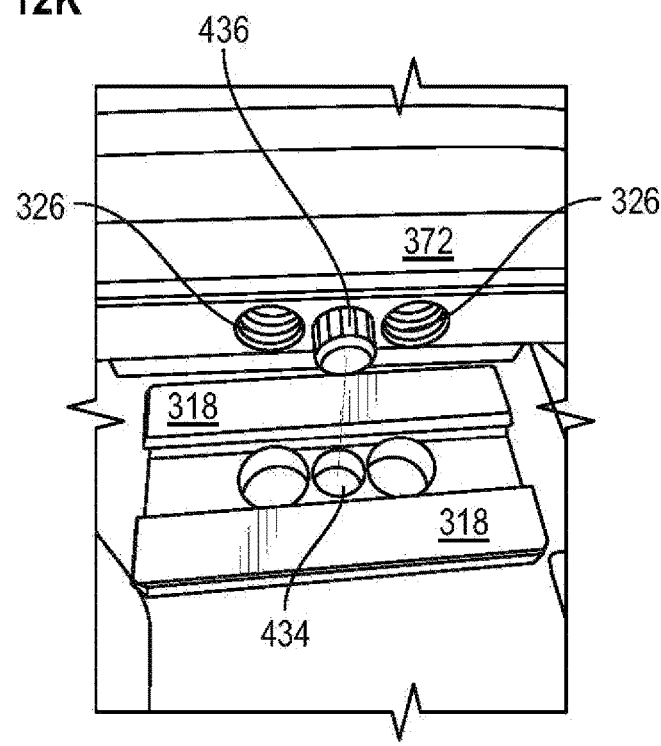

As illustrated FIG. 11A, first and second longitudinal bottom sections 276 and 276 accommodate drive mechanism 304 of hybrid holding device 200. Second longitudinal bottom section 278 includes an opening 424 that is closed from bottom side 262 by a cover plate 298. As best illustrated in FIG. 11K, opening 424 leads to an open chamber or housing 384, with cover 298 moveably securing and maintaining scroll plate 300 within housing 384. Housing 384 accommodates scroll plate 300 of drive mechanism 304 and pinion 302 of drive shaft 268. Therefore, open chamber or housing 384 is defined by bottom opening 424 and at top, by actuator member openings 270.

As illustrated in FIGS. 11A to 11D, cover plate 298 has a general annular disc configuration with a central opening 386, and has a cylindrical wall 388 extending from an interior facing side 390, surrounding central opening 386. Cylindrical wall 388 extends a distance 392 away from inner diameter edges 394 of central opening 386, enable sufficient space for positioning fastener openings 396 near central opening 386 for securing cover plate 298 with base 262 of hybrid holding device 200.

In addition to moveably secure scroll plate 300, cover plate 298 also functions to prevent debris such as metal shavings from entering into housing 384. This way, drive mechanism 307 is maintained clean.

As indicated above, cover plate 298 maintains scroll plate 300 within housing 384 so that the scroll plate 300 does not fall out. It should be noted that cover plate 298 applies sufficient pressures onto scroll plate 300 so that scroll plate 300 is easily rotated without being wobble while in rotation (no outer-plane or in-plane movement). Edges 400 on gear-side 402, near inner diameter 404 of scroll plate 300 engage with top surface 398 of annular walls 388 of cover plate 298. The engagement maintains scroll plate 300 in its proper orientation while rotating (no wobbling, no jamming, etc.).

As illustrated in FIGS. 11A, and 11E to 11L, second longitudinal bottom section 278 further includes an annular flange 406 (best shown in FIG. 11K) raised from inner bottom side 408 of housing 384. Raised annular flange 406 has a top side 410 that has fastener opening 412 that when aligned with openings 396 of cover plate 298, enable cover plate 298 to securely fasten onto hybrid holding device 200.

As best illustrated in FIG. 11L, second longitudinal top section 274 includes actuator member openings 270 for allowing movement and engagement of actuator member 214 of multi-jaw assembly 306 with rail-side 414 of scroll plate 300 from an exterior.

As further illustrated, second longitudinal bottom section 278 includes a main through-opening 416 of a generally cylindrical configuration that is oriented transverse a plane of base 204, defined by longitudinal and transverse axes of body 202.

Main through-opening 416 has sufficient height (depth) 418 to support and enable an elongated workpiece 106d to be securely held by multi-jaw assembly 306 at various portions of the workpiece without the workpiece being wobbled—no lateral movement of the workpiece in relation to its central axis. It should be noted that if the height of the workpiece is too long, then the hybrid holding device 200 may be raised (by a set of blocks for example positioned on workbench 108) to accommodate the longer workpieces.

First longitudinal bottom section 276 includes drive shaft 268 that has a pinion 302 that engages cogs 420 on gear-side 402 of scroll plate 300 to rotate scroll plate 300. Drive shaft 268 has a handle engagement section 266 that receives handle 218 to rotate drive shaft 268, which, in turn, rotates scroll plate 300 by a pinion 302 of drive shaft 268. It should be noted that the pinion 302 is formed as a beveled or cone shaped gear. Drive shaft 268 further includes a mounting structure 296 (in a form of a groove 422) that enables drive shaft 268 to be mounted onto body 202 of hybrid holding device 200 by a set of shaft pins 294 (e.g., shoulder bolts).

FIGS. 12A to 12M are non-limiting, exemplary illustrations of an actuator member and jaw in accordance with another embodiment of the present invention where the position of the jaw is detachably fixed onto the actuator member without the need or requirement for a securing member. The actuator member and the jaw illustrated in FIGS. 12A to 12M include similar corresponding or equivalent components, interconnections, functional, operational, and or cooperative relationships as those shown in FIGS. 2A to 11L, and described above. Therefore, for the sake of brevity, clarity, convenience, and to avoid duplication, the general description of FIGS. 12A to 12M will not repeat every corresponding or equivalent component, interconnections, functional, operational, and or cooperative relationships that has already been described above in relation to actuator member and jaw shown in FIGS. 2A to 11L but instead, are incorporated by reference in their entirety herein.

As illustrated in FIGS. 12A to 12M, instead of having separate actuator member 214 and securing member 308, an actuator member 430 may be used instead that combines features of actuator member 214 and securing member 308 into a single, unitary block. A main difference between actuator member 430 of the instant embodiment shown and that of actuator member 214 (illustrated in FIGS. 2A to 11L) is that actuator member 430 does not have a T-slot track 332, but is solid and has threaded openings 326 for fastening to a jaw. In this non-limiting, exemplary embodiment, multi-jaw assembly 460 (best shown in FIG. 12K) is comprised of a jaw 212/210/432, actuator member 430, and a pin 436.

As illustrated in FIGS. 12A to 12M, actuator member 430 is comprised of a single, solid unitary block that is able to be detachably secured and be fixed to jaw 212/210 (as discussed above) and jaw 432 (FIGS. 12A to 12M) as discussed below.

All contacting surfaces of actuator member 430 in relation to actuator member openings 270 and scroll plate 300, including jaws 210/212 are similar. In other words, actuator member 430 as illustrated may be used in hybrid holding device 200 illustrated in FIGS. 2A to 11L as described with no changes with the exception that there would not be any need for securing member 308. The other exception is that as best illustrated in FIGS. 12A to 12M, optionally, actuator member 430 may no longer have serrations on top surface 372 of walls 356. Serrations are no longer required since jaws 210/212 (detailed above) and jaws 432 (detailed below) are always secured to actuator member 430 at the same fixed mounting position. As indicated above, combinations of serrations on jaws 210/212 and actuator member 214 were used to adjustably secure a jaw in relation to actuator member 214 at different positions. Since there is no securing member 308 to be adjusted (slide to different positions within T-slot track 332), serrations on top surface 372 of walls 356 of actuator member 430 are therefore also not needed as there are not adjustments when using actuator member 430.

As further illustrated in FIGS. 12A to 12M, actuator member 430 further includes a recess or cavity 434 positioned in between threaded openings 326 (which are no longer through-openings). Recess 434 receives an interlocking pin 436 associated with jaw 432.

As illustrated, jaw 432 is similar to jaw 210/212 with the exception that the top side 318 of raised surfaces 314 are not serrated (as detailed above) and further, include a cavity 438 that receives free end of interlocking pin 436. This enables interlocking pin 436 to mate or latch with both actuator member 430 and jaw 432.

Interlocking pin 436 facilitates for a more exact positioning of jaw 432 in relation to actuator member 430. That is, use of pin 436 compensates for allowed tolerances of threaded openings 326 on actuator member 430 and allowed tolerances of respective fasteners 310. In other words, pin 436 reduces such allowed tolerances for a more exact positioning of jaws 432 in relation to actuator member 430. The overall combination of actuator member 430 and pin 436 also reduce the potential error in jaw positioning as detailed below.

Although flexibility in terms of adjustability of positioning of jaws 210/212/432 in relation to one another is lost when using actuator member 430, the benefit gained is a more exact, fixed re-positioning of jaws 210/212/430 in relation to center 220 and one another. In other words, users need no longer adjust each multi-jaw assembly 460 in relation to center 220 and one another, but may always quickly attached jaw 210/212/430 to actuator member 430 at the same fixed mounting position.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A hybrid holding device used in a milling machine, comprising:
    a single piece body with an integral base with mounting structures for detachably fastening the hybrid holding device securely onto a workbench of the milling machine in a fixed stationary position;
    a drive mechanism; and
    a moveable multi jaw assembly that includes three or more jaws that adjustably move in unison to a tightening or a releasing positions by the drive mechanism to thereby directly receive and securely hold or release a workpiece without an adapter;
    a handle associated with the drive mechanism for tightening a holding, grip of the multi jaw assembly against the workpiece;
    the drive mechanism includes:
    a single annular scroll plate that has a gear-side that includes radially extending cogs, and a rail-side having rail-guides; and
    a single piece, elongated cylindrical drive shaft;
    the drive shaft is oriented parallel a longitudinal axis of the body of the hybrid holding device and includes an axial length that extends from a second drive shaft mounting opening, over a cavity, and to a first drive shaft mounting opening;
    the drive shaft has a polygonal drive end that extends out from the first drive shaft mounting opening, with the drive end receiving the handle to facilitate rotation of the drive shaft;
    the drive shaft, further includes an engagement end comprised of a pinion that engages the cogs of the scroll plate, with the pinion extending out from the second drive shaft mounting opening;
    first and second drive shaft mounting openings have axially aligned centers, with the centers oriented parallel the longitudinal axis of the body of the hybrid holding device;
    first and second drive shaft mounting openings are separated by the cavity positioned in between first and second drive shaft mounting openings;
    wherein: a combination of both the first drive shaft mounting opening and the second drive shaft mounting opening enable steady axial rotation of drive shaft without wobbling, while the cavity in between first and second drive shaft mounting openings reduces an overall weight of the hybrid holding device; and
    wherein: the body has a length that extends along a longitudinal axis of the hybrid holding device, and a width that extends along a transverse axis of the hybrid holding device;
    the body of the hybrid holding device includes a top side and a bottom side;
    the body further includes a first section that includes an alignment groove on top side, and accommodates a drive shaft of the drive mechanism;
    the body further includes a second section that accommodates the multi-jaw assembly and drive mechanism;
    the bottom side of the second section of the body includes an offset surface forming an open-cavity that houses the scroll plate and accommodates the pinion of the drive shaft;
    the bottom side of the second section further includes an, annular flange raised from the interior surface of the bottom side of the second section having a top side that has fastener opening to secure a cover plate;
    the bottom side of the second section further includes openings, forming open surface of open-cavity for allowing engagement of multi-jaw assembly with scroll plate from an exterior of the open-cavity.

2. The hybrid holding, device used in a milling machine as set forth in claim 1, wherein:
    the movable multi jaw assembly is used for gripping the workpiece in one of closing positions while moving inwardly towards a center or opening positions while moving outwardly, away from the center.

3. A hybrid holding device used in a milling machine, comprising:
    a single piece body with a base having a mounting structure for detachably securing the hybrid holding device in a fixed stationary position directly onto a workbench of the milling machine;
    a drive mechanism; and
    a moveable multi-jaw assembly that includes at least three jaws that adjustably move n unison to a tightening or a releasing positions by the drive mechanism;
    the body has a length that extends along a longitudinal axis of the hybrid holding device, and a width that extends along a transverse axis of the hybrid holding device;
    the body of the hybrid holding device includes a top side and a bottom side;
    the body further includes a first section that includes an alignment groove on the top side, and accommodates a single piece, elongated cylindrical drive shaft of the drive mechanism near the bottom side;
    the alignment, groove extends linearly along a transverse axis of the hybrid holding device near a rear of the hybrid holding device;
    a first longitudinal bottom section of the hybrid holding device includes first and second drive shaft mounting openings with a cavity between the first and second drive shaft mounting openings;
    the first and second, drive shaft openings have axially aligned centers, with centers oriented parallel the longitudinal axis of the hybrid holding device;
    the cavity has a width parallel the longitudinal axis of the hybrid, holding device, defining a separation distance between first and second drive shaft mounting openings;
    the cavity has a length parallel the transverse axis of the hybrid holding, device, and a depth with a span longer than a first diameter and a second diameter of the respective first and second drive shaft mounting openings;
    first and second drive shaft mounting openings enable steady axial rotation of drive shaft without wobbling;

the drive shaft is oriented parallel the longitudinal axis of the hybrid holding device and includes a polygonal drive end that extends out from the first drive shaft mounting opening, and receives a handle to rotate the drive shaft;

the drive shaft further includes a pinion that engages cogs of a scroll plate, with the pinion extending out from the second drive shaft mounting opening; and further, the body further includes a second section that accommodates the multi-jaw assembly and drive mechanism;

the bottom side of the second section of the body includes an offset surface forming an open-cavity that houses the scroll plate and accommodates the pinion of the drive shaft;

the bottom side of the second section further includes an annular flange raised from the interior surface of the bottom side of the second section having a top side that has fastener opening to secure a cover plate;

the bottom side of the second section further includes openings, forming open surface of open-cavity for allowing engagement of multi-jaw assembly with scroll plate from an exterior of the open-cavity.

4. The hybrid holding device used in a milling machine as set forth in claim 3, wherein:

a jaw of the multi-jaw assembly is associated with the drive mechanism by a securing member.

5. The hybrid holding device used in a milling machine as set forth in claim 4, wherein:

the securing member is detachably engaged with an actuator member of the drive mechanism.

6. The hybrid holding device used in a milling machine as set, forth in claim 5, wherein:

the actuator member engages a scroll plate of the drive mechanism, which enables the actuator member to move.

7. The hybrid holding device used in a milling machine as set forth in claim 6, wherein:

the scroll plate is rotated by a drive shaft of the drive mechanism.

8. The hybrid holding device used in a milling machine as set forth in claim 7, wherein:

a handle is detachably engaged with a drive end of the drive shaft to rotate to the drive shaft, which, in turn, rotates the scroll plate by an actuator end of the drive shaft.

9. A hybrid holding device used in a milling machine, comprising:

a movable multi jaw assembly that includes at least three jaws that move in unison to a tightening or a releasing position;

a drive mechanism that actuates the multi-jaw assembly; and a single piece body having a base with a mounting structure for detachably securing the hybrid holding device in a fixed stationary position directly onto a workbench of the milling machine;

a first longitudinal bottom section of the hybrid holding device includes first and second drive shaft mounting openings with a cavity between the first and second drive shaft mounting openings;

the first and second drive shaft openings have axially aligned centers, with centers oriented parallel the longitudinal axis of the hybrid holding device;

the first and second drive shaft mounting openings enable steady axial rotation of a single piece, elongated cylindrical drive shaft without wobbling;

the drive shaft includes a polygonal drive end that extends out from the first drive shaft mounting opening, and receives a handle to rotate the drive shaft;

the drive shaft further includes a pinion that engages cogs of a scroll plate, with the pinion extending out from the second drive shaft mounting opening;

the bottom side of the hybrid holding device, above the first drive shaft mounting opening are laterally adjacently positioned upper interlocking openings that extend perpendicular the first longitudinal bottom section and lead into the first drive shaft mounting opening;

further included are lower interlocking openings that are axially aligned with upper interlocking opening;

the upper and lower interlocking openings receive threaded shoulder bolts that engage a drive shaft interlock structure located near the drive end of the drive shaft within first drive shaft mounting opening; and further, the body has a length that extends along a longitudinal axis of the hybrid holding device, and a width that extends along a transverse axis of the hybrid holding device;

the body of the hybrid holding device includes a top side and a bottom side;

the body further includes a first section that includes an alignment move on top side, and accommodates a drive shaft of the drive mechanism;

the body further includes a second section that accommodates the multi-jaw assembly and drive mechanism;

the bottom side of the second section of the body includes an offset surface forming an open-cavity that houses the scroll plate and accommodates the pinion of the drive shaft;

the bottom side of the second section further includes an annular flange raised from the interior surface of the bottom side of the second section having a top side that has fastener opening to secure a cover plate;

the bottom side of the second section further includes openings, forming open surface of open-cavity for allowing engagement of multi-jaw assembly with scroll plate from an exterior of the open-cavity.

10. The hybrid holding device used in a milling machine as set forth in claim 9, wherein:

the multi-jaw assembly further includes:

a securing member that is detachably fastened to a jaw, with the securing member engaging an actuator member of the drive mechanism.

11. The hybrid holding device used in a milling machine as set forth in claim 9, wherein:

a jaw of the multi-jaw assembly is comprised of:

one or more engagement surfaces to grip hold of one or more holding surfaces of a workpiece.

12. The hybrid holding device used in a milling machine as set forth in claim 9, wherein:

a jaw of the multi-jaw assembly is comprised of:

a bottom side that includes two parallel raised surfaces that have serrations on top sides for engagement with an actuator member.

13. The hybrid holding device used in a milling, machine as set forth in claim 12, wherein:
the jaw of the multi jaw assembly further comprising:
a through-hole positioned in between the two parallel raised surfaces for receiving a fastener for detachably securing the jaw with a securing member;
the through-hole is comprised of:
a top through-hole portion with a first diameter extending longitudinally from a top opening on a top surface of the jaw;
a bottom through-hole portion with a second diameter extending longitudinally from a bottom opening on a bottom surface of the jaw;
the top through-hole portion and the bottom through-hole portion are concentric, with the second diameter has a shorter span than the first diameter to form a supporting surface for fastener.

14. The hybrid holding device used in a milling machine as set forth in claim 13, wherein:
the through-hole is comprised of a set of through-holes that are aligned and positioned in between the two parallel raised surfaces.

15. The hybrid holding device used in a milling machine as set forth in claim 9, wherein:
multi jaw assembly is further comprised of:
a securing member;
the securing member is comprised of an elongated T-slot nut having a T-configuration cross-sectional profile that extends longitudinally;
the securing member is comprised of:
a single, unitary block with a threaded through-hole opening for receiving a fastener to detachably fasten a jaw to a securing member; and
wherein: T-slot nut slides onto a corresponding T-slot track of an actuator member.

16. The hybrid holding device used in a milling machine as set forth in claim 9, wherein:
the multi-jaw assembly is further comprised of:
an actuator member that moves a jaw of the multi jaw assembly;
the actuator member is comprised of:
a single unitary block comprised of first engagement surfaces for engagement with a securing member, and second engagement surfaces for engagement with the jaw and the hybrid holding device.

17. The hybrid holding device used in a milling machine as set forth in claim 9, wherein:
the multi-jaw assembly is further comprised of:
an actuator member that moves a jaw of the multi-jaw assembly;
the actuator member is comprised of:
a main section that has a length that extends along a longitudinal axis of the actuator member, and a width that extends along a transverse axis of the actuator member;
the main section has a rear side that is flat and a front side that has centrally extended projection configured as a V shape that prevents further movement of the actuator member toward center, with lateral parts of the front side being flat;
the main section further includes lateral sides that extend along a longitudinal axis of the actuator member and that are flat.

18. The hybrid holding device used in a milling machine as set forth in claim 17, wherein:
the actuator member is further comprised of:
two projecting, parallel walls raised from a top side of the main section, away from distal edges of the lateral sides of the main section to form actuator engagement flanges;
the walls extend longitudinally along a general length of the main section, defining an elongated groove for, receiving a securing member;
the walls having sufficient, height to accommodate the securing member and further be secured within actuator engagement openings of the hybrid holding device top surface of top side of the walls is serrated;
the walls include outer sides that are generally flat that enable the actuator member to engage corresponding surfaces of actuator engagement openings at of the hybrid holding device; and
two inner sides that form a general T-slot for receiving the securing member.

19. The hybrid holding device used in a milling machine as set forth in claim 18, wherein:
the actuator member is further comprised of:
a set of interlocking cogs raised from a bottom surface of a bottom side that engage a spiral railing guides of a scroll plate, which when rotated, moves actuator member by the set of interlocking cogs.

20. The hybrid holding device used in a milling machine as set forth in claim 19, wherein:
the interlocking cogs are comprised of:
a first curved side with a first radius, and a second curved side with a second radius.

21. The hybrid holding device used in a milling machine as set forth in claim 9, wherein:
the drive mechanism is comprised of:
the drive shaft and the scroll plate.

22. The hybrid holding device used in a milling machine as set forth in claim 21, wherein:
the drive shaft includes:
the drive shaft interlock structure located near the drive end is, in a form of a groove that enables the drive shaft to be mounted onto hybrid holding device by the threaded shoulder bolts.

23. The hybrid holding device used in a milling machine as set forth in claim 9 wherein:
the second section includes a main through-opening of a generally cylindrical configuration that is oriented transverse a plane of the base, defined by longitudinal and transverse axes of the base.

24. The hybrid holding device used in a milling machine as set forth in claim 23, wherein:
the through-opening has sufficient height to support and enable a elongated workpiece to be securely held by multi-jaw assembly at various portions of the workpiece without the workpiece being wobbled.

25. The hybrid holding device used in a milling machine as set forth in claim 9 wherein:
the body mounting, structured includes supporting flanges.

26. The hybrid holding device used in a milling machine as set forth in claim 9, wherein:
the open-cavity is closed from bottom side by a cover plate that moveably secures and maintains a scroll plate within open-cavity.

27. The hybrid holding device used in a milling machine as set forth in claim 26, wherein:
  the cover plate includes:
  a central opening;
  an annular wall extending from an annular disc;
  the annular wall extends away from outer edges of opening, enable sufficient space for fastener opening for securing cover plate with base of the hybrid holding device.

\* \* \* \* \*